(12) United States Patent
LeLeannec et al.

(10) Patent No.: US 12,506,896 B2
(45) Date of Patent: *Dec. 23, 2025

(54) MOTION VECTOR PROCESSING FOR VIDEO ENCODING AND DECODING

(71) Applicant: INTERDIGITAL MADISON PATENT HOLDINGS, SAS, Paris (FR)

(72) Inventors: Fabrice LeLeannec, Betton (FR); Antoine Robert, Mézières sur Couesnon (FR); Franck Galpin, Thorigne-Fouillard (FR); Tangi Poirier, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,739

(22) Filed: Jun. 17, 2024

(65) Prior Publication Data

US 2024/0348820 A1  Oct. 17, 2024

Related U.S. Application Data

(63) Continuation of application No. 17/619,377, filed as application No. PCT/EP2020/066862 on Jun. 18, 2020, now Pat. No. 12,052,434.

(30) Foreign Application Priority Data

Jun. 20, 2019  (EP) .................................. 19305795

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/11* (2014.11); *H04N 19/139* (2014.11);
(Continued)

(58) Field of Classification Search
CPC .... H04N 19/105; H04N 19/11; H04N 19/139; H04N 19/157; H04N 19/159;
(Continued)

(56) References Cited

U.S. PATENT DOCUMENTS

2008/0310511 A1* 12/2008 Suzuki .................. H04N 19/46
                                                          375/E7.125
2012/0051431 A1  3/2012 Chien et al.
(Continued)

FOREIGN PATENT DOCUMENTS

CN      101189883 A    5/2008
EP      1469682 A1    10/2004
(Continued)

OTHER PUBLICATIONS

Bossen, et al., "Non-CE4: On Temporal Motion Buffer Compression", JVET-M0512_r2; Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.
(Continued)

*Primary Examiner* — Masum Billah
(74) *Attorney, Agent, or Firm* — Condo Roccia Koptiw LLP

(57) ABSTRACT

Encoding or decoding picture information can involve determining a coding mode associated with a current coding unit including picture information; determining, based on the coding mode, a first precision level associated with a first portion of a motion vector information associated with the current coding unit, and a second precision level associated
(Continued)

with a second portion of the motion vector information; obtaining a motion vector associated with the current coding unit based on the motion vector information and the first and second precision levels; and encoding or decoding at least a portion of the picture information included in the current coding unit based on the coding mode and the motion vector.

20 Claims, 27 Drawing Sheets

(51) Int. Cl.
  *H04N 19/11* (2014.01)
  *H04N 19/139* (2014.01)
  *H04N 19/159* (2014.01)
  *H04N 19/172* (2014.01)
  *H04N 19/513* (2014.01)

(52) U.S. Cl.
  CPC ......... *H04N 19/159* (2014.11); *H04N 19/172* (2014.11); *H04N 19/521* (2014.11)

(58) Field of Classification Search
  CPC .... H04N 19/172; H04N 19/52; H04N 19/521; H04N 19/523; H04N 19/176; H04N 19/70; H04N 19/513; H04N 19/577
  USPC ........................................................ 375/240
  See application file for complete search history.

(56) References Cited

U.S. PATENT DOCUMENTS

| | | | |
|---|---|---|---|
| 2013/0163668 A1 | 6/2013 | Chen et al. | |
| 2015/0195562 A1* | 7/2015 | Li | H04N 19/109 375/240.16 |
| 2019/0246143 A1 | 8/2019 | Zhang et al. | |

FOREIGN PATENT DOCUMENTS

| | | | | |
|---|---|---|---|---|
| WO | WO-2019244051 A1 | * | 12/2019 | .......... H04N 19/107 |
| WO | WO-2020221258 A1 | * | 11/2020 | .......... H04N 19/105 |

OTHER PUBLICATIONS

Chen, et al., "Algorithm Description for Versatile Video Coding and Test Model 3 (VTM 3)", JVET-L1002-V1, Editors, Joint Video Experts Team (JVET) of ITU-T SG 16 WP 3 and ISO/IEC JTC 1/SC 29/WG 11, 12th Meeting: Macao, CN, Date Saved: Dec. 24, 2018, Oct. 3-12, 2018, 48 pages.

Chen, et al., "Algorithm Description for Versatile Video Coding and Test Model 5 (VTM 5)", Editors, JVET-N1002-v2, Joint Video Experts Team (JVET) of ITU-T SG 16 WP 3 and ISO/IEC JTC 1/SC 29/WG 11; 14th Meeting: Geneva, CH, Mar. 19-27, 2019, 76 pages.

Chen, Jianle et al., "Algorithm Description of Joint Exploration Test Model 7 (JEM 7)", JVET-G1001-v1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Hsiao, et al., "CE2-related: Simplification for inherited affine candidates", JVET-M0168-v1, Joint Video Experts Team (JVET) of ITU-T SG 16 WP 3 and ISO/IEC JTC 1/SC 29/WG 11, Jan. 9-18, 2019, 8 pages.

ITU-T, "High Efficiency Video Coding", H.265-v2, Series H: Audiovisual and Multimedia Systems, Infrastructure of Audiovisual Services—Coding of Moving Video, Oct. 2014, 540 pages.

Li, et al., "CE2-related: Combination of CE2.2.3.d and affine inheritance from motion data line buffer", JVET-M0432, Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

Zhang, et al., "CE2-related: An alternative storing method for affine inheritance", JVET-M0270, Joint Video Experts Team (JVET) of ITU-T SG 16 WP 3 ISO/IEC JTC 1/SC 29/WG 11, 13th Meeting: Marrakech, MA, Jan. 9-18, 2019, 5 pages.

* cited by examiner

MOTION VECTOR PROCESSING FOR VIDEO ENCODING AND DECODING

CROSS-REFERENCE TO RELATED APPLICATIONS

This application is a continuation of U.S. application Ser. No. 17/619,377 (now U.S. Pat. No. 12,052,434), which is a National Phase entry under 35 U.S.C. § 371 of International Application No. PCT/EP2020/066862, filed Jun. 18, 2020, which claims priority from European Patent Application No. 19305795.7, filed Jun. 20, 2019, the disclosures of each of which are incorporated by reference herein in their entireties.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. An aspect of the prediction process can involve motion compensated temporal prediction based on motion vectors as explained further below. To reconstruct the video, the compressed data is decoded by inverse processes corresponding to the prediction, transform, quantization and entropy coding.

SUMMARY

In general, an example of an embodiment can involve a method comprising determining a coding mode associated with a current coding unit including picture information; determining, based on the coding mode, a first precision level associated with a first portion of a motion vector information associated with the current coding unit, and a second precision level associated with a second portion of the motion vector information; obtaining a motion vector associated with the current coding unit based on the motion vector information and the first and second precision levels; and decoding at least a portion of the picture information included in the current coding unit based on the coding mode and the motion vector.

In general, another example of an embodiment can involve a method comprising determining a coding mode associated with a current coding unit including picture information; determining, based on the coding mode, a first precision level associated with a first portion of a motion vector information associated with the current coding unit, and a second precision level associated with a second portion of the motion vector information; obtaining a motion vector associated with the current coding unit based on the motion vector information and the first and second precision levels; and encoding at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first portion of a motion vector information associated with the current coding unit, and a second precision level associated with a second portion of the motion vector information; obtain a motion vector associated with the current coding unit based on the motion vector information and the first and second precision levels; and decode at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first portion of a motion vector information associated with the current coding unit, and a second precision level associated with a second portion of the motion vector information; obtain a motion vector associated with a coding unit of picture information based on the motion vector information and the first and second precision levels; and encode at least a portion of the picture information based on the coding mode and the motion vector.

In general, another example of an embodiment can involve a method comprising determining a coding mode associated with a current coding unit including picture information; determining, based on the coding mode, a first precision level associated with a first component of a motion vector residual associated with the current coding unit, and a second precision level associated with a second component of the motion vector residual; obtaining a motion vector associated with the current coding unit based on the motion vector residual and the first and second precision levels; and decoding at least a portion of the picture information included in the current coding unit based on the coding mode and the motion vector.

In general, another example of an embodiment can involve a method comprising determining a coding mode associated with a current coding unit including picture information;
  determining, based on the coding mode, a first precision level associated with a first component of a motion vector residual associated with the current coding unit, and a second precision level associated with a second component of the motion vector residual; obtaining a motion vector associated with the current coding unit based on the motion vector residual and the first and second precision levels; and encoding at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector residual associated with the current coding unit, and a second precision level associated with a second component of the motion vector residual; obtain a motion vector associated with the current coding unit based on the motion vector residual and the first and second precision levels; and decode at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector residual associated with the current coding unit, and a second precision level associated with a second component of the motion vector residual; obtain a motion vector associated with a coding unit of picture information based on the motion vector residual and the first and second precision levels; and encode at least a portion of the picture information based on the coding mode and the motion vector.

In general, another example of an embodiment can involve a method comprising determining a coding mode associated with a current coding unit including picture information;
  determining, based on the coding mode, a first precision level associated with a first motion vector residual corresponding to a first reference picture list, and a second precision level associated with a second motion vector residual corresponding to a second reference picture list; obtaining a first motion vector based on the first motion vector residual and the first precision level, and a second motion vector based on the second motion vector residual and the second precision level; and decoding at least a portion of the picture information based on the coding mode and the first and second motion vectors.

In general, another example of an embodiment can involve a method comprising determining a coding mode associated with a current coding unit including picture information;
  determining, based on the coding mode, a first precision level associated with a first motion vector residual corresponding to a first reference picture list, and a second precision level associated with a second motion vector residual corresponding to a second reference picture list; obtaining a first motion vector based on the first motion vector residual and the first precision level, and a second motion vector based on the second motion vector residual and the second precision level; and encoding at least a portion of the picture information based on the coding mode and the first and second motion vectors.

In general, another example of an embodiment can involve apparatus comprising one or more processors configured to determine a coding mode associated with a current coding unit including picture information; determine, based on the coding mode, a first precision level associated with a first motion vector residual corresponding to a first reference picture list, and a second precision level associated with a second motion vector residual corresponding to a second reference picture list; obtain a first motion vector based on the first motion vector residual and the first precision level, and a second motion vector based on the second motion vector residual and the second precision level; and decode at least a portion of the picture information based on the coding mode and the first and second motion vectors.

In general, another example of an embodiment can involve apparatus comprising one or more processors configured to determine a coding mode associated with a current coding unit including picture information; determine, based on the coding mode, a first precision level associated with a first motion vector residual corresponding to a first reference picture list, and a second precision level associated with a second motion vector residual corresponding to a second reference picture list; obtain a first motion vector based on the first motion vector residual and the first precision level, and a second motion vector based on the second motion vector residual and the second precision level; and encode at least a portion of the picture information based on the coding mode and the first and second motion vectors.

In general, another example of an embodiment can involve a bitstream formatted to include encoded picture information, wherein the encoded picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
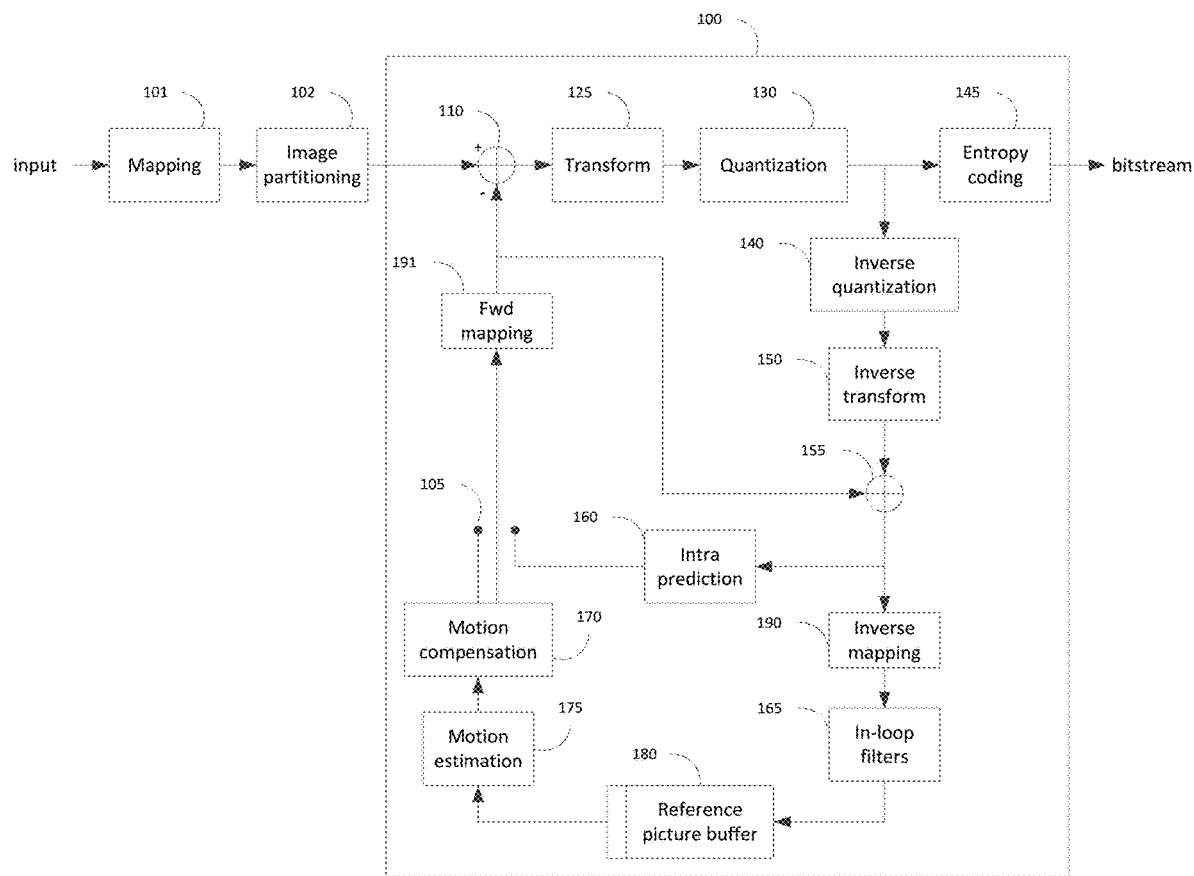
FIG. 1 provides a block diagram depicting an example of an embodiment of a video encoder.

In the figures, FIG. 1 illustrates an example of a video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services-Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

In the present application, the terms "reconstructed" and "decoded" may be used interchangeably, the terms "pixel" and "sample" may be used interchangeably, and the terms "picture" and "frame" may be used interchangeably.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture information to be encoded is provided at the input and undergoes mapping (101) and image partitioning (102). The mapping (101) typically applies per sample and applies a 1D-function to the input sample values to convert them to other sample values. For example, the 1D-function can expand the sample value range and provide for a better distribution of the codewords over the codeword range. The image partitioning (102) splits the image into blocks of different sizes and shapes in order to optimize the rate-distortion tradeoff. The mapping and partitioning enable processing the picture information in units of CUs as described above. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. The intra or inter prediction decision (105) is followed by forward mapping (191) to produce a predicted block. In general, the forward mapping processing (191) is similar to the mapping (101) and can be complementary to the mapping. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The inverse mapping (190) is the inverse of the forward mapping (191). The filtered image is stored at a reference picture buffer (180).

Figure 2:
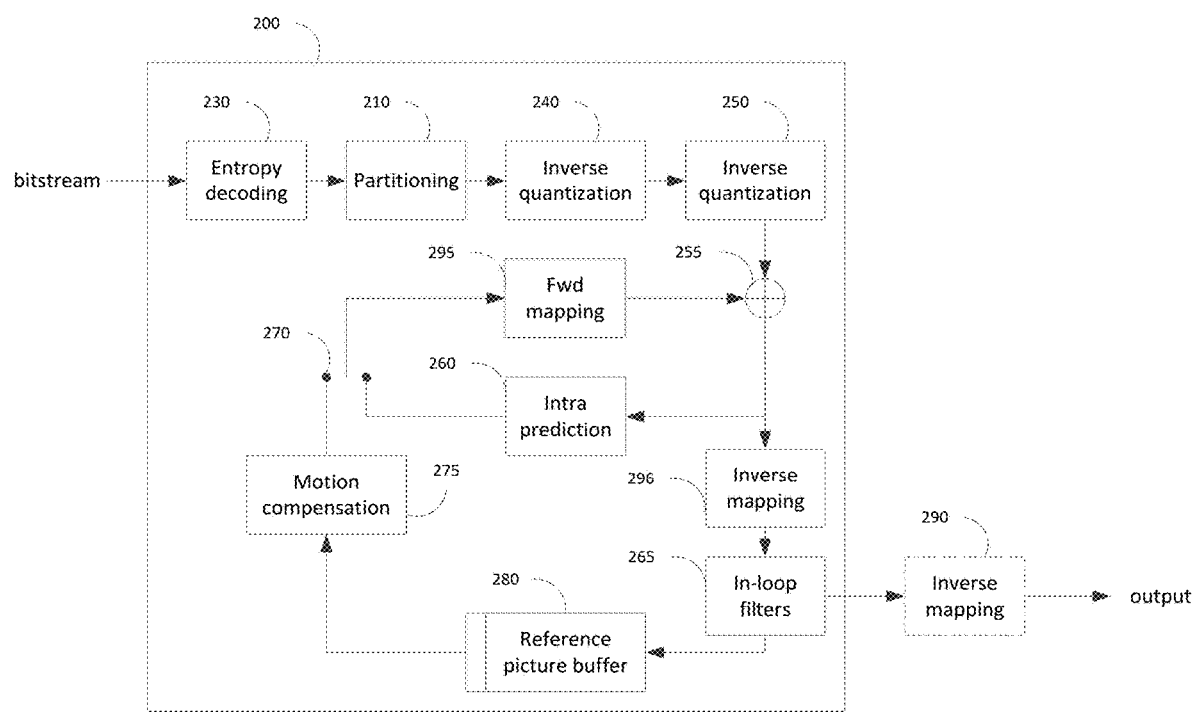
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream that can be generated by a video encoder such as video encoder 100 of FIG. 1. The signal or bitstream is first entropy decoded (230) followed by partitioning (210) to obtain transform coefficients, motion vectors, and other coded information. Partitioning (210) divides the image into blocks of different sizes and shape based on the decoded data. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Figure 3:
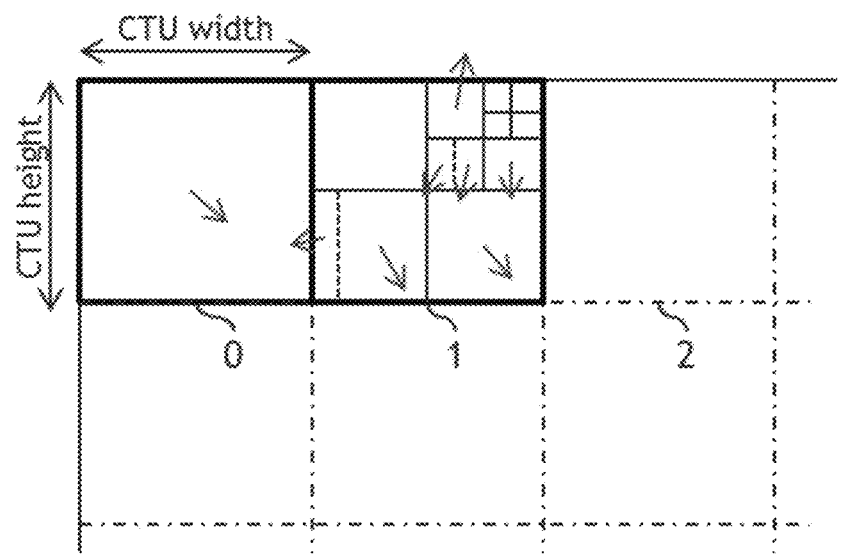
FIG. 3 illustrates a Coding Tree Unit (CTU) and Coding Tree concepts that can be used to represent a compressed picture.

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
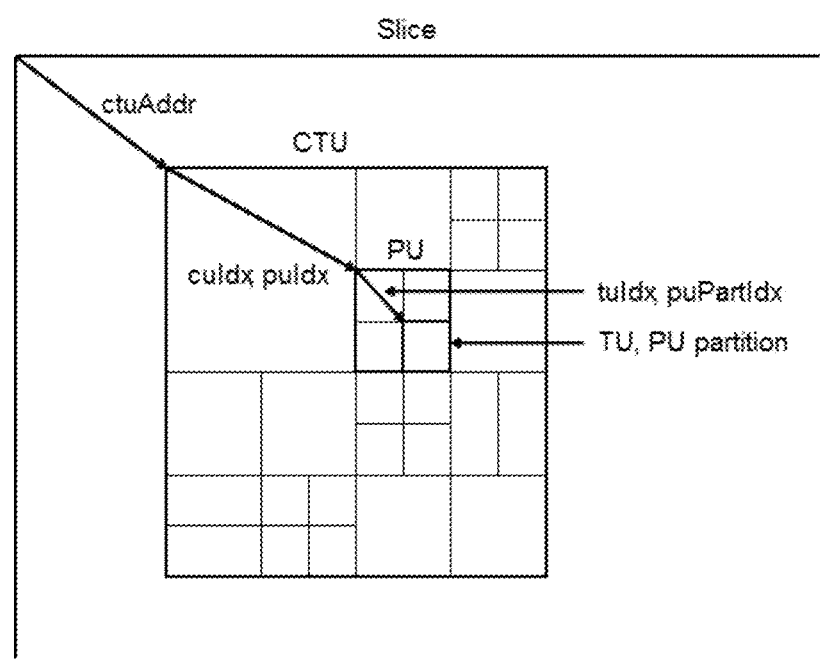
FIG. 4 illustrates a Coding Tree Unit (CTU) and division of a CTU into Coding Units (CU), Prediction Units (PU) and Transform Units (TU)

Each CU is then given some Intra or Inter prediction parameters or prediction information (Prediction Info). To do so, a CU is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units. For coding a CU, a prediction block or prediction unit (PU) is built from neighboring reconstructed samples (intra prediction) or from previously reconstructed pictures stored in the Decoded Pictures Buffer (DPB) (inter-prediction). Next, the residual samples calculated as the difference between original samples and PU samples, are transformed and quantized.

Exactly one Motion Vector (MV) is assigned to each PU in HEVC. This motion vector is used for motion compensated temporal prediction of the considered PU. Therefore, in HEVC, the motion model that links a predicted block and its reference block simply consists in a translation.

Two modes are employed in HEVC to encode the motion data. They are respectively called AMVP (Adaptive Motion Vector Prediction) and Merge. AMVP basically involves signaling the reference picture(s) used to predict the current PU, the Motion Vector Predictor index (taken among a list of two predictors) and a motion vector difference. The merge mode involves signaling and decoding the index of some motion data collected in a list of motion data predictors. The list is made of six candidates and is constructed the same way on the decoder and on the encoder sides. Therefore, the merge mode aims at deriving some motion information taken from the merge list. The merge list typically contains the motion information associated to some spatial and temporal surrounding blocks, available in their decoded state when the current PU is being processed.

Codecs and video compression tools other than HEVC, e.g. the Joint Exploration Model (JEM) and that developed by JVET (Joint Video Exploration Team) group in the Versatile Video Coding (VVC) reference software known as VVC Test Model (VTM), may provide for various modes and features different from or in addition to those of HEVC. For example, one or more aspects of the present disclosure will be explained with regard to VVC Draft 5 in a non-limiting manner. That is, explanation in the context of VVC Draft 5 is merely for ease of explanation. Aspects and embodiments described herein may apply in other contexts such as other standards, applications, hardware, software, etc.

Figure 5:
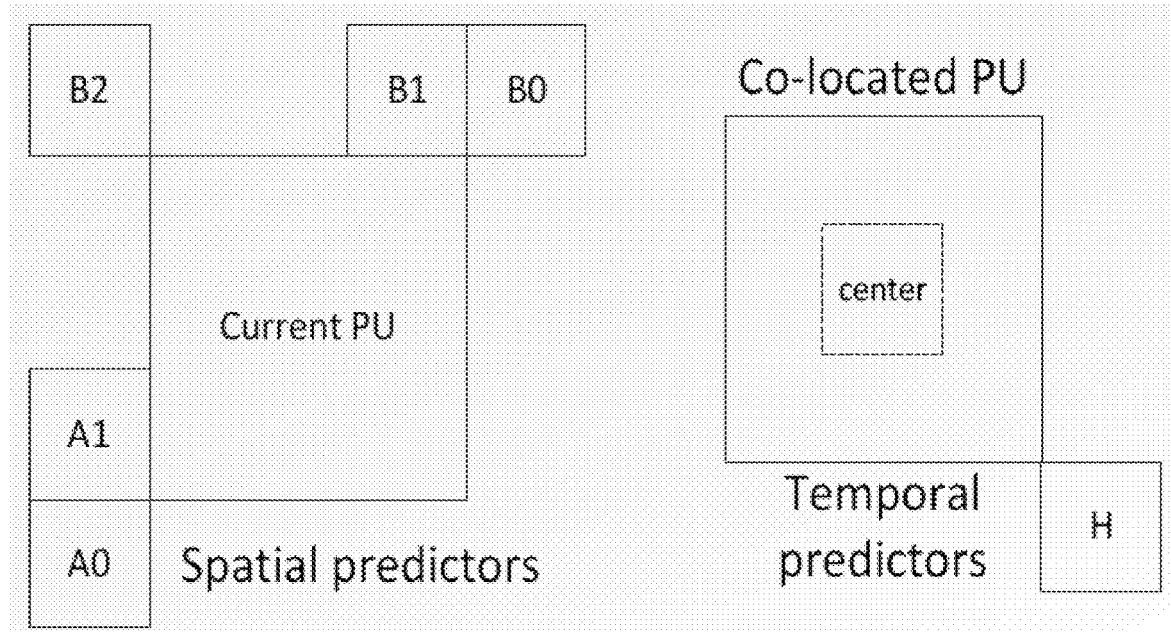
FIG. 5 illustrates an example of spatial and temporal motion vector prediction candidates in an AMVP mode such as that of VVC Draft 5.
Figure 6:
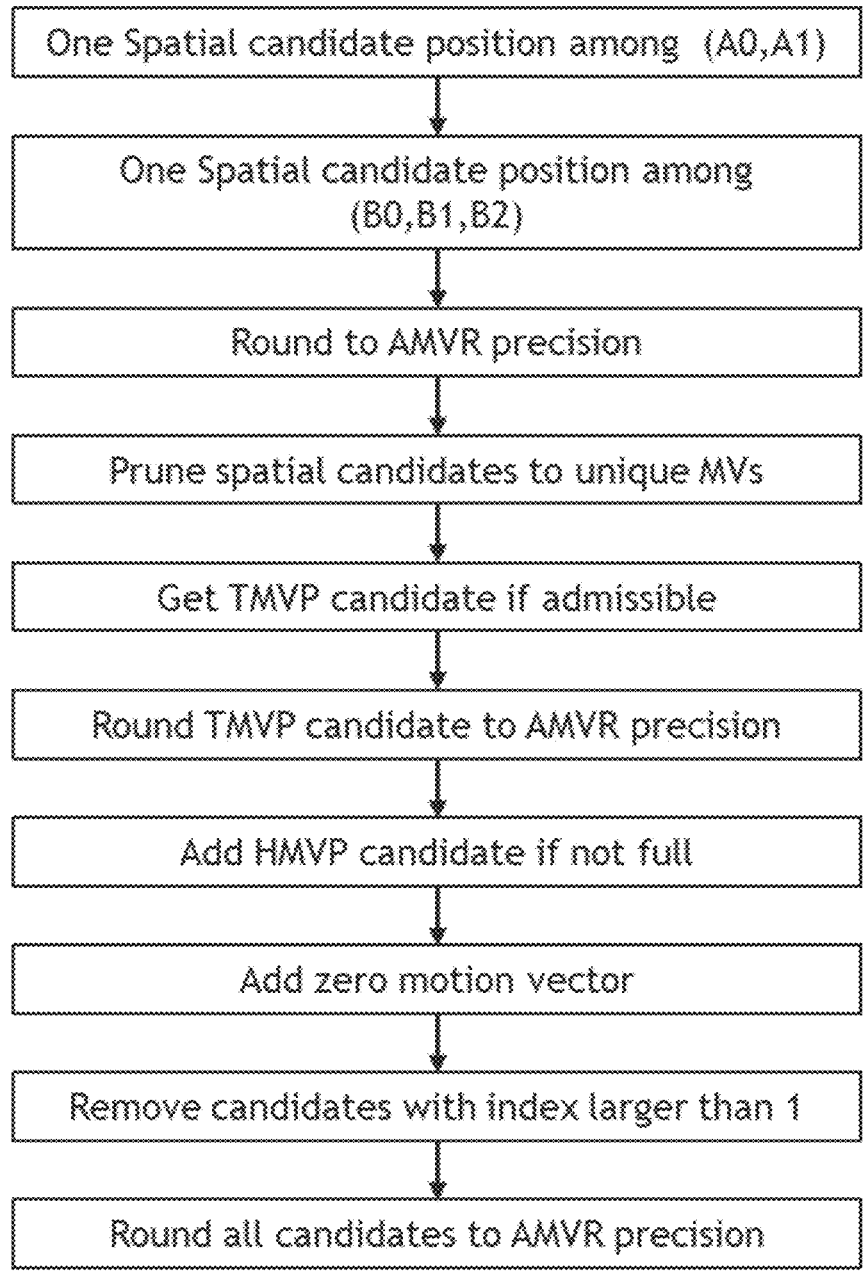
FIG. 6 illustrates computation of motion vector prediction candidates in an AMVP mode such as that of VVC Draft 5.

As for HEVC, AMVP mode of VVC Draft 5 involves two motion vector prediction candidates that can be used to predict a CU's motion information in AMVP mode. Spatial and temporal motion vector prediction candidates available in the AMVP mode of VVC Draft 5 are illustrated in FIG. 5. However, the process to construct the set of AMVP candidates is slightly different. First, a rounding of the computed candidate to the Motion Vector resolution associated for current CU is performed. This relates to the Adaptive Motion Vector Resolution (AMVR) tool of VVC draft 5, which is discussed further below. Moreover, an additional candidate, which is the History-based Motion Vector Predictor (HMVP), is considered after the TMVP candidate to fill the AMVP candidate list. The described process is illustrated in FIG. 6 which shows an example of computation of motion vector prediction candidates in the AMVP mode of VVC Draft 5. As can be seen, the HMVP candidate is considered after the temporal motion vector predictor (TMVP) in the AMVP candidate list construction process. It can also be noticed that the motion vector predictor candidates constructed in AMVP are being rounded to the precision level associated to the AMVR (Adaptive Motion Vector Resolution) associated to the coding unit currently being processed, at the last step of the process of FIG. 6. The AMVR coding tool of VVC is discussed further below.

As mentioned above, codecs and video compression tools other than HEVC may provide different or additional features. For example, VVC Draft 5 supports additional motion models beyond the translation model of HEVC to provide improved temporal prediction. To facilitate such additional models, a PU can be spatially divided into sub-PU and a more robust model can be used to assign a dedicated motion vector to each PU. For example, a motion model introduced in VVC is affine motion compensation which involves using an affine model to represent the motion vectors in a CU.

Figure 7:
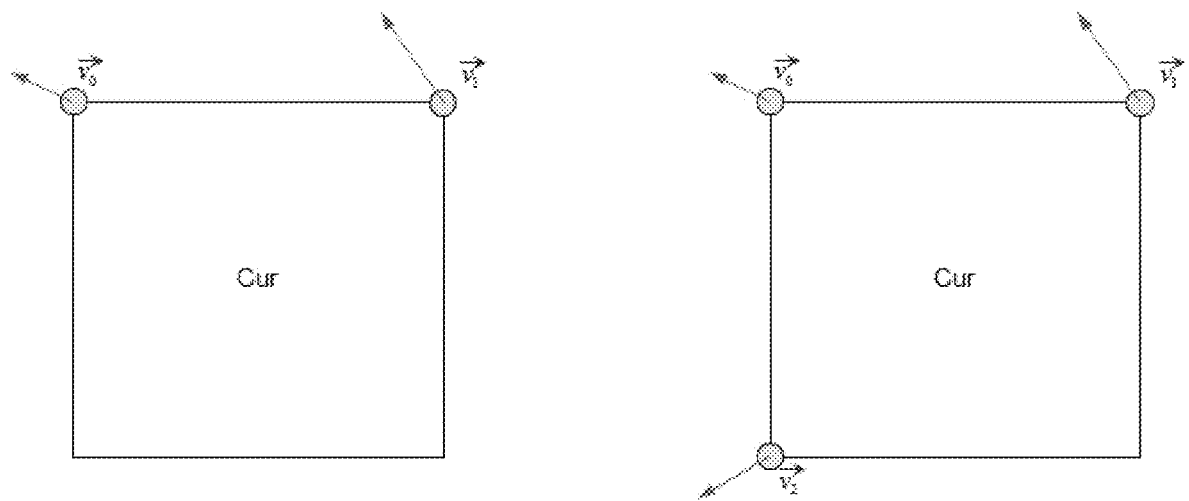
FIG. 7 illustrates examples of affine motion models.

The motion models used are illustrated by FIG. 7 for two control points (left side of FIG. 7) or three control points (right side of FIG. 7). The affine motion field for two control points, also called the 4-parameter affine model, involves the following motion vector component values for each position (x, y) inside the considered block:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation 1}$$

4−parameter affine model used to generate the motion field inside a $CU$ to predict where $(v_{0x}, v_{0y})$ and $(v_{1x}, v_{1y})$ are the so-called control point motion vectors used to generate the affine motion field, $(v_{0x}, v_{0y})$ is the motion vector top-left corner control point, and $(v_{1x}, v_{1y})$ is the motion vector top-right corner control point.

Equation 1 may be rewritten as Equation 2 based on affine model parameters a and b as defined by Equation 3:

$$\begin{cases} v_x = ax - by + v_{0x} \\ v_y = bx + ay + v_{0y} \end{cases} \quad \text{Equation 2}$$

4-parameter affine model used to represent the sub-block-based motion field of a CU coded in 4-parameter affine mode $$a = \frac{(v_{1x} - v_{0x})}{w} \quad b = \frac{(v_{1y} - v_{0y})}{w} \quad \text{Equation 3}$$

affine model parameters for a 4-parameter affine model

A model with three control points, called the 6-parameter affine motion model, can also be used to represent the sub-block-based motion field of a given coding unit. The motion field in the case of the 6-parameter affine model is computed as in Equations 4, 5 and 6:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad \text{Equation 4}$$

6-parameter affine motion field used to represent the sub-block-based motion field of a CU coded in 6-parameter affine mode $$\begin{cases} v_x = ax + cy + v_{0x} \\ v_y = bx + dy + v_{0y} \end{cases} \quad \text{Equation 5}$$

alternative expression of the 6-parameter affine motion field $$c = \frac{(v_{2,x} - v_{0,x})}{h} \quad d = \frac{(v_{2,y} - v_{0,y})}{h} \quad \text{Equation 6}$$

affine model parameters for a 6-parameter affine model

Figure 8:
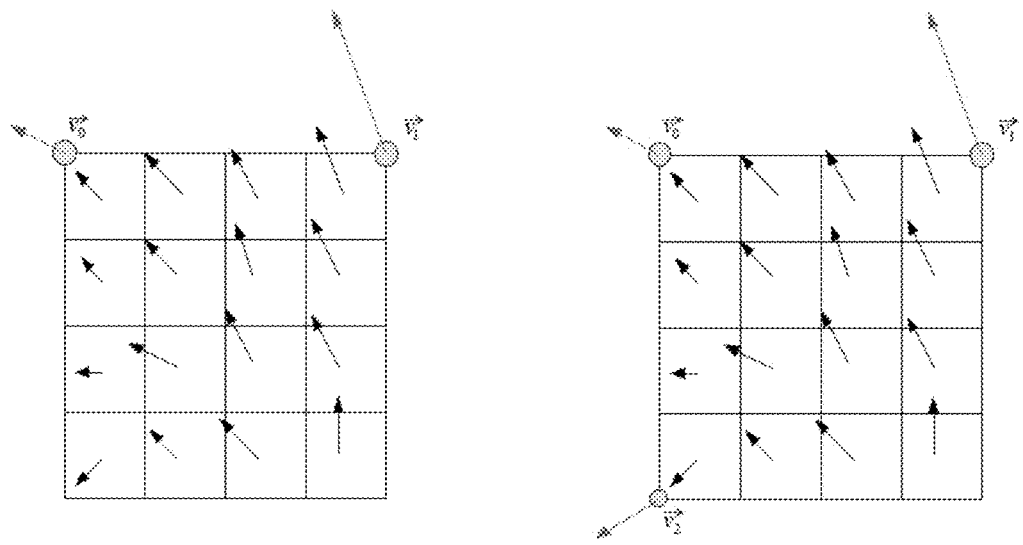
FIG. 8 illustrates examples of 4×4 sub-CU based affine motion vector fields.

In practice, to keep complexity reasonable, the same motion vector is computed for each sample of a 4×4 sub-block (sub-CU) of the considered CU, as illustrated in FIG. 8 which shows 4×4 sub-CU based affine motion vector fields for a two control point model (left side of FIG. 8) and a three control point model (right side of FIG. 8). An affine motion vector is computed from the control point motion vectors, at the position of the center of each sub-block. The obtained motion vector (MV) is represented at 1/16-pel accuracy.

In VVC Draft 5, a CU, having a size larger than 8×8, can be predicted in Affine AMVP mode. This is signaled through a flag in the bit-stream coded at CU level. The generation of the Affine Motion Field for that inter CU includes determining control point motion vectors (CPMV), which are obtained by the decoder through the addition of a motion vector difference plus a control point motion vector prediction (CPMVP). The CPMVP is a pair (for a 4-parameters affine model specified by 2 control point motion vectors) or a triplet (for a 6-parameters affine model specified by 3 control point motion vectors) of motion vectors which serve as predictors of the CPMV of the current CU.

Figure 9:
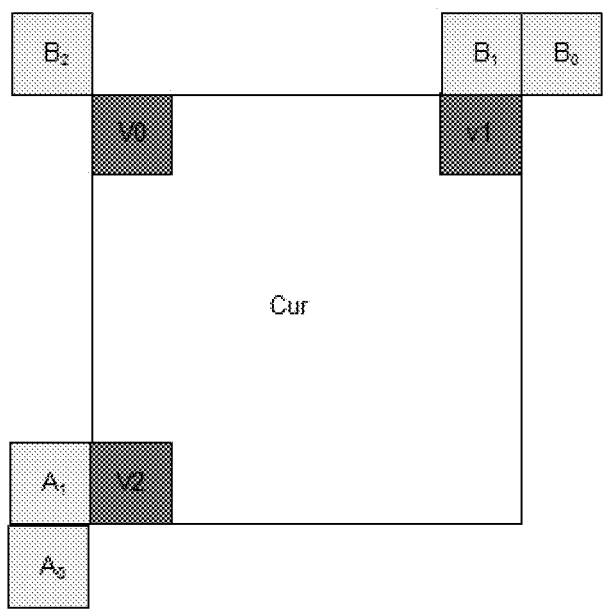
FIG. 9 illustrates an example of spatial positions ($A_0$, $A_1$, $B_0$, $B_1$ and $B_2$) from which CPMV prediction candidates are retrieved to predict the affine model of a current CU in an Affine AMVP mode such as that of VTM Draft 3.

The CPMVP of current CU can be inherited from affine neighboring CUs (as in the Affine Merge mode). The spatial position from which inherited CPMVP are retrieved are illustrated by FIG. 9 which shows spatial positions ($A_0, A_1, B_0, B_1$ and $B_2$) from which CPMV prediction candidates are retrieved to predict the affine model of current CU in Affine AMVP as in, for example, VTM Draft 3. An inherited CPMVP is considered as valid if its reference picture is equal to the reference picture of the current CU.

Figure 10:
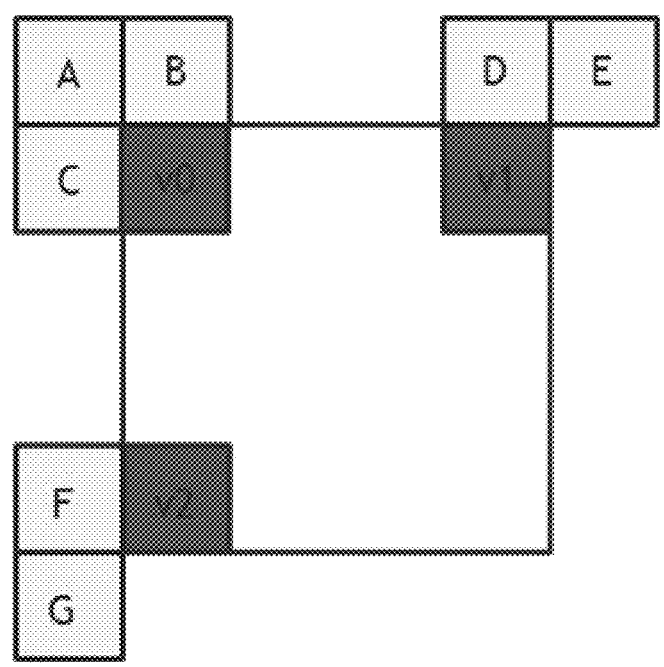
FIG. 10 illustrates a motion vector prediction process for Affine AMVP CUs such as that of VTM.
Figure 11:
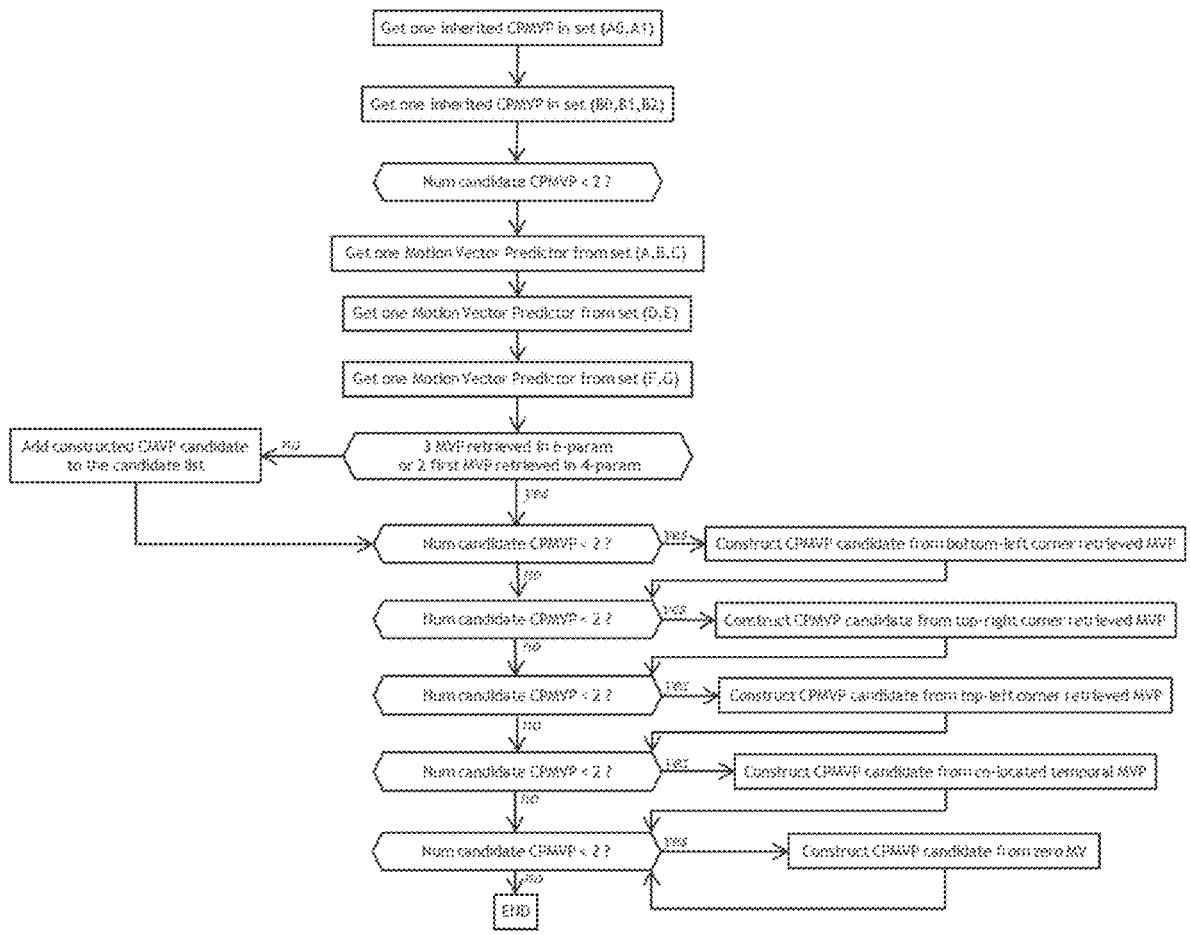
FIG. 11 illustrates an example of constructing the list of CPMVP candidates in an affine AMVP mode.

Affine AMVP candidates can also be constructed from non-affine motion vectors. This is achieved by taking a motion vector predictor respectively in each set (A, B, C) and (D, E) and/or (F, G) as illustrated in FIG. 10 which shows motion vector prediction for affine AMVP CUs such as in the VTM. A more detailed example of constructing a list of CPMVP candidates in Affine AMVP is illustrated in FIG. 11.

Another example of a motion compensation tool is the Intra Block Copy tool (IBC) contained available in VVC Draft 5. It is a CU level intra coding mode that involves assigning a so-called block vector to a considered CU. The block vector indicates the displacement between the current CU and a reference block, which is an already-reconstructed block of samples inside the current picture.

The Adaptive Motion Vector Resolution (AMVR) coding tool of VVC Draft 5 provides means for signaling the motion vector difference (MVd) between a CU's motion vector and its motion vector predictor at various accuracy (or precision, or resolution) levels. In HEVC, a slice header flag (use_integer_mv_flag) indicates if MVds are coded at quarter-pel accuracy or integer-pel accuracy. This means all CUs in the considered slice are coded/decoded with same MVd accuracy level. In VVC Draft 5, some CU-level information may be signaled to indicate the resolution of the CU's MVd information. AMVR may be applied to CUs coded in normal AMVP or affine AMVP modes.

In normal AMVP mode, the supported MVd resolution levels are quarter-luma-sample, integer-luma-sample or four-luma-sample. In affine AMVP mode, the supported MVd resolution levels are quarter-luma-sample, integer-luma-sample or 1/16-luma-sample. The signaling of AMVR information on the CU level involves a first flag, which indicates the use of quarter-luma-sample accuracy for the MVd information. If quarter-luma-sample precision is not used, then a second flag indicates the use of integer-luma-sample or 4-luma-sample accuracy level in normal AMVP mode. In case of affine AMVP mode, the second flag indicates the use of integer-luma-sample or 1/16-luma-sample accuracy level. Finally, as illustrated by the example shown in FIG. 6, the motion vector predictor is rounded to the same AMVR precision as that of the MVd, to ensure the reconstructed motion vector has the desired precision level.

With respect to the IBC (Intra Block Copy) intra coding mode, the motion vector precision may be 1-luma-sample resolution or 4-luma-sample resolution, according to the signaled amvr_precision_flag signaled for an IBC-coded CU.

Figure 12:
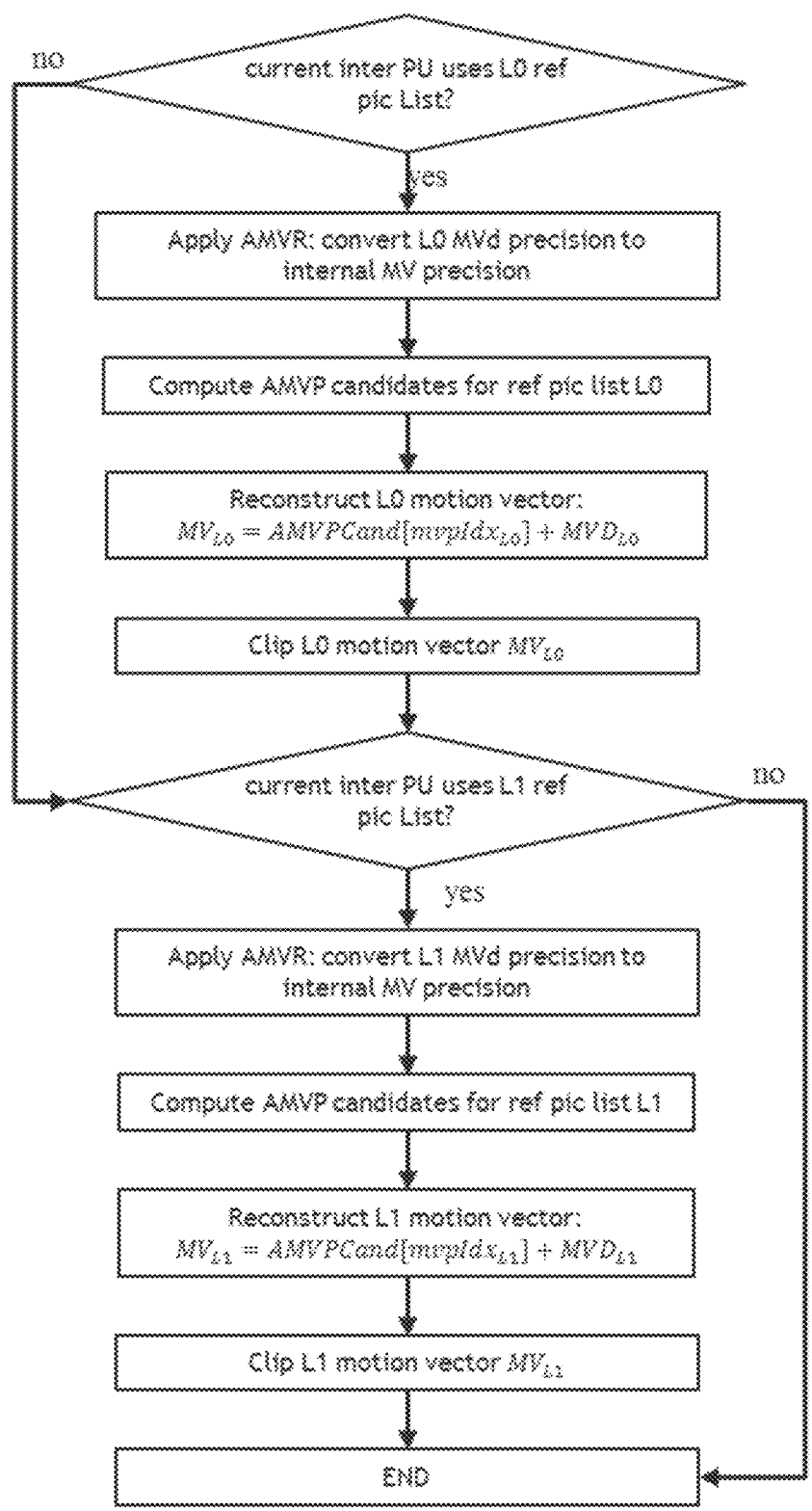
FIGS. 12 through 27 illustrate examples of various aspects, embodiments and features in accordance with the present disclosure.

FIG. 12 illustrates an example of reconstruction of motion information of a CU in AMVP and AMVR mode according to VVC Draft 5. More specifically, the example shown in FIG. 12 illustrates a process for reconstruction of motion vectors for an input CU that would be coded in translational AMVP mode (as opposed to affine AMVP mode) with AMVR active for this CU. This process takes place on the decoder side. The input to this process is a coding unit that has been parsed.

The process illustrated in FIG. 12 starts by testing if the current CU employs temporal prediction from a reference picture contained in the L0 reference picture list. If so, then the four following steps apply.

The reverse process of the AMVR process is applied. This involves converting the parsed MVd (motion vector difference) associated to the L0 reference picture, to the internal precision used by the decoder to represent motion data.

The next step involves computing the AMVP candidates list for reference picture L0 for current CU. This follows the process already explained with reference to FIG. 6. Once this is done, the motion vector predictor for current CU in current reference picture list is known and is noted AMVPCand [mvpIdx$_{L0}$], where mupIdx$_{L0}$ is the index of the MV predictor candidate used for current CU, and which results from the parsing process.

The next step reconstructs the motion vector of current CU in current reference picture list, as the sum of the MV predictor and the parsed Motion Vector difference.

Next, the reconstructed motion vector is clipped according to the internal representation of the motion vector in the considered codec.

The next step of the process tests if the current block employs temporal prediction from a reference picture contained in reference picture list L1. If so, then the same process as above is applied, but in the case of reference picture list L1. As a result of the process of FIG. 12, two reconstructed motion vectors MV$_{L0}$ and MV$_{L1}$ are obtained for current inter CU and are used afterwards for the motion compensated temporal prediction of current CU.

In general, an aspect of the present disclosure involves increasing the compression efficiency of approaches such as those of VVC Draft 5 described above, e.g., the coding gain provided by the AMVR tool. For example, the existing AMVR tool of VVC Draft 5 involves selecting a resolution level of the MVd coding, commonly for both x- and y-coordinates. In general, at least one example of an embodiment described herein provides increased flexibility in the AMVR tool. As an example, at least one embodiment provides for different accuracy levels between the x- and y-values of the coded motion vector difference (MVd). As another example, at least one embodiment provides for different accuracy levels between the L0 and L1 motion vector difference coding, in the case of a bi-predicted coding unit.

In general, at least one example of an embodiment described herein (referred to herein as embodiment 1) involves differentiating the resolution of the two components of a block vector in the case of an IBC-coded coding unit.

Figure 13:
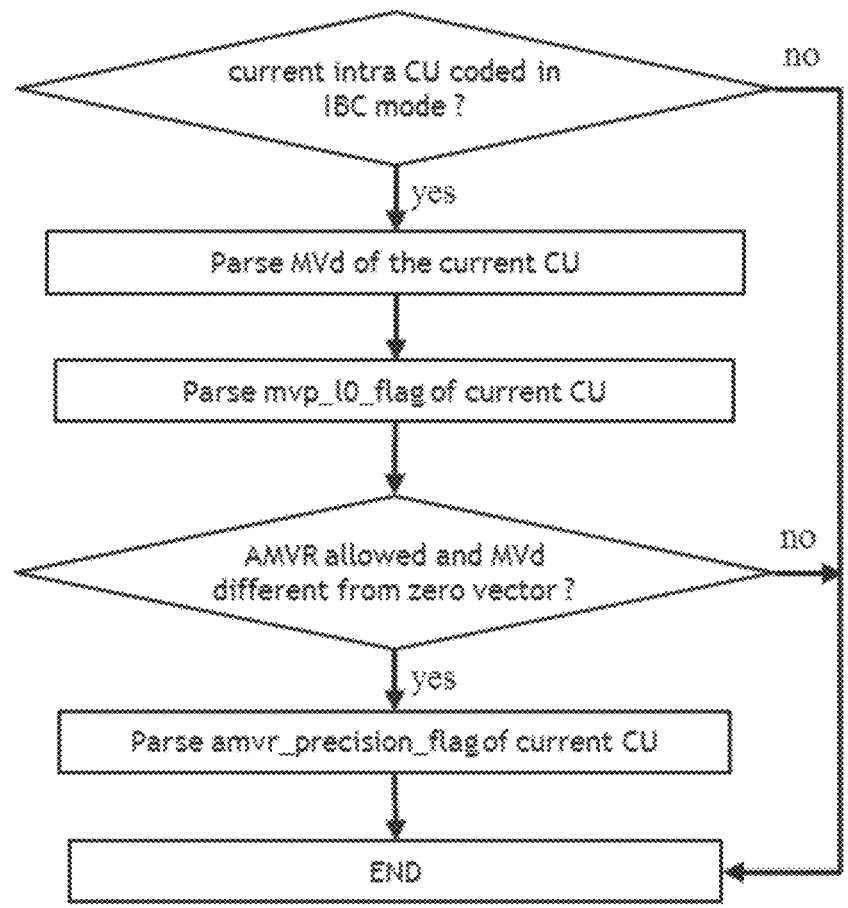

An example of the parsing of the motion data of a CU that is coded in IBC mode is illustrated in FIG. 13. It involves parsing the MVd (motion vector difference) of the current CU, then a flag associated with the current CU, e.g., a flag designated mvp_l0_flag, indicates which MV predictor is used to code current CU's block vector. If AMVR is allowed for the current CU, a flag associated with the current CU is parsed, e.g., a flag designated amvr_precision_flag, to obtain an indication of whether the default 1-luma-sample MV resolution is used for current CU, or if the 4-luma-pel resolution is used.

Figure 14:
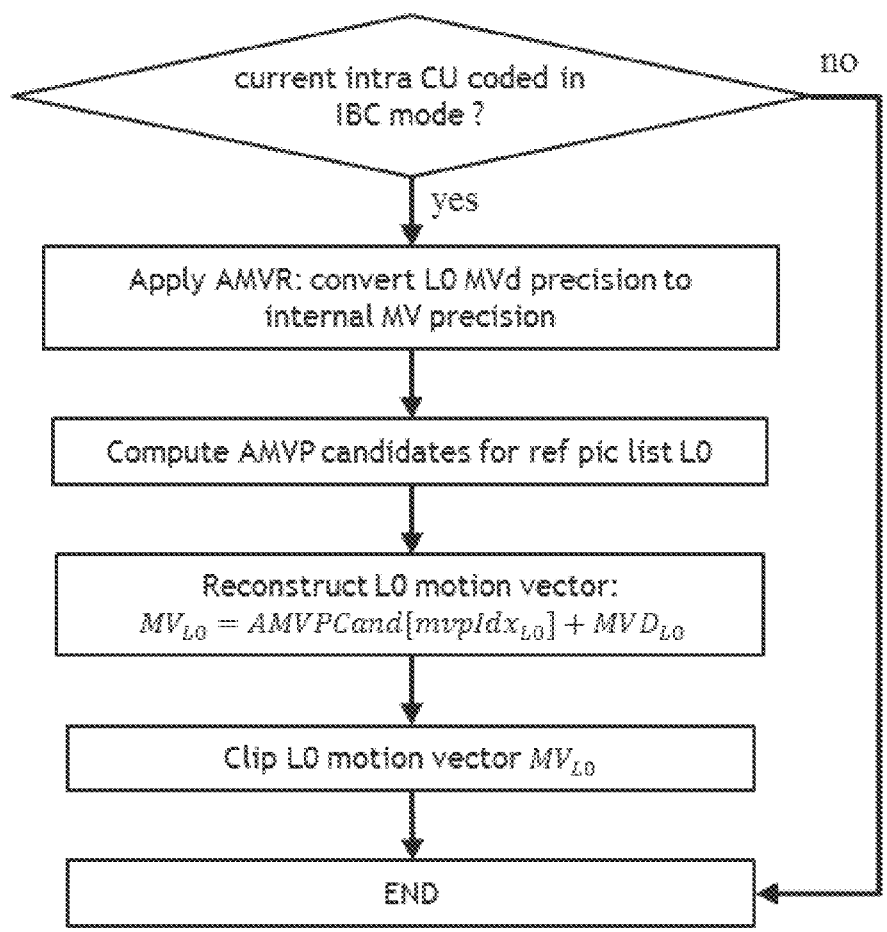

An example of the decoder reconstruction of the motion data of a CU that is coded in IBC mode according to VVC draft 5 is depicted by FIG. 14. The example in FIG. 14 involves applying the decoder side AMVR process, by converting the parsed MVd vector of the current CU from the coded AMVR precision level to the internal precision for motion vector representation. Then, the block vector of the current CU is reconstructed by adding the MV predictor used for current CU and the internal-precision-converted motion vector difference (MVd). Next, the reconstructed MV is clipped to provide a valid MV representation, e.g., valid in accordance with VVC Draft 5.

Figure 15:
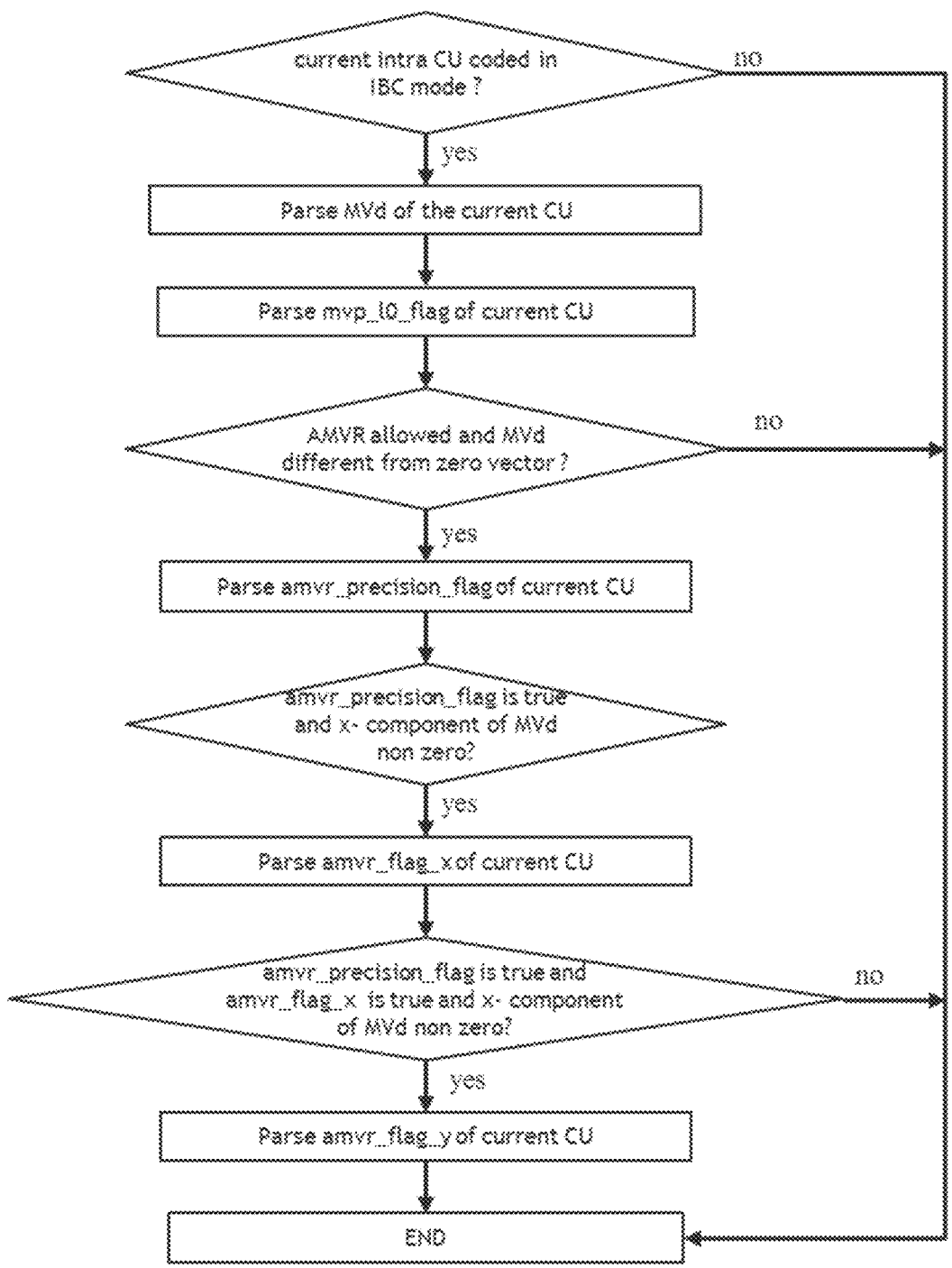

An example of parsing of the motion data of a CU that is coded in IBC mode in accordance with the present embodiment is illustrated in FIG. 15. The example involves parsing the MVd (motion vector difference) of current CU and then a flag associated with the current CU, e.g., a flag designated mvp_l0_flag, indicates which MV predictor is used to code the current CU's block vector. Then, in case AMVR is allowed for current CU, a flag associated with the current CU, e.g., a flag designated amvr_precision_flag, is parsed to obtain an indication of whether the default 1-luma-sample MV resolution is used for current CU, or if the 4-luma-pel resolution is used, for the x- or y-component of the coded MVd. Next, if this flag is true and the x-component of the coded MVd is non-zero, then a flag is parsed, e.g., a flag designated amvr_flag_x, to obtain an indication of whether the x-component of current MVd is signaled in default 1-luma-sample precision level, or with 4-luma-sample precision level. Next, in case both flags, e.g., amvr_precision_flag and amvr_flag_x, are true, then a flag is parsed, e.g., a flag designated amvr_flag_y, to obtain an indication of whether the y-component of current MVd is signaled in default 1-luma-sample precision level, or with 4-luma-sample precision level. Otherwise, if amvr_precision_flag is true and amvr_flag_x is false, then amvr_flag_y is inferred to true. Finally, in case amvr_precision_flag is false, both amvr_flag_x and amvr_flag_y are inferred to false.

Figure 16:
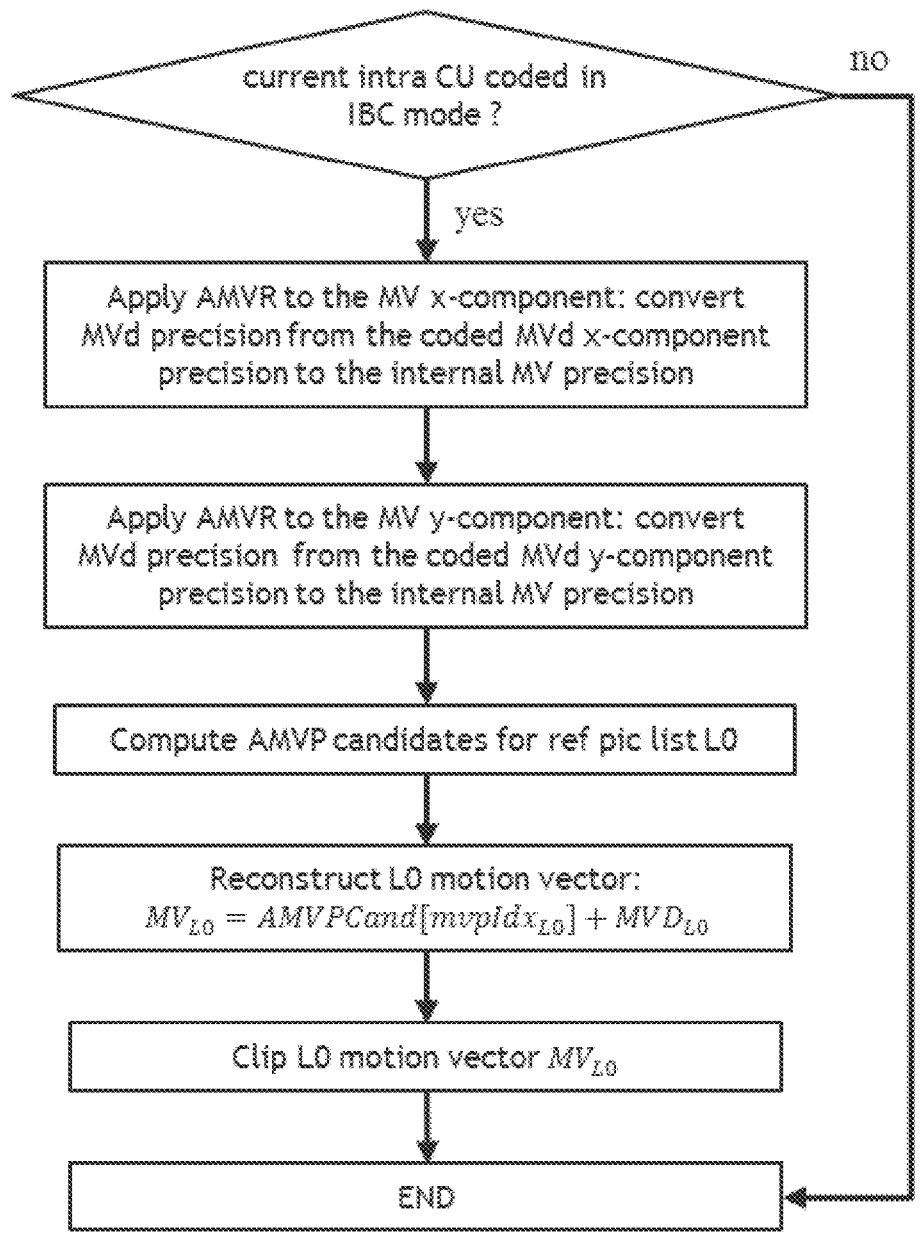

An example of the decoder reconstruction of the motion data of a CU that is coded in IBC mode in accordance with the present embodiment is illustrated in FIG. 16. The example involves applying the decoder side AMVR process, by converting first the x-component of the parsed MVd vector of current CU from the coded AMVR precision level for x-component to the internal precision for motion vector representation. Then it applies the decoder side AMVR process for y-component, by converting the y-component of the parsed MVd vector of current CU from the coded AMVR precision level for y-component to the internal precision for motion vector representation. Then the block vector of current CU is reconstructed by adding the MV predictor used for current CU and the internal-precision-converted motion vector difference (MVd). Next, the reconstructed MV is clipped to provide a valid MV representation, e.g., valid in accordance with VVC Draft 5.

An example of coding_unit syntax structure suitable for implementing the current example of an embodiment (embodiment 1) is shown in Syntax Structure Listing 1 appended to the present document.

In general, at least one other example of an embodiment described herein (referred to herein as embodiment 2) involves decoupled resolution in x- and y-motion vector components in the case of translational AMVP motion compensation.

Figure 17:
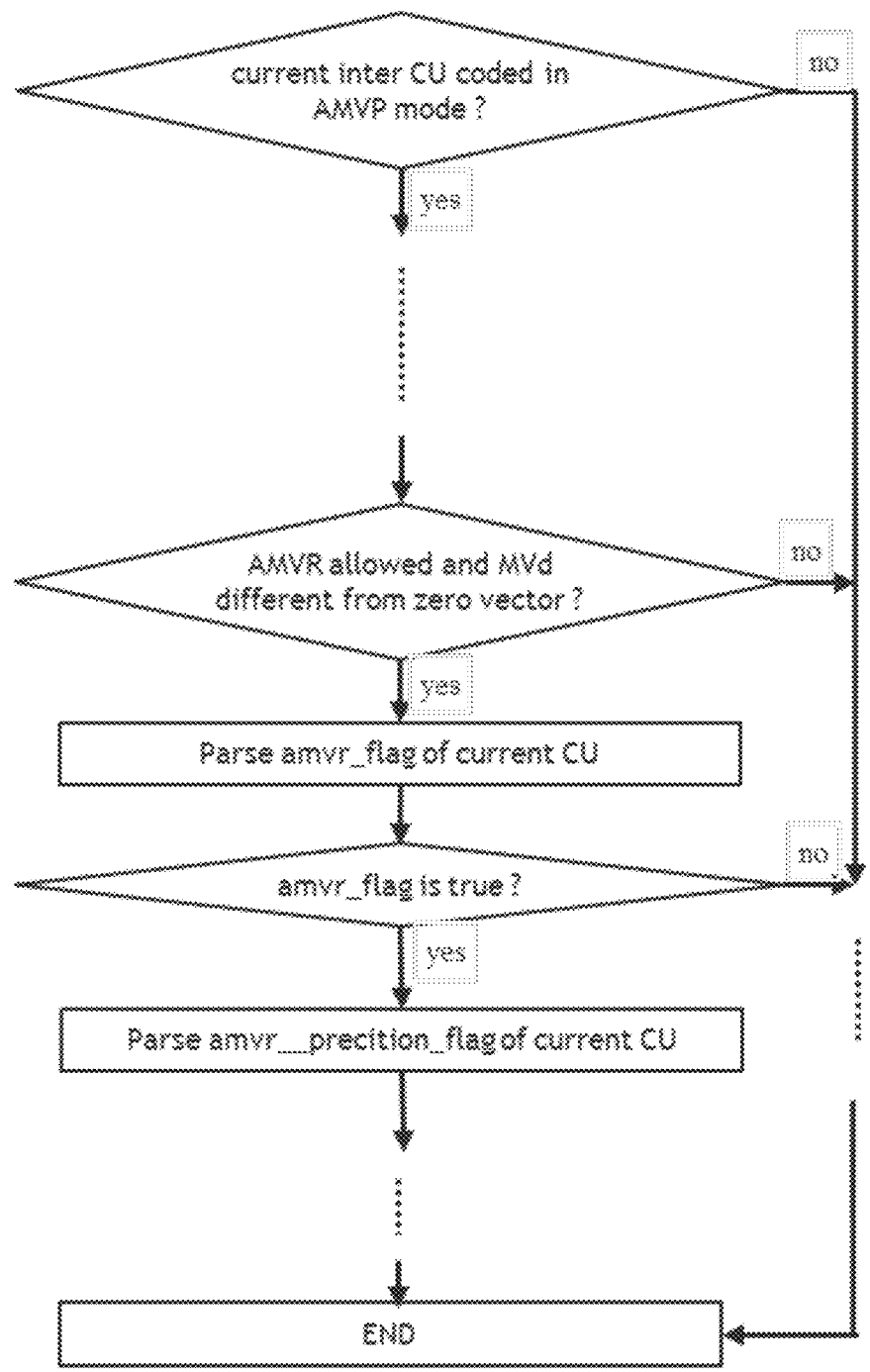

The parsing of the AMVR data of a CU that is coded in AMVP mode, e.g., according to VVC Draft 5, is depicted by FIG. 17. It involves parsing a first flag associated with the current CU, e.g., a flag designated amvr_flag, and then a second flag associated with the current CU, e.g., a flag designated the amvr_precision_flag, in case the first flag is true. The first flag, e.g., the amvr_flag syntax element, indicates if default ¼-luma-sample precision level is used to code the MV data of current CU. Then, if the first flag is true, the second flag associated with the current CU, e.g., the amvr_precision_flag, is parsed to indicate if the default 1-luma-sample or 4-luma-sample MV resolution is used for the current CU.

Figure 18:
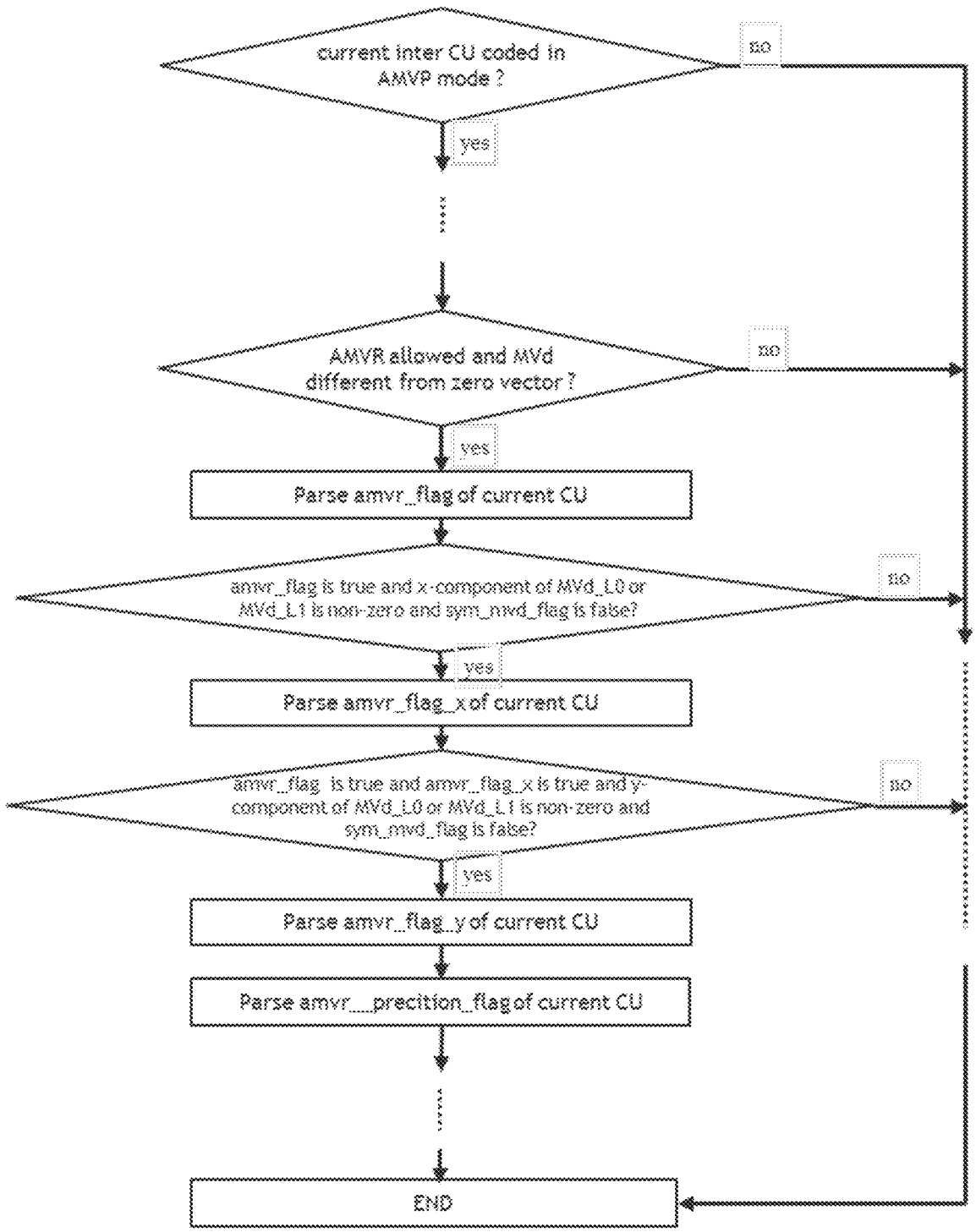

An example of the parsing of the AMVR data of a CU that is coded in AMVP mode, in accordance with the present embodiment is illustrated in FIG. 18 and involves parsing a flag associated with the current CU, e.g., a flag designated amvr_flag. Then, in case amvr_flag is true and the decoded x-component of the L0 or L1 list MVd is non-zero, another flag is parsed, e.g., designated amvr_flag_x, to indicate if the x-component of current MVd is signaled in default ¼-luma-sample precision level or not. Next, in case both flags amvr_precision_flag and amvr_flag_x are true, then another flag, e.g., a flag designated amvr_flag_y, is parsed to indicate if the y-component of current MVd is signaled in default ¼-luma-sample precision level, or not. Otherwise, if amvr_precision_flag is true and amvr_flag_x is false, then amvr_flag_y is inferred to true. Other cases exist as follows:

- if the amvr_precision_flag is false, both amvr_flag_x and amvr_flag_y are inferred to be false;
- if the amvr_flag is true, the amvr_precision_flag of current CU indicates if the default 1-luma-sample or 4-luma-sample MV resolution is used for current CU;
- if amvr_flag_x is true, then the precision level used for the x-component of the MVd is the precision level indicated by amvr_flag and amvr_precision_flag;
- if amvr_flag_y is true, then the precision level used for the y-component of the MVd is the precision level indicated by amvr_flag and amvr_precision_flag.

Figure 19:
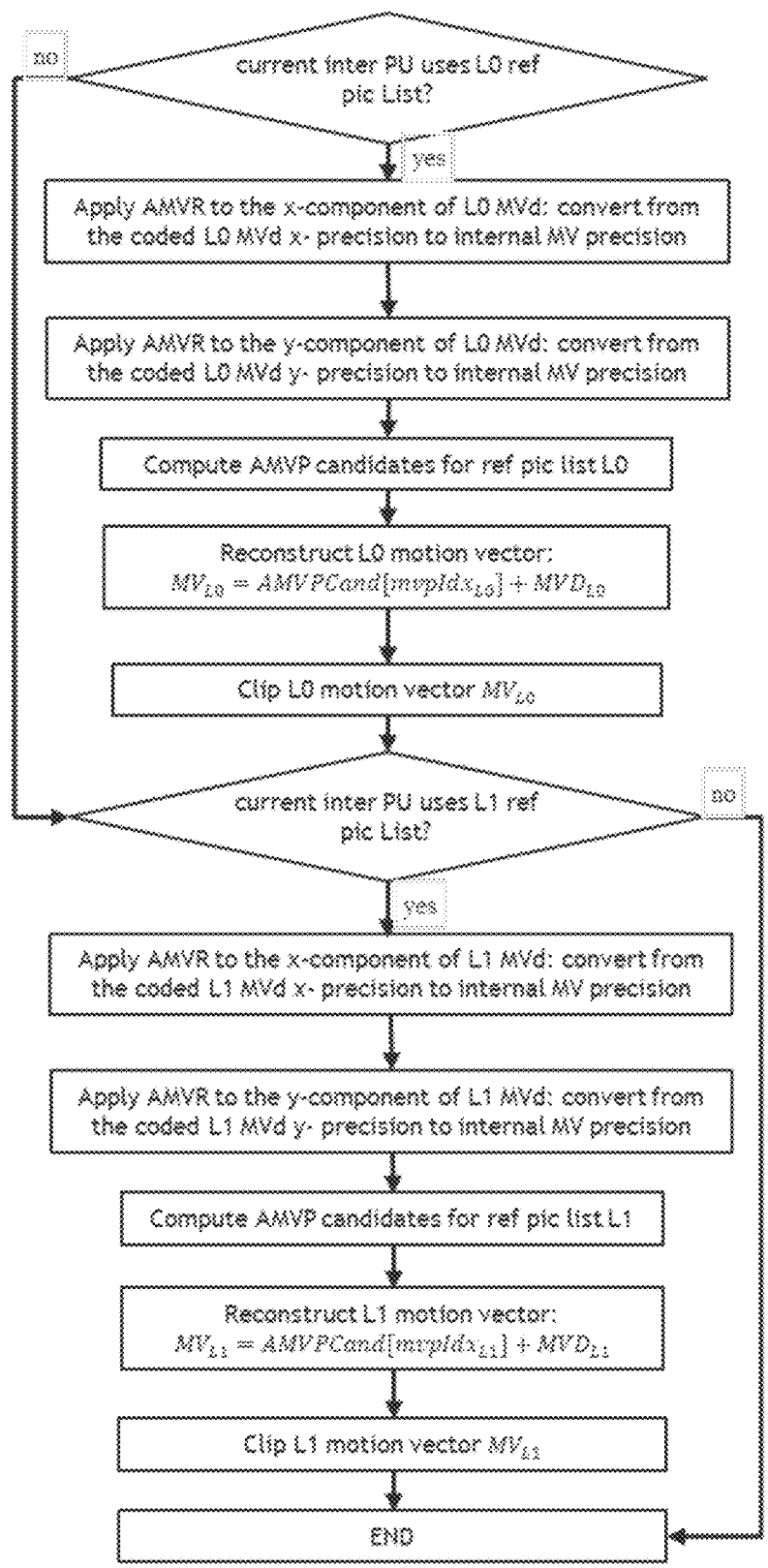

FIG. 19 illustrates an example of the reconstruction of motion vectors, for an input CU that would be coded in translational AMVP mode (as opposed to affine AMVP mode), with AMVR active for this CU, in the present embodiment. This process takes place on the decoder side. The input to this process is a coding unit that has been parsed.

The example in FIG. 19 begins by testing if the current CU employs temporal prediction from a reference picture contained in the L0 reference picture list. If so, then the four following steps apply.

The reverse process of the AMVR process is applied on the x-component of the coded MVd. This involves converting the x-component of the parsed MVd (motion vector difference) associated to the L0 reference picture, from the precision level for the coding of the x-component of L0 list Mvd, to the internal precision used by the decoder to represent motion data.

Next, the reverse process of the AMVR process is applied on the y-component of the coded MVd. This involves converting the y-component of the parsed MVd (motion vector difference) associated to the L0 reference picture, from the precision level for the coding of the y-component of L0 list MVd, to the internal precision used by the decoder to represent motion data.

Next, the AMVP candidate lists for reference picture L0 for current CU are computed. This follows the process already explained with reference to FIG. 6. Once this is done, the motion vector predictor for the current CU in the current reference picture list is known and is noted AMVPCand [mvpIdx$_{L0}$], where mupIdx$_{L0}$ is the index of the MV predictor candidate used for the current CU, and which results from the parsing process.

Next, the motion vector of current CU in current reference picture list is reconstructed as the sum of the MV predictor and the parsed and per-component-precision-converted Motion Vector difference.

Finally, the reconstructed motion vector is clipped according to the internal representation of motion vector in the considered codec.

Next, the example of FIG. 19 tests if the current block employs temporal prediction from a reference picture contained in reference picture list L1. If so, then the same process as above is applied, but in the case of reference picture list L1.

As a result, the example of FIG. 19 obtains two reconstructed motion vectors $MV_{L0}$ and $MV_{L1}$ for the current inter CU and are used afterwards for the motion compensated temporal prediction of the current CU.

An example of a coding_unit syntax structure suitable for implementing the current example of an embodiment (embodiment 2) is shown in Syntax Structure Listing 2 appended to the present document.

Figure 20:
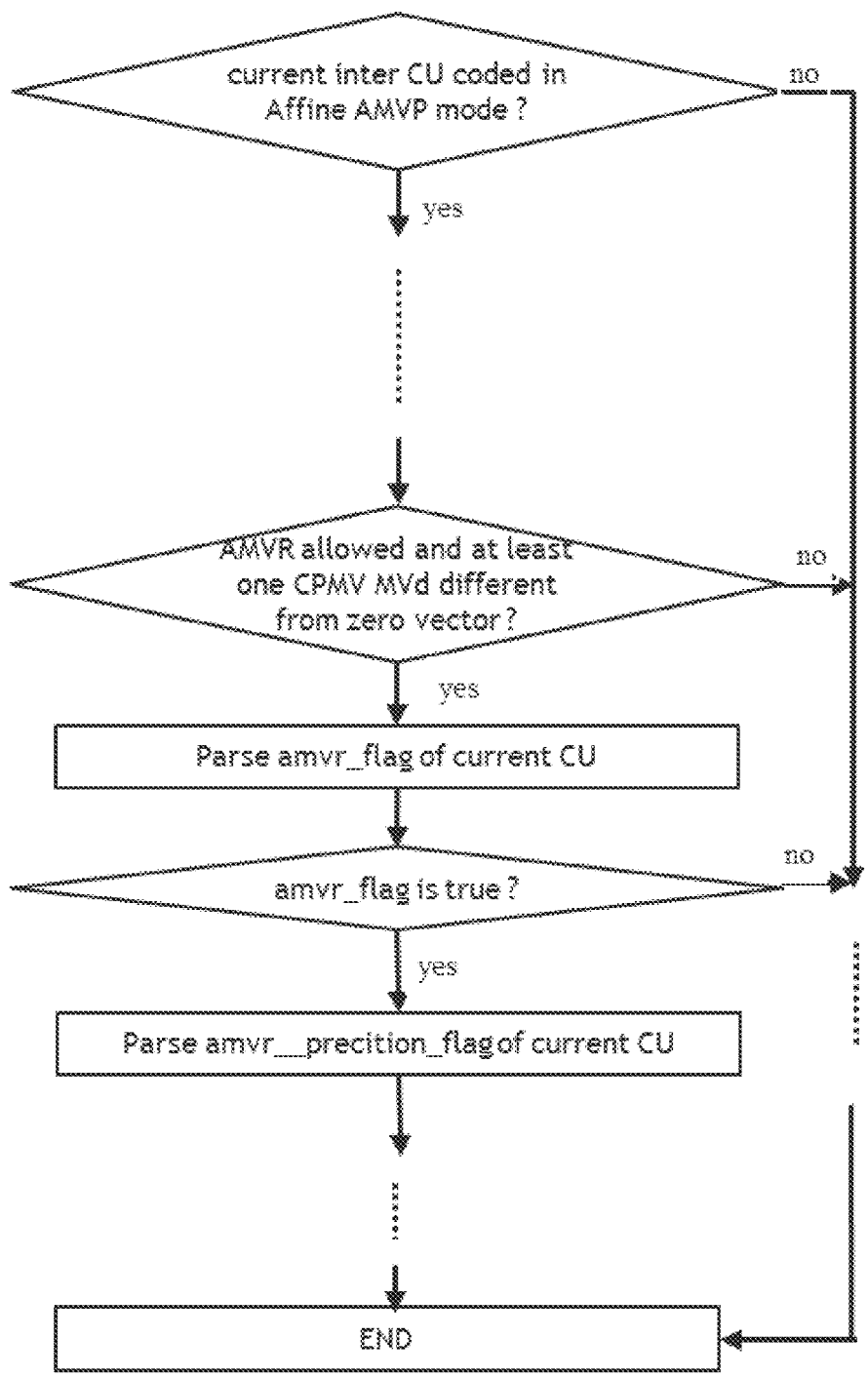

In general, at least one other example of an embodiment described herein (referred to herein as embodiment 3) involves decoupled resolution in x- and y-motion vector components in the case of affine motion compensation. An example of the parsing of the AMVR data of a CU that is coded in Affine AMVP mode, e.g., according to VVC Draft 5, is illustrated in FIG. 20. The example of FIG. 20 involves parsing a flag, e.g., designated amvr_flag, of the current CU in case at least one control point motion vector has an associated MVd that is non-zero. Then, if amvr_flag is true, another flag, e.g., designated amvr_precision_flag, of current CU is parsed. The amvr_flag syntax element indicates if default ¼-luma-sample precision level is used to code the MV data of current CU. Then in case amvr_flag is true, the flag amvr_precision_flag of current CU is parsed. It indicates if the 1-luma-sample or 4-luma-sample MV resolution is used for current CU.

Figure 21:
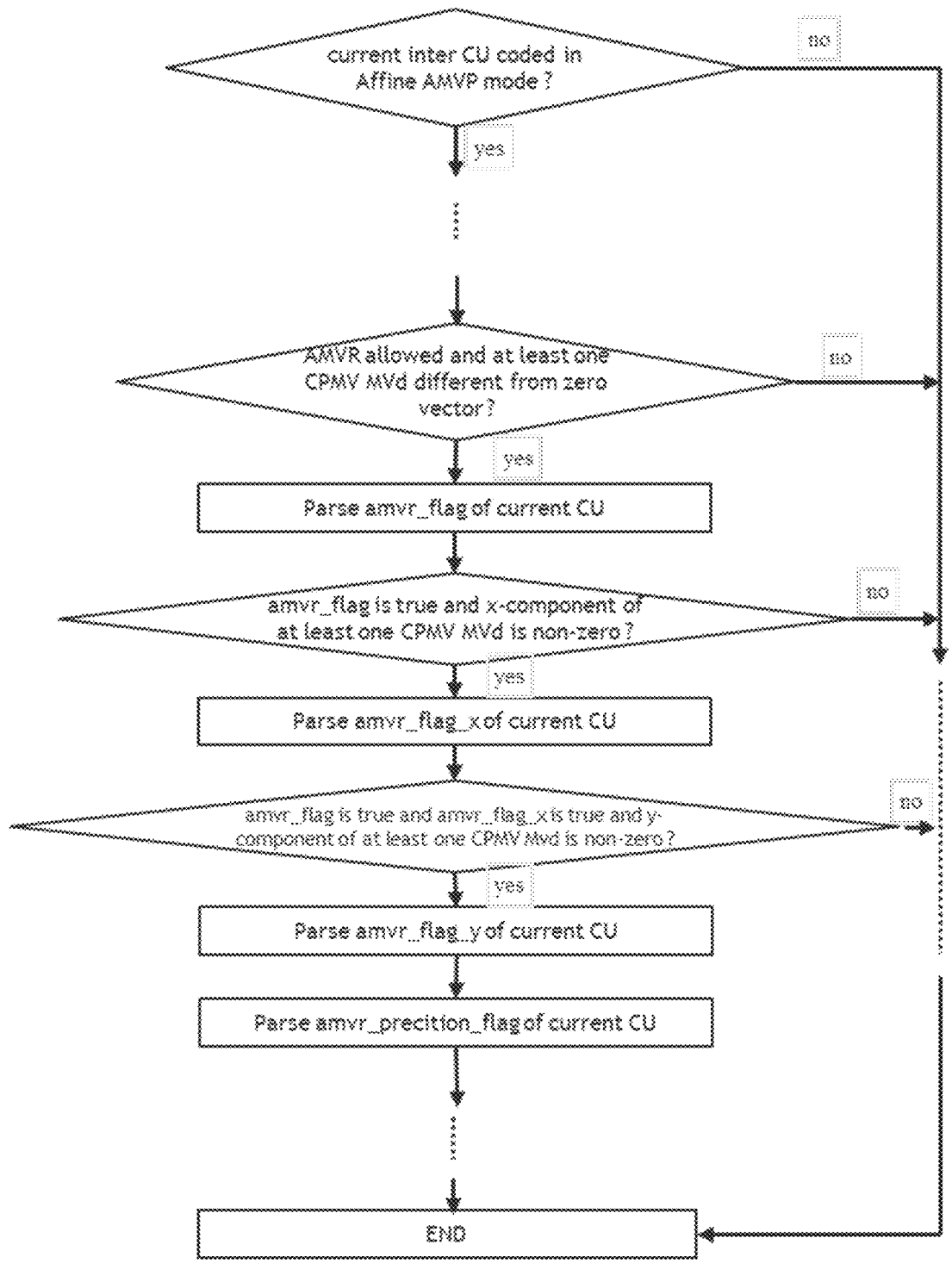

An example of the parsing of the AMVR data of a CU that is coded in Affine AMVP mode, according to the present embodiment, is illustrated in FIG. 21. The example of FIG. 21 involves parsing a flag, e.g., designated amvr_flag, associated with the current CU. Then, in case amvr_flag is true and the decoded x-component of the L0 or L1 list MVd is non-zero for at least one CPMV of current CU, another flag, e.g., designated amvr_flag_x, is parsed. It indicates if the x-component of MVd of each CPMV is signaled in default ¼-luma-sample precision level or not. Next, in case both flags amvr_precision_flag and amvr_flag_x are true, then another flag, e.g., designated amvr_flag_y, is parsed. It indicates if the y-component of current MVd is signaled in default ¼-luma-sample precision level for each CPMV, or not. Otherwise, if amvr_precision_flag is true and amvr_flag_x is false, then amvr_flag_y is inferred to true. Finally, in case amvr_precision_flag is false, both amvr_flag_x and amvr_flag_y are inferred to false.

Other examples of combinations of flag values and the associated interpretation in accordance with the present embodiment include the following. If amvr_flag is true then the amvr_precision_flag of current CU indicates if the default 1-luma-sample or 4-luma-sample MV resolution is used for current CU. If amvr_flag_x is true then the precision level used for the x-component of the MVd of each CPMV is the precision level indicated by amvr_flag and amvr_precision_flag. If amvr_flag_y is true, then the precision level used for the y-component of the MVd of each CPMV is the precision level indicated by amvr_flag and amvr_precision_flag.

Figure 22:
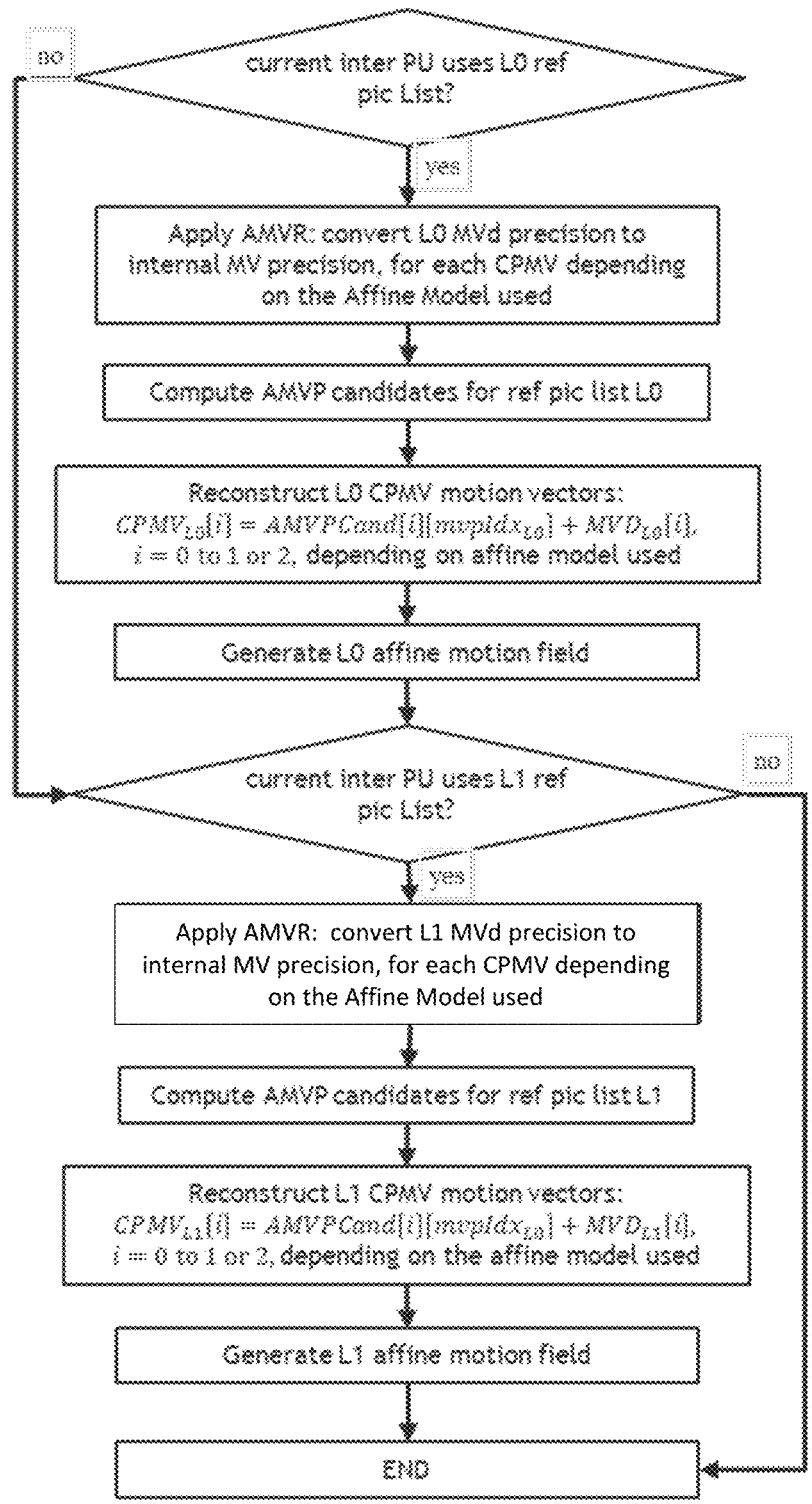

FIG. 22 illustrates an example of the reconstruction of motion vectors, for an input CU that would be coded in affine AMVP mode (as opposed to translation AMVP mode), with AMVR active for this CU, e.g., in accordance with VVC Draft 5. This processing involved in the example of FIG. 22 takes place on the decoder side. The input to this processing is a coding unit that has been parsed.

In FIG. 22, the processing begins by testing if current affine AMVP CU employs temporal prediction from a reference picture contained in the L0 reference picture list. If so, then the four following steps apply.

The reverse process of the AMVR process is applied on the MVd for each CPMV of the L0 list. This involves converting the parsed MVd (motion vector difference) of each CPMV associated to the L0 reference picture, from the precision level for the coding of the L0 list Mvd, to the internal precision used by the decoder to represent motion data.

Next, the affine AMVP list of CPMV candidate predictors for reference picture L0 for current CU are computed. This follows the process already explained with reference to FIG. 11. Once this is done, the motion vector predictor for current CU in current reference picture list is known and is noted AMVPCand [mvpIdx$_{L0}$], where mupIdx$_{L0}$ is the index of the CPMV predictor candidate used for current CU, and which results from the parsing process.

Next, the control point motion vectors of current CU in current reference picture list are reconstructed as the sum of their respective MV predictor and the parsed Motion Vector difference.

Finally, the reconstructed control point motion vectors are clipped according to the internal representation of motion vector in the considered codec, and the affine motion field contained in the current CU and associated to the current reference picture list is constructed according to the VVC draft 5 specification.

The next step of the processing in the example of FIG. 22 involves testing if the current block employs temporal prediction from a reference picture contained in reference picture list L1. If so, then the same processing as described above is applied, but in the case of reference picture list L1.

As a result of the processing of the example of FIG. 22, two reconstructed affine motion vectors fields are obtained for the current inter CU respectively for reference picture list L0 and reference picture list L1, and are used afterwards for the motion compensated temporal prediction of current CU.

Figure 23:
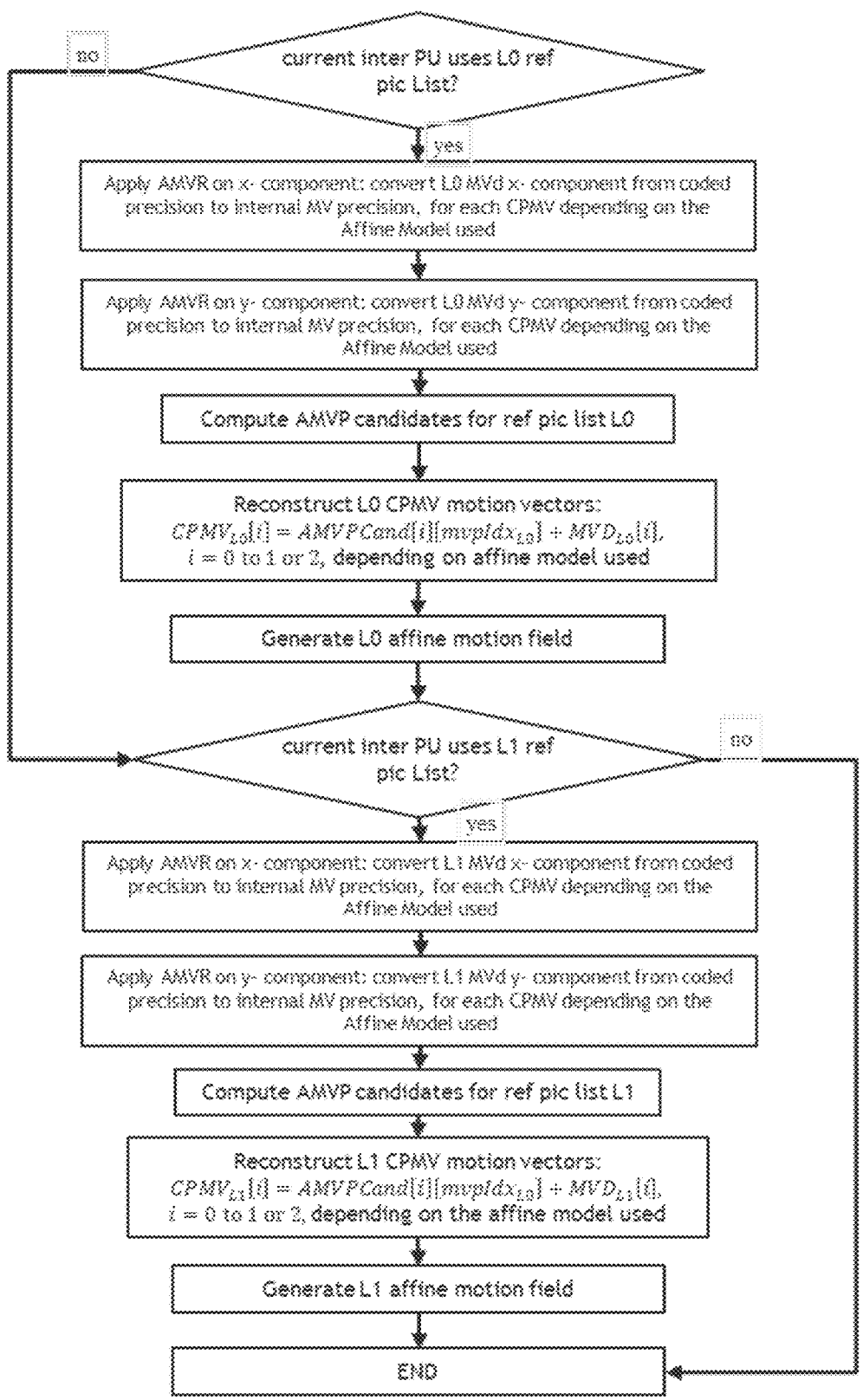

FIG. 23 illustrates decoder side motion data reconstruction of an Affine AMVP-coded CU in accordance with the present embodiment. That is, FIG. 23 illustrates the reconstruction of motion vectors, for an input CU that would be coded in affine AMVP mode (as opposed to translation AMVP mode), with AMVR active for this CU, in the present embodiment. This process takes place on the decoder side. The input to this process is a coding unit that has been parsed.

The processing in the example of FIG. 23 begins by testing if current affine AMVP CU employs temporal prediction from a reference picture contained in the L0 reference picture list. If so, then the following four steps apply.

The reverse process of the AMVR process is applied on the x-component of the coded MVd for each CPMV of the L0 list. This involves converting the x-component of the parsed MVd (motion vector difference) of each CPMV associated to the L0 reference picture, from the precision level for the coding of the x-component of L0 list Mvd, to the internal precision used by the decoder to represent motion data.

Next, the reverse process of the AMVR process is applied on the y-component of the coded MVd of each CPMV of the L0 reference list. This involves converting the y-component of the parsed MVd (motion vector difference) of each CPMV associated to the L0 reference picture, from the precision level for the coding of the y-component of L0 list Mvd, to the internal precision used by the decoder to represent motion data.

Next, the affine AMVP candidate list for reference picture L0 for current CU are computed. This follows the process already explained with reference to FIG. 11. Once this is done, the motion vector predictor for current CU in current reference picture list is known and is noted AMVPCand [mvpIdx$_{L0}$], where mvpIdx$_{L0}$ is the index of the MV predictor candidate used for current CU, and which results from the parsing process.

Next, the control motion vectors of current CU in current reference picture list are reconstructed as the sum of their respective CPMV predictor and their respective parsed Motion Vector difference for each CPMV of current CU.

Finally, the reconstructed CPMV are clipped and the affine motion field of current CU is generated with respect to the L0 reference picture.

The next step of the process tests if the current block employs temporal prediction from a reference picture contained in reference picture list L1. If so, then the processing described above is applied, but in the case of reference picture list L1.

A result of the processing of the example of FIG. 23 is two reconstructed motion fields, for list L0 and list L1, being obtained for the current affine AMVP CU. These reconstructed motion fields are used afterwards for the motion compensated temporal prediction of current CU.

An example of a coding unit syntax structure suitable for implementing the current example of an embodiment (embodiment 3) is shown in Syntax Structure Listing 3 appended to the present document.

In general, at least one other example of an embodiment described herein (referred to herein as embodiment 4) involves decoupled motion vector resolution in L0 and L1 reference picture lists in the case of AMVP translational motion compensation. An aspect involves the AMVR precision level being decoupled between the L0 and L1 reference lists. The parsing of the AMVR data of a CU that is coded in AMVP mode, according to the present embodiment, is depicted by FIG. 24.

Figure 24:
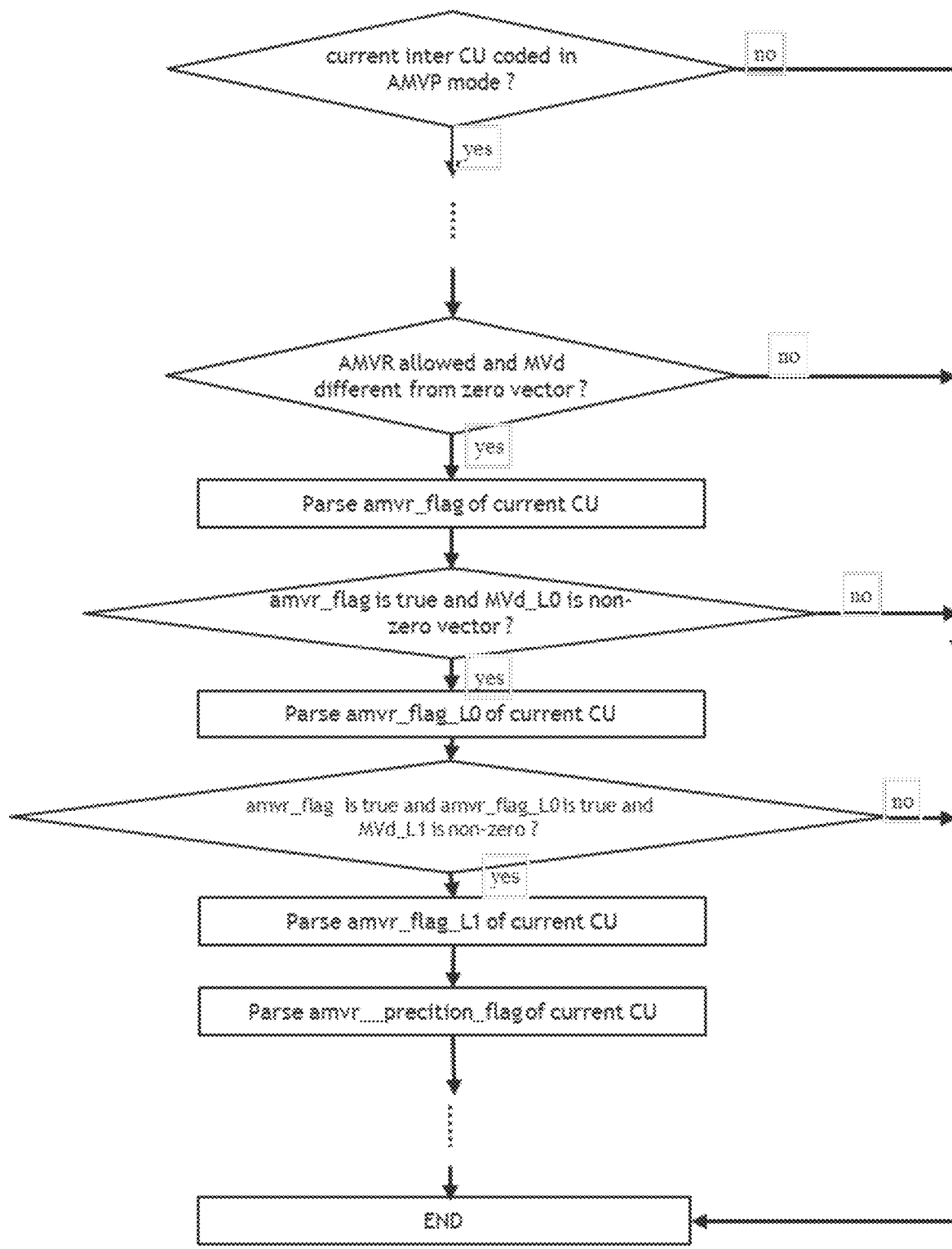

In FIG. 24, first a flag designated, e.g., the amvr_flag of current CU is parsed. Then, in case amvr_flag is true and the decoded MVd of the L0 list is non-zero, then another flag designated, e.g., amvr_flag_L0 is parsed. It indicates if the current MVd for list L0 is signaled in default ¼-luma-sample precision level or not. Next, in case both flags amvr_precision_flag and amvr_flag_L0 are true, then another flag designated, e.g., amvr_flag_L1, is parsed. It indicates if the current MVd associated to list L1 is signaled in default ¼-luma-sample precision level, or not. Otherwise, if amvr_precision_fllag is true and amvr_flag_L0 is false, then amvr_flag_L1 is inferred to true. Finally, in case amvr_precision_flag is false, both amvr_flag_L0 and amvr_flag_L1 are inferred to false.

Other examples of combinations of flag values and an associated interpretation according to the present embodiment are as follows. If amvr_flag is true then the amvr_precision_flag of current CU indicates if the default 1-luma-sample or 4-luma-sample MV resolution is used for current CU. If amvr_flag_L0 is true, then the precision level used for the MVd of list L0 is the precision level indicated by amvr_flag and amvr_precision_flag. If amvr_flag_L1 is true, then the precision level used for the MVd of list L1 is the precision level indicated by amvr_flag and amvr_precision_flag.

Figure 25:
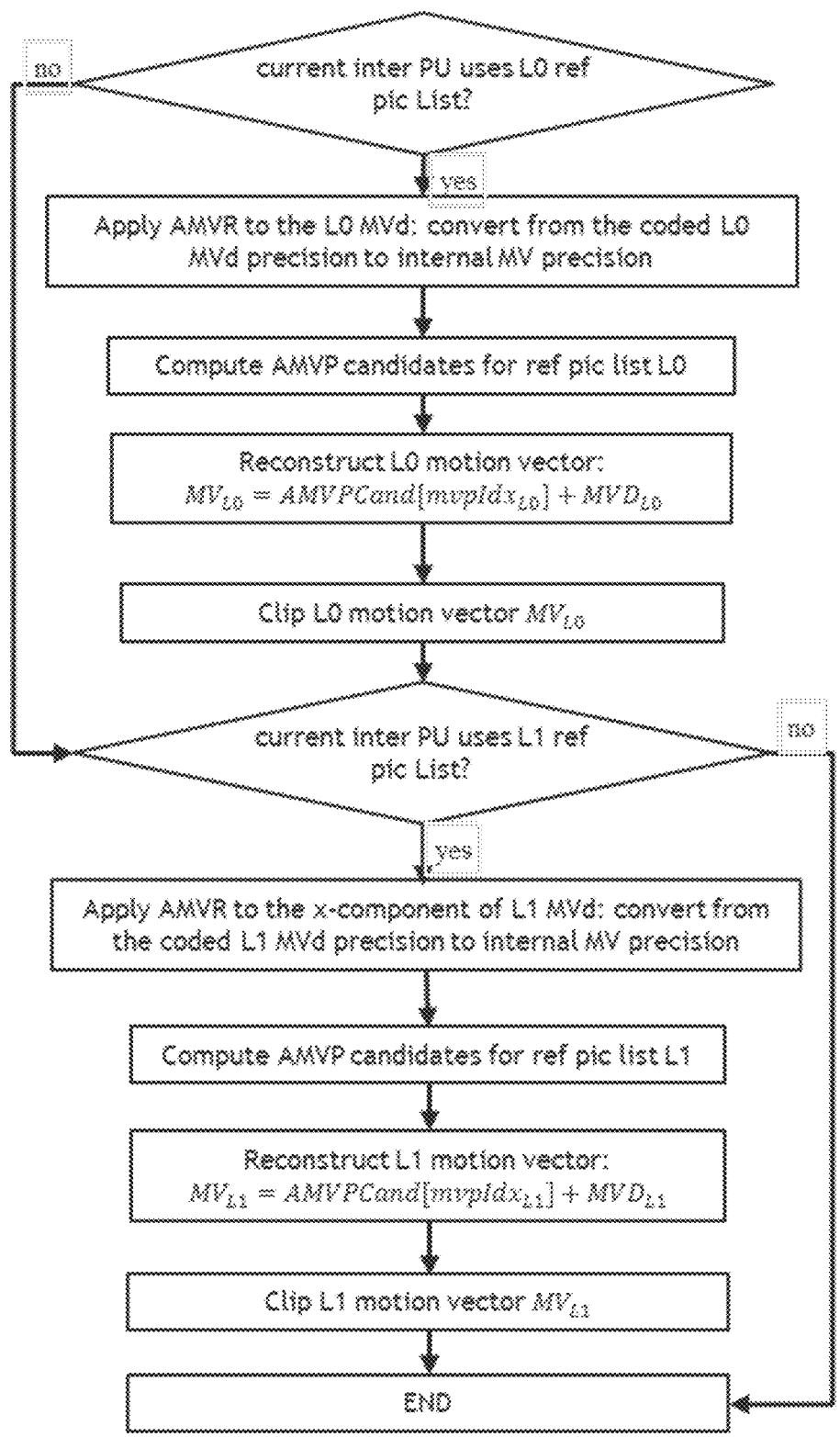

FIG. 25 illustrates an example of the reconstruction of motion vectors, for an input CU that would be coded in translational AMVP mode (as opposed to affine AMVP mode), with AMVR active for this CU in accordance with the present example of an embodiment. This reconstruction takes place on the decoder side. The input is a coding unit that has been parsed.

The example in FIG. 25 starts by testing if the current CU employs temporal prediction from a reference picture contained in the L0 reference picture list. If so, then the four following steps apply.

The reverse process of the AMVR process is applied on the coded MVd associated to the L0 list. This involves converting the parsed MVd (motion vector difference) associated to the L0 reference picture, from the precision level for the coding of L0 list Mvd, to the internal precision used by the decoder to represent motion data.

Next, the AMVP candidate lists for reference picture L0 for current CU are computed. This follows the process already explained with reference to FIG. 6. Once this is done, the motion vector predictor for current CU in current reference picture list is known and is noted AMVPCand [mvpIdx$_{L0}$], where mvpIdx$_{L0}$ is the index of the MV predictor candidate used for current CU, and which results from the parsing process.

Next, the motion vector of current CU in current reference picture list is reconstructed as the sum of the MV predictor and the parsed Motion Vector difference.

Finally, the reconstructed motion vector is clipped according to the internal representation of motion vector in the considered codec.

The next step in the example of FIG. 25 involves testing if the current block employs temporal prediction from a reference picture contained in reference picture list L1. If so, then the same process described above is applied, but in the case of reference picture list L1. As a result, the example of FIG. 25 provides two reconstructed motion vectors $MV_{L0}$ and $MV_{L1}$ for the current inter CU and are used afterwards for the motion compensated temporal prediction of the current CU.

An example of a coding_unit syntax structure suitable for implementing the current example of an embodiment (embodiment 4) is shown in Syntax Structure Listing 4 appended to the present document.

In general, at least one other example of an embodiment described herein (referred to herein as embodiment 5) involves decoupled motion vector resolution in L0 and L1 reference picture lists in the case of affine motion compensation. An aspect involves the AMVR precision level being decoupled between the L0 and L1 reference lists, in the case of an affine AMVP coded CU. An example of the parsing of the AMVR data of a CU that is coded in Affine AMVP mode, according to the present embodiment, is illustrated in FIG. 26.

Figure 26:
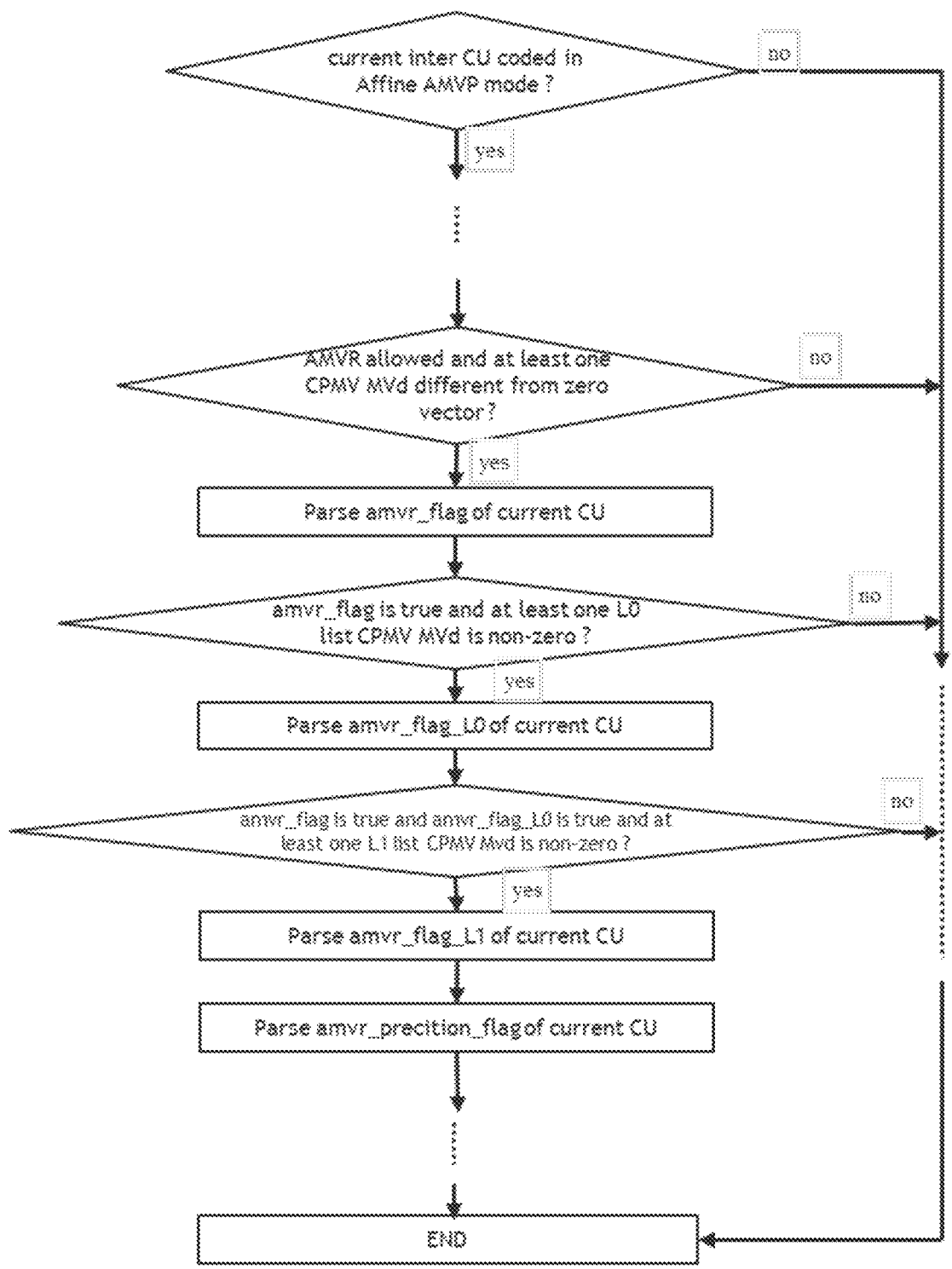

The example of FIG. 26 involves processing that first parses a flag, e.g., designated the amvr_flag, associated with the current CU. Then, in case amvr_flag is true and the decoded L0 MVd is non-zero for at least one CPMV of current CU, another flag, e.g., designated amvr_flag_L0, is parsed. It indicates if the MVd of each CPMV is signaled in default ¼-luma-sample precision level or not, for reference picture list L0. Next, in case both flags amvr_precision_flag and amvr_flag_L0 are true, then a flag amvr_flag_L1 is parsed. It indicates if the current MVd is signaled in default ¼-luma-sample precision level for each CPMV, or not, for reference picture list L1. Otherwise, if amvr_precision_flag is true and amvr_flag_L0 is false, then amvr_flag_L1 is inferred to true. Finally, in case amvr_precision_flag is false, both amvr_flag_L0 and amvr_flag_L1 are inferred to false.

Examples of other combinations of flag values and the associated interpretation are as follows. If amvr_flag is true, the amvr_precision_flag of the current CU is parsed. It indicates if the default 1-luma-sample or 4-luma-sample MV resolution is used for current CU. If amvr_flag_L0 is true, then the precision level used for the MVd of each CPMV associated to reference picture list L0 is the precision level indicated by amvr_flag and amvr_precision_flag. If amvr_flag_L1 is true, then the precision level used for the MVd of each CPMV of reference list L1 is the precision level indicated by amvr_flag and amvr_precision_flag.

Figure 27:
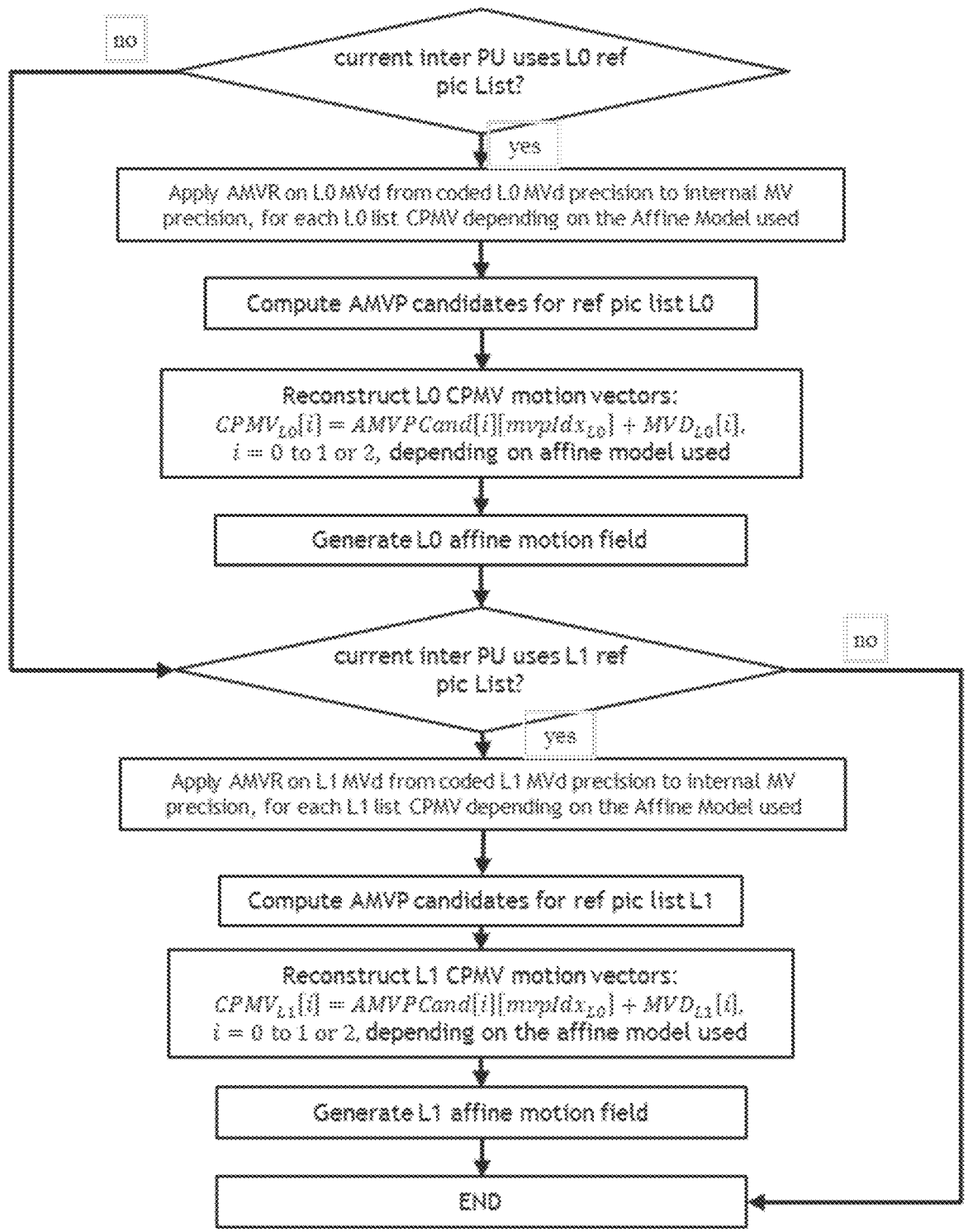

FIG. 27 illustrates an example of the reconstruction of motion vectors, for an input CU that would be coded in affine AMVP mode (as opposed to translation AMVP mode), with AMVR active for this CU, in the present embodiment. The processing associated with the example of FIG. 27 takes place on the decoder side. The input to this process is a coding unit that has been parsed.

The processing of the example of FIG. 27 begins by testing if the current affine AMVP CU employs temporal prediction from a reference picture contained in the L0 reference picture list. If so, then the four following steps apply.

The reverse process of the AMVR process is applied on the MVd for each CPMV of the L0 list. This involves converting the parsed MVd (motion vector difference) of each CPMV associated to the L0 reference picture, from the precision level for the coding of the L0 list Mvd, to the internal precision used by the decoder to represent motion data.

Next, the AMVP candidate lists for reference picture L0 for current CU are computed. This follows the process already explained with reference to FIG. 11. Once this is done, the motion vector predictor for the current CU in the current reference picture list is known and is designated AMVPCand [mvpIdx$_{L0}$], where mvpIdx$_{L0}$ is the index of the CPMV predictor candidates used for current CU, and which results from the parsing process.

Next, the control point motion vectors of the current CU in the current reference picture list are determined as the sum of the CPMV predictor and the parsed Motion Vector difference for each CPMV of current CU.

Finally, the recontrucated CMVS are clipped and the reconstructed affine motion field of current CU is generated with respect to the L0 reference picture.

The next step of the process tests if the current affine AMVP block employs temporal prediction from a reference picture contained in reference picture list L1. If so, then the processing described above is applied, but in the case of reference picture list L1. As a result of the processing of the example of FIG. 27, two reconstructed motion fields, for list L0 and list L1, are obtained for current affine AMVP CU and are used afterwards for the motion compensated temporal prediction of the current CU.

An example of a coding_unit syntax structure suitable for implementing the current example of an embodiment (embodiment 5) is shown in Syntax Structure Listing 5 appended to the present document.

Systems in accordance with one or more embodiments described herein involving video coding and/or decoding can provide one or more of the following non-limiting examples of features individually or combined in various arrangements:

The precision level in the coding of a motion vector difference (or MV residual) is differentiated between x- and y-components of the coded motion vector difference.

The precision level in the coding of a motion vector difference (or MV residual) is differentiated between L0 and L1 reference picture lists, in the case of a bi-predicted block, where symmetrical motion vector difference coding is not used.

The precision level in the coding of a motion vector difference (or MV residual) is differentiated between x- and y-components of the coded motion vector difference where the considered block is coded through an intra block copy mode such as that of VVC.

The precision level in the coding of a motion vector difference (or MV residual) is differentiated between x- and y-components of the coded motion vector difference where the considered block is coded through an inter translational AMVP mode such as that of VVC.

The precision level in the coding of a motion vector difference (or MV residual) is differentiated between x- and y-components of the coded motion vector difference where the considered block is coded through the inter affine AMVP mode of WC.

The precision level in the coding of a motion vector difference (or MV residual) is differentiated between L0 and L1 reference picture lists, in the case of a bi-predicted block, where symmetrical motion vector difference coding is not used and where the considered block is coded through the inter translational AMVP mode of VVC.

The precision level in the coding of a motion vector difference (or MV residual) is differentiated between L0 and L1 reference picture lists, in the case of a bi-predicted block, where symmetrical motion vector difference coding is not used and where the considered block is coded through the inter affine AMVP mode of VVC.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 28 described below provide some embodiments, but other embodiments are contemplated and the discussion of FIGS. 1, 2 and 28 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules of a video encoder and/or decoder such as motion compensation and/or motion estimation modules 170 and 175 of encoder 100 shown in FIG. 1 and motion compensation module 275 of decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 28:
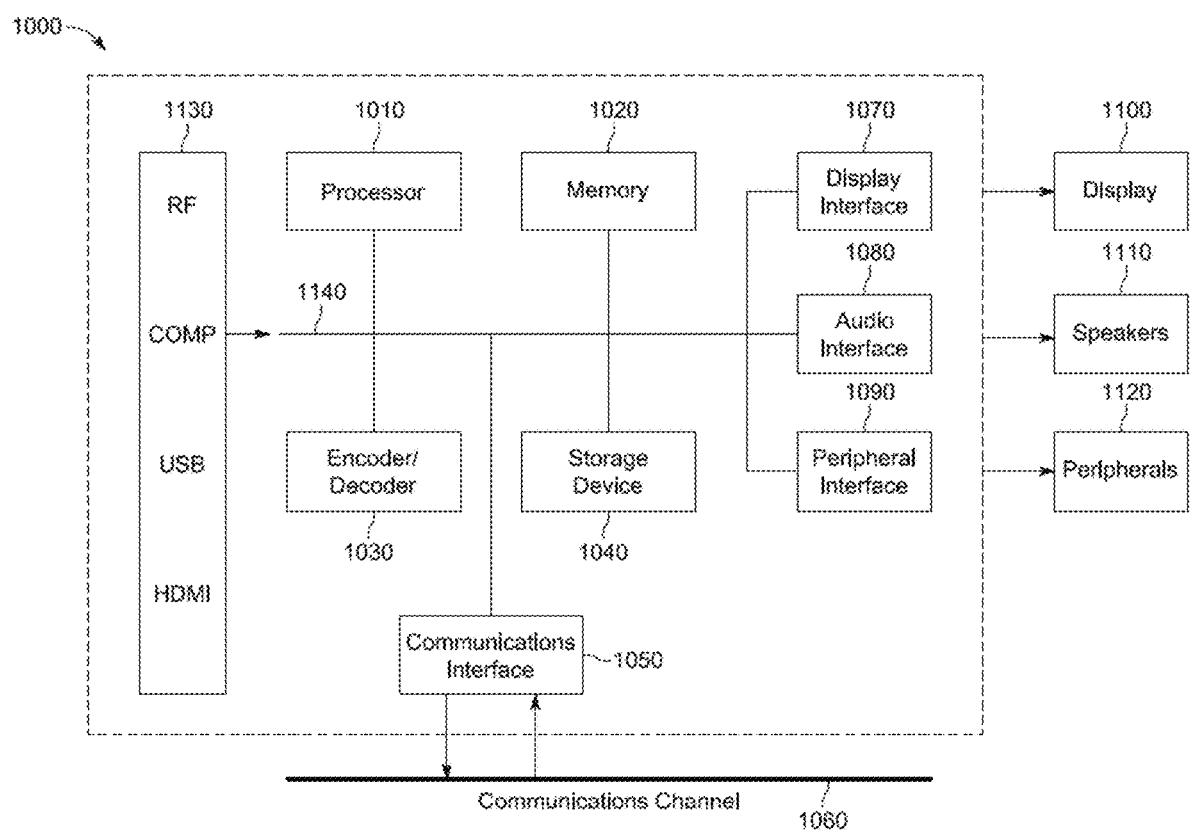
FIG. 28 provides a block diagram illustrating an example of an embodiment of apparatus in accordance with various aspects and embodiments described herein.

FIG. 28 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or WC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 29:
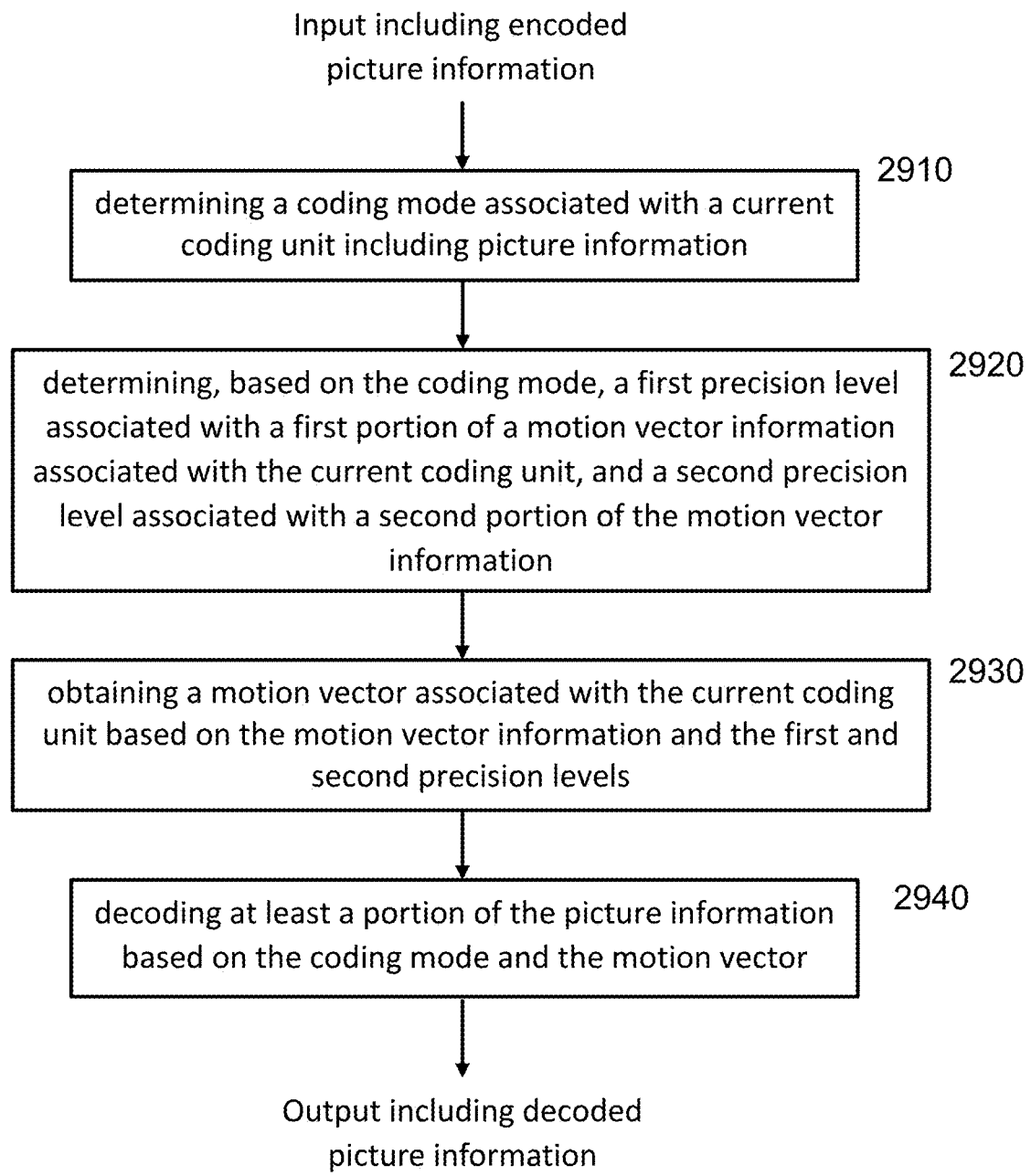
FIG. 29 illustrates an example of an embodiment in accordance with the present disclosure.

Another example of an embodiment is shown in FIG. 29. In FIG. 29, at 2910 a coding mode associated with a current coding unit including picture information is determined. For example, a coding mode may comprise an intra-block coding (IBC) mode, a translational adaptive motion vector prediction (AMVP) mode, an affine AMVP mode, etc. as described above. Then, at 2920, first and second precision levels are determined based on the coding mode, e.g., determined based on various flags and tests of the values of the flags as described above. The first precision level is associated with a first portion of a motion vector information. For example, a motion vector information can comprise a residual (or motion vector difference (MVd)) and the first precision level associated with the first portion can be an accuracy of the x-component of the residual or MVd. The second precision level is associated with a second portion of the motion vector information. For example, the second precision level associated with the second portion can be an accuracy of the y-component of the residual or MVd. As an example, the precision level or accuracy may be a value such as ¹⁄₁₆-luma-sample, ¼-luma-sample, integer-luma-sample or four-luma-sample. In affine AMVP mode, the supported MVd resolution levels can be quarter-luma-sample, or integer-luma-sample. At 2930, a motion vector associated with the current coding unit is obtained based on the motion vector information and the first and second precision levels, e.g., combining a motion vector predictor and the motion vector residual using the defined precision or accuracy as described above. At least a portion of the picture information is decoded based on the coding mode and the motion vector at 2940 to produce decoded picture information.

Figure 30:
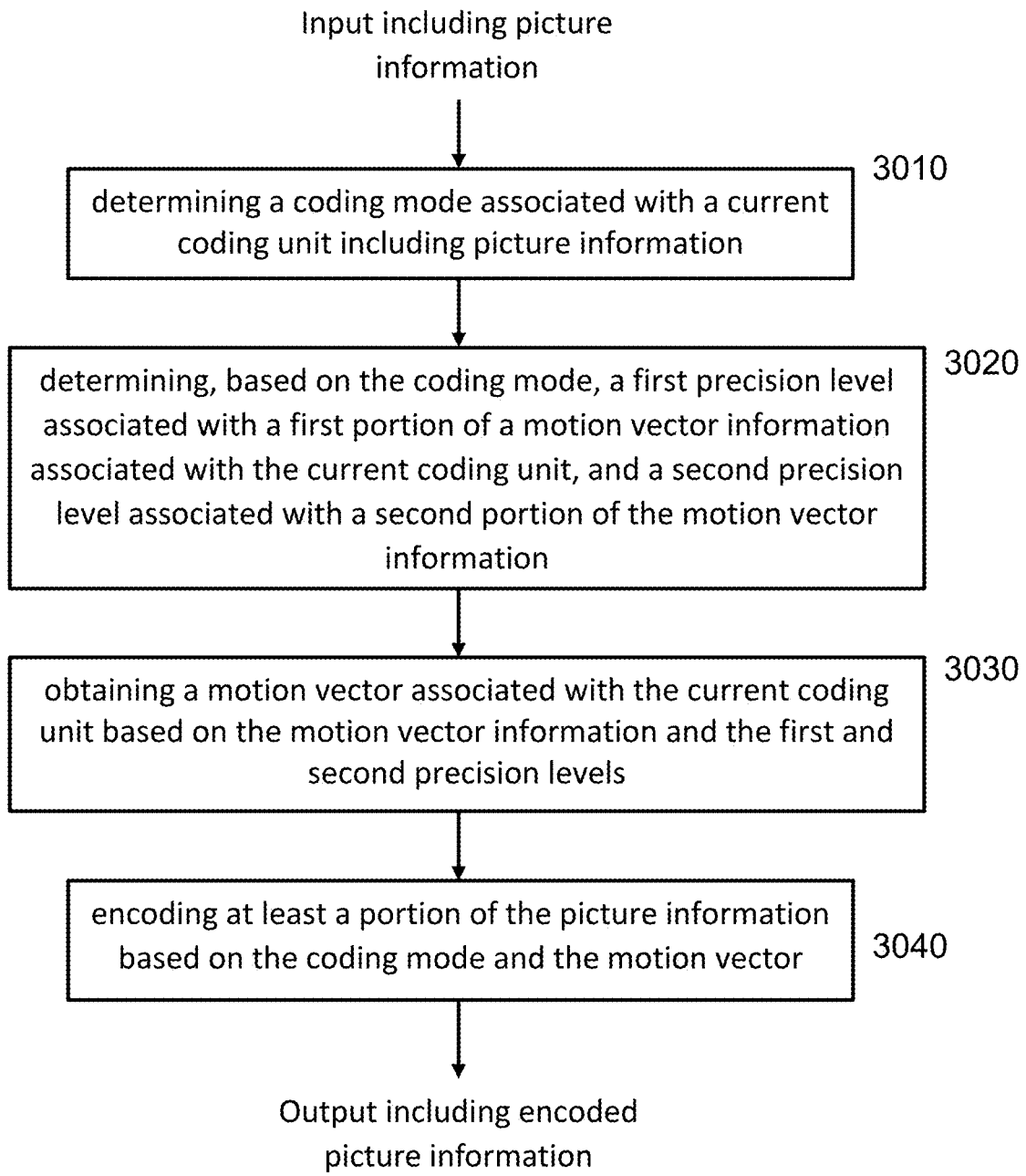
FIG. 30 illustrates another example of an embodiment in accordance with the present disclosure.

Another example of an embodiment is shown in FIG. 30. In FIG. 30, at 3010 a coding mode associated with a current coding unit including picture information is determined. For example, a coding mode may comprise an intra-block coding (IBC) mode, a translational adaptive motion vector prediction (AMVP) mode, an affine AMVP mode, etc. as described above. Then, at 3020, first and second precision levels are determined based on the coding mode, e.g., determined based on various flags and tests of the values of the flags as described above. The first precision level is associated with a first portion of a motion vector information. For example, the motion vector information can be a residual or motion vector difference (MVd) and the first precision level associated with the first portion can be an accuracy of the x-component of the residual. The second precision level is associated with a second portion of the motion vector information, e.g., an accuracy of the y-component of the residual. As an example, the precision level or accuracy may be a value such as ¹⁄₁₆-luma-sample, ¼-luma-sample, integer-luma-sample or four-luma-sample. In affine AMVP mode, the supported MVd resolution levels are quarter-luma-sample, or integer-luma-sample. At 3030, a motion vector associated with the current coding unit is obtained based on the motion vector information and the first and second precision levels, e.g., combining a motion vector predictor and the motion vector residual using the defined precision or accuracy as described above. At least a portion of the picture information is encoded based on the coding mode and the motion vector at 3040 to produce encoded picture information.

In another example of an embodiment, a coding mode and first and second precision levels are determined as described above. However, in this example, the motion vector information can comprise a first motion vector residual corresponding to a first reference picture list (e.g., L0 MVd) and a second motion vector residual corresponding to a second reference picture list (e.g., L1 MVd). In this case, the first precision level is associated with a portion of the motion vector information comprising the first motion vector residual and the second precision level is associated with a portion of the motion vector information comprising the second motion vector residual. A first motion vector is obtained based on the first motion vector residual and the first precision level, and a second motion vector is obtained based on the second motion vector residual and the second precision level. Then, the picture information is decoded or encoded based on the first and first and second motion vectors and the coding mode.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", "one or more of", and "at least one of", for example, in the cases of "A/B", "A and/or B", "one or more of A or B" and "at least one of A and B", is intended to encompass the selection of the first listed option (A) only, or the selection of the second listed option (B) only, or the selection of both options (A and B). As a further example, in the cases of "A, B, and/or C", "one or more of A, B or C", and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, an example of an embodiment can involve a method comprising determining a coding mode associated with a current coding unit including picture information; determining, based on the coding mode, a first precision level associated with a first component of a motion vector information associated with the current coding unit, and a second precision level associated with a second component of the motion vector information; obtaining a motion vector associated with the current coding unit based on the motion vector information and the first and second precision levels; and decoding at least a portion of the picture information included in the current coding unit based on the coding mode and the motion vector.

In general, another example of an embodiment can involve a method comprising determining a coding mode associated with a current coding unit including picture information;
  determining, based on the coding mode, a first precision level associated with a first component of a motion vector information associated with the current coding unit, and a second precision level associated with a second component of the motion vector information; obtaining a motion vector associated with the current coding unit based on the motion vector information and the first and second precision levels; and encoding at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector information associated with the current coding unit, and a second precision level associated with a second component of the motion vector information; obtain a motion vector associated with the current coding unit based on the motion vector information and the first and second precision levels; and decode at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector information associated with the current coding unit, and a second precision level associated with a second component of the motion vector information; obtain a motion vector associated with a coding unit of picture information based on the motion vector information and the first and second precision levels; and encode at least a portion of the picture information based on the coding mode and the motion vector.

In general, another example of an embodiment can involve a method comprising determining a coding mode associated with a current coding unit including picture information; determining, based on the coding mode, a first precision level associated with a first component of a motion vector residual associated with the current coding unit, and a second precision level associated with a second component of the motion vector residual; obtaining a motion vector associated with the current coding unit based on the motion vector residual and the first and second precision levels; and decoding at least a portion of the picture information included in the current coding unit based on the coding mode and the motion vector.

In general, another example of an embodiment can involve a method comprising determining a coding mode associated with a current coding unit including picture information;
  determining, based on the coding mode, a first precision level associated with a first component of a motion vector residual associated with the current coding unit, and a second precision level associated with a second component of the motion vector residual; obtaining a motion vector associated with the current coding unit based on the motion vector residual and the first and second precision levels; and encoding at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector residual associated with the current coding unit, and a second precision level associated with a second component of the motion vector residual; obtain a motion vector associated with the current coding unit based on the motion vector residual and the first and second precision levels; and decode at least a portion of the picture information based on the coding mode and the motion vector.

In general, another example of an embodiment can involve apparatus comprising one or more processors configured to determine a coding mode associated with a current coding unit including picture information; determine, based on the coding mode, a first precision level associated with a first component of a motion vector residual associated with the current coding unit, and a second precision level associated with a second component of the motion vector residual; obtain a motion vector associated with a coding unit of picture information based on the motion vector residual and the first and second precision levels; and encode at least a portion of the picture information based on the coding mode and the motion vector.

In general, another example of an embodiment can involve a method comprising determining a coding mode associated with a current coding unit including picture information;
determining, based on the coding mode, a first precision level associated with a first motion vector residual corresponding to a first reference picture list, and a second precision level associated with a second motion vector residual corresponding to a second reference picture list; obtaining a first motion vector based on the first motion vector residual and the first precision level, and a second motion vector based on the second motion vector residual and the second precision level; and decoding at least a portion of the picture information based on the coding mode and the first and second motion vectors.

In general, another example of an embodiment can involve a method comprising determining a coding mode associated with a current coding unit including picture information;
determining, based on the coding mode, a first precision level associated with a first motion vector residual corresponding to a first reference picture list, and a second precision level associated with a second motion vector residual corresponding to a second reference picture list; obtaining a first motion vector based on the first motion vector residual and the first precision level, and a second motion vector based on the second motion vector residual and the second precision level; and encoding at least a portion of the picture information based on the coding mode and the first and second motion vectors.

In general, another example of an embodiment can involve apparatus comprising one or more processors configured to determine a coding mode associated with a current coding unit including picture information; determine, based on the coding mode, a first precision level associated with a first motion vector residual corresponding to a first reference picture list, and a second precision level associated with a second motion vector residual corresponding to a second reference picture list; obtain a first motion vector based on the first motion vector residual and the first precision level, and a second motion vector based on the second motion vector residual and the second precision level; and decode at least a portion of the picture information based on the coding mode and the first and second motion vectors.

In general, another example of an embodiment can involve apparatus comprising one or more processors configured to determine a coding mode associated with a current coding unit including picture information; determine, based on the coding mode, a first precision level associated with a first motion vector residual corresponding to a first reference picture list, and a second precision level associated with a second motion vector residual corresponding to a second reference picture list; obtain a first motion vector based on the first motion vector residual and the first precision level, and a second motion vector based on the second motion vector residual and the second precision level; and encode at least a portion of the picture information based on the coding mode and the first and second motion vectors.

In general, another example of an embodiment can involve a method or apparatus in accordance with one or more examples of embodiments described herein, wherein a first component corresponds to a x-component of the motion vector residual; and a second component corresponds to a y-component of the motion vector residual In general, another example of an embodiment can involve a method or apparatus in accordance with one or more examples of embodiments described herein, wherein a first precision level represents a first accuracy level of the first motion vector residual; and a second precision level represents a second accuracy level of the second motion vector residual.

In general, another example of an embodiment can involve a method or apparatus in accordance with one or more examples of embodiments described herein, wherein a first accuracy level is different from a second accuracy level.

In general, another example of an embodiment can involve a method or apparatus in accordance with one or more examples of embodiments described herein, wherein a coding mode comprises an intra block copy mode.

In general, another example of an embodiment can involve a method or apparatus in accordance with one or more examples of embodiments described herein, wherein a coding mode comprises a translational adaptive motion vector prediction mode.

In general, another example of an embodiment can involve a method or apparatus in accordance with one or more examples of embodiments described herein, wherein a coding mode comprises an affine adaptive motion vector prediction mode.

In general, another example of an embodiment can involve a bitstream formatted to include encoded picture information, wherein the encoded picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein.

In general, at least one example of an embodiment can involve a computer program product including instructions, which, when executed by a computer, cause the computer to carry out a method in accordance with one or more examples of embodiments described herein.

In general, at least one example of an embodiment can involve a non-transitory computer readable medium storing executable program instructions to cause a computer executing the instructions to perform a method in accordance with one or more examples of embodiments described herein.

In general, at least one example of an embodiment can involve a signal comprising data generated according to any one or more examples of embodiments described herein.

In general, at least one example of an embodiment can involve a bitstream, formatted to include syntax elements and encoded image information generated in accordance with any one or more of the examples of embodiments described herein.

In general, at least one example of an embodiment can involve a computer readable storage medium having stored thereon a bitstream generated according to methods or apparatus described herein.

In general, at least one example of an embodiment can involve transmitting or receiving a bitstream or signal generated according to methods or apparatus described herein.

In general, at least one example of an embodiment can involve a device comprising an apparatus in accordance with any one or more of the examples of embodiments described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

Various embodiments have been described. Embodiments may include any of the following features or entities, alone or in any combination, across various different claim categories and types:

- Providing in an encoder and/or decoder for the precision level in the coding of a motion vector difference (or MV residual) being differentiated between x- and y-components of the coded motion vector difference;
- Providing in an encoder and/or decoder for the precision level in the coding of a motion vector difference (or MV residual) being differentiated between L0 and L1 reference picture lists, in the case of a bi-predicted block, where symmetrical motion vector difference coding is not used;
- Providing in an encoder and/or decoder for the precision level in the coding of a motion vector difference (or MV residual) is differentiated between x- and y-components of the coded motion vector difference where the considered block is coded through an intra block copy mode such as that of VVC;
- Providing in an encoder and/or decoder for the precision level in the coding of a motion vector difference (or MV residual) being differentiated between x- and y-components of the coded motion vector difference where the considered block is coded through an inter translational AMVP mode such as that of VVC;
- Providing in an encoder and/or decoder for the precision level in the coding of a motion vector difference (or MV residual) being differentiated between x- and y-components of the coded motion vector difference where the considered block is coded through the inter affine AMVP mode of VVC;
- Providing in an encoder and/or decoder for the precision level in the coding of a motion vector difference (or MV residual) being differentiated between L0 and L1 reference picture lists, in the case of a bi-predicted block, where symmetrical motion vector difference coding is not used and where the considered block is coded through an inter translational AMVP mode such as that of VVC;
- Providing in an encoder and/or decoder for the precision level in the coding of a motion vector difference (or MV residual) being differentiated between L0 and L1 reference picture lists, in the case of a bi-predicted block, where symmetrical motion vector difference coding is not used and where the considered block is coded through the inter affine AMVP mode such as that of VVC.
- Providing in an encoder and/or decoder for increased flexibility in an AMVR tool such as that of VVC;
- Providing in an encoder and/or decoder for differentiating the accuracy level between the x- and y-values of a coded motion vector difference (MVd);
- Providing in an encoder and/or decoder for differentiating the accuracy level between the L0 and L1 motion vector difference coding, in the case of a bi-predicted coding unit.
- Providing in an encoder and/or decoder for increased flexibility in an AMVR tool such as that of VVC in accordance with any of the embodiments, features or entities, alone or in any combination, as described herein based on also providing reduced complexity and/or improved compression efficiency.
- Inserting in the signaling syntax elements that enable the encoder and/or decoder to provide encoding and/or decoding in accordance with any of the embodiments, features or entities, alone or in any combination, as described herein.
- Selecting, based on these syntax elements, the features or entities, alone or in any combination, as described herein to apply at the decoder.
- A bitstream or signal that includes one or more of the described syntax elements, or variations thereof.
- Inserting in the signaling syntax elements that enable the decoder to provide decoding in a manner corresponding to the manner of encoding used by an encoder.
- Creating and/or transmitting and/or receiving and/or decoding a bitstream or signal that includes one or more of the described syntax elements, or variations thereof.
- A TV, set-top box, cell phone, tablet, or other electronic device that provides for applying encoding and/or decoding according to any of the embodiments, features or entities, alone or in any combination, as described herein.
- A TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image.
- A TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein.
- A TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein.
- A computer program product storing program code that, when executed by a computer encoding and/or decoding in accordance with any of the embodiments, features or entities, alone or in any combination, as described herein.
- A non-transitory computer readable medium including executable program instructions causing a computer executing the instructions to implement encoding and/ or decoding in accordance with any of the embodiments, features or entities, alone or in any combination, as described herein.

Various other generalized, as well as particularized embodiments are also supported and contemplated throughout this disclosure.

| Syntax Structure Listing 1: Example of coding_unit syntax structure according to embodiment 1. | |
|---|---|
| | Descriptor |
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \|\| | |
|       ( slice_type != I && ( CuPredMode[ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( cbWidth <= 32 && cbHeight <= 32 ) | |
|           intra_bdpcm_flag[ x0 ][ y0 ] | ae(v) |
|         if( intra_bdpcm_flag[ x0 ][ y0 ] ) | |
|           intra_bdpcm_dir_flag [ x0 ][ y0 ] | ae(v) |
|         else { | |
|           if( sps_mip_enabled_flag && | |
|             ( Abs( Log2( cbWidth ) − Log2( cbHeight ) ) <= 2 ) && | |
|             cbWidth <= MaxTbSizeY && cbHeight <= MaxTbSizeY ) | |
|           intra_mip_flag[ x0 ][ y0 ] | ae(v) |
|           if( intra_mip_flag[ x0 ][ y0 ] ) { | |
|             intra_mip_mpm_flag[ x0 ][ y0 ] | ae(v) |
|             if( intra_mip_mpm_flag[ x0 ][ y0 ] ) | |
|               intra_mip_mpm_idx[ x0 ][ y0 ] | ae(v) |
|             Else | |
|               intra_mip_mpm_remainder[ x0 ][ y0 ] | ae(v) |
|           } else { | |
|             if( sps_mrl_enabled_flag && ( ( y0% CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && | |
|               ( cbWidth <= MaxTbSizeY && cbHeight <= MaxTbSizeY ) && | |
|               ( cbWidth * cbHeight > MinTbSizeY * MinTbSizeY ) ) | |
|               intra_subpartitions_mode_flag[ x0 ][ y0 ] | ae(v) |
|             if( intra_subpartitions_mode_flag[ x0 ][ y0 ] = = 1 && | |
|               cbWidth <= MaxTbSizeY && cbHeight <= MaxTbSizeY ) | |
|               intra_subpartitions_split_flag[ x0 ][ y0 ] | ae(v) |
|             if( intra_luma_ref_idx[ x0 ][ y0 ] = = 0 && | |
|               intra_subpartitions_mode_flag[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |
|         } | |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     if( cu_skip_flag[ x0 ][ y0 ] = = 0 ) | |
|       general_merge_flag[ x0 ][ y0 ] | ae(v) |
|     if( general_merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |

Syntax Structure Listing 1: Example of coding_unit syntax structure according to embodiment 1.

| | Descriptor |
|---|---|
| `          mvd_coding( x0, y0, 0, 0 )` | |
| `          mvp_l0_flag[ x0 ][ y0 ]` | ae(v) |
| `          if( sps_amvr_enabled_flag &&` | |
| `             ( MvdL0[ x0 ][ y0 ][ 0 ] != 0 || MvdL0[ x0 ][ y0 ][ 1 ] != 0 ) ) {` | |
| `             amvr_precision_flag[ x0 ][ y0 ]` | ae(v) |
| `             if( amvr_precision_flag[ x0 ][ y0 ] && MvdL0[ x0 ][ y0 ][ 0 ] != 0 )` | |
| `                amvr_flag_x[ x0 ][ y0 ]` | ae(v) |
| `             if( amvr_precision_flag[ x0 ][ y0 ] && amvr_flag-x[ x0 ][ y0 ] &&` | |
| `MvdL0[ x0 ][ y0 ][ 1 ] != 0 )` | |
| `                amvr_flag_y[ x0 ][ y0 ]` | ae(v) |
| `          }` | |
| `       } else {` | |
| `          if( slice_type = = B )` | |
| `             inter_pred_idc[ x0 ][ y0 ]` | ae(v) |
| `          if( sps_affine_enabled_flag && cbWidth >= 16 && cbHeight >= 16 ) {` | |
| `             inter_affine_flag[ x0 ][ y0 ]` | ae(v) |
| `             if( sps_affine_type_flag && inter_affine_flag[ x0 ][ y0 ] )` | |
| `                cu_affine_type_flag[ x0 ][ y0 ]` | ae(v) |
| `          }` | |
| `          if( sps_smvd_enabled_flag && inter_pred_idc[ x0 ][ y0 ] = = PRED_BI &&` | |
| `             !inter_affine_flag[ x0 ][ y0 ] && RefIdxSymL0 > -1 && RefIdxSymL1 > -1 )` | |
| `             sym_mvd_flag[ x0 ][ y0 ]` | ae(v) |
| `          if( inter_pred_idc[ x0 ][ y0 ] != PRED_L1 ) {` | |
| `             if( NumRefIdxActive[ 0 ] > 1 && !sym_mvd_flag[ x0 ][ y0 ] )` | |
| `                ref_idx_l0[ x0 ][ y0 ]` | ae(v) |
| `             mvd_coding( x0, y0, 0, 0 )` | |
| `             if( MotionModelIdc[ x0 ][ y0 ] > 0 )` | |
| `                mvd_coding( x0, y0, 0, 1 )` | |
| `             if(MotionModelIdc[ x0 ][ y0 ] > 1 )` | |
| `                mvd_coding( x0, y0, 0, 2 )` | |
| `             mvp_l0_flag[ x0 ][ y0 ]` | ae(v) |
| `          } else {` | |
| `             MvdL0[ x0 ][ y0 ][ 0 ] = 0` | |
| `             MvdL0[ x0 ][ y0 ][ 1 ] = 0` | |
| `          }` | |
| `          if( inter_pred_idc[ x0 ][ y0 ] != PRED_L0 ) {` | |
| `             if( NumRefIdxActive[ 1 ] > 1 && !sym_mvd_flag[ x0 ][ y0 ] )` | |
| `                ref_idx_l1[ x0 ][ y0 ]` | ae(v) |
| `             if( mvd_l1_zero_flag && inter_pred_idc[ x0 ][ y0 ] = = PRED_BI ) {` | |
| `                MvdL1[ x0 ][ y0 ][ 0 ] = 0` | |
| `                MvdL1[ x0 ][ y0 ][ 1 ] = 0` | |
| `                MvdCpL1[ x0 ][ y0 ][ 0 ][ 0 ] = 0` | |
| `                MvdCpL1[ x0 ][ y0 ][ 0 ][ 1 ] = 0` | |
| `                MvdCpL1[ x0 ][ y0 ][ 1 ][ 0 ] = 0` | |
| `                MvdCpL1[ x0 ][ y0 ][ 1 ][ 1 ] = 0` | |
| `                MvdCpL1[ x0 ][ y0 ][ 2 ][ 0 ] = 0` | |
| `                MvdCpL1[ x0 ][ y0 ][ 2 ][ 1 ] = 0` | |
| `             } else {` | |
| `                if( sym_mvd_flag[ x0 ][ y0 ] ) {` | |
| `                   MvdL1[ x0 ][ y0 ][ 0 ] = -MvdL0[ x0 ][ y0 ][ 0 ]` | |
| `                   MvdL1[ x0 ][ y0 ][ 1 ] = -MvdL0[ x0 ][ y0 ][ 1 ]` | |
| `                } else` | |
| `                   mvd_coding( x0, y0, 1, 0 )` | |
| `                if( MotionModelIdc[ x0 ][ y0 ] > 0 )` | |
| `                   mvd_coding( x0, y0, 1, 1 )` | |
| `                if(MotionModelIdc[ x0 ][ y0 ] > 1 )` | |
| `                   mvd_coding( x0, y0, 1, 2 )` | |
| `                mvp_l1_flag[ x0 ][ y0 ]` | ae(v) |
| `             }` | |
| `          } else {` | |
| `             MvdL1[ x0 ][ y0 ][ 0 ] = 0` | |
| `             MvdL1[ x0 ][ y0 ][ 1 ] = 0` | |
| `          }` | |
| `          if( ( sps_amvr_enabled_flag && inter_affine_flag[ x0 ][ y0 ] = = 0 &&` | |
| `             ( MvdL0[ x0 ][ y0 ][ 0 ] != 0 || MvdL0[ x0 ][ y0 ][ 1 ] != 0 ||` | |
| `               MvdL1[ x0 ][ y0 ][ 0 ] != 0 || MvdL1[ x0 ][ y0 ][ 1 ] != 0 ) ) ||` | |
| `             ( sps_affine_amvr_enabled_flag && inter_affine_flag[ x0 ][ y0 ] = = 1 &&` | |
| `               ( MvdCpL0[ x0 ][ y0 ][ 0 ][ 0 ] != 0 || MvdCpL0[ x0 ][ y0 ][ 0 ][ 1 ] != 0 ||` | |
| `                 MvdCpL1[ x0 ][ y0 ][ 0 ][ 0 ] != 0 || MvdCpL1[ x0 ][ y0 ][ 0 ][ 1 ] != 0 ||` | |
| `                 MvdCpL0[ x0 ][ y0 ][ 1 ][ 0 ] != 0 || MvdCpL0[ x0 ][ y0 ][ 1 ][ 1 ] != 0 ||` | |
| `                 MvdCpL1[ x0 ][ y0 ][ 1 ][ 0 ] != 0 || MvdCpL1[ x0 ][ y0 ][ 1 ][ 1 ] != 0 ||` | |
| `                 MvdCpL0[ x0 ][ y0 ][ 2 ][ 0 ] != 0 || MvdCpL0[ x0 ][ y0 ][ 2 ][ 1 ] != 0 ||` | |
| `                 MvdCpL1[ x0 ][ y0 ][ 2 ][ 0 ] != 0 || MvdCpL1[ x0 ][ y0 ][ 2 ][ 1 ] != 0 ) )` | |
| `{` | |
| `             amvr_flag[ x0 ][ y0 ]` | ae(v) |
| `             if( amvr_flag[ x0 ][ y0 ] )` | |

Syntax Structure Listing 1: Example of coding_unit syntax structure according to embodiment 1.

| | Descriptor |
|---|---|
| ```
            amvr_precision_flag[ x0 ][ y0 ]
        }
        if( sps_bcw_enabled_flag && inter_pred_idc[ x0 ][ y0 ] = = PRED_BI &&
            luma_weight_l0_flag[ ref_idx_l0 [ x0 ][ y0 ] ] = = 0 &&
            luma_weight_l1_flag[ ref_idx_l1 [ x0 ][ y0 ] ] = = 0 &&
            chroma_weight_l0_flag[ ref_idx_l0 [ x0 ][ y0 ] ] = = 0 &&
            chroma_weight_l1_flag[ ref_idx_l1 [ x0 ][ y0 ] ] = = 0 &&
            cbWidth * cbHeight >= 256 )
            bcw_idx[ x0 ][ y0 ]
      }
    }
    if( !pcm_flag[ x0 ][ y0 ] ) {
      if( CuPredMode[ x0 ][ y0 ] != MODE_INTRA &&
          general_merge_flag[ x0 ][ y0 ] = = 0 )
          cu_cbf
      if( cu_cbf ) {
          if( CuPredMode[ x0 ][ y0 ] = = MODE_INTER && sps_sbt_enabled_flag &&
              !ciip_flag[ x0 ][ y0 ] && !MergeTriangleFlag[ x0 ][ y0 ] ) {
              if( cbWidth <= MaxSbtSize && cbHeight <= MaxSbtSize ) {
                  allowSbtVerH = cbWidth >= 8
                  allowSbtVerQ = cbWidth >= 16
                  allowSbtHorH = cbHeight >= 8
                  allowSbtHorQ = cbHeight >= 16
                  if( allowSbtVerH || allowSbtHorH || allowSbtVerQ || allowSbtHorQ )
                      cu_sbt_flag
              }
              if( cu_sbt_flag ) {
                  if( ( allowSbtVerH || allowSbtHorH ) && ( allowSbtVerQ || allowSbtHorQ) )
                      cu_sbt_quad_flag
                  if( ( cu_sbt_quad_flag && allowSbtVerQ && allowSbtHorQ ) ||
                      ( !cu_sbt_quad_flag && allowSbtVerH && allowSbtHorH ) )
                      cu_sbt_horizontal_flag
                      cu_sbt_pos_flag
              }
          }
          transform_tree( x0, y0, cbWidth, cbHeight, treeType )
      }
    }
}
``` | ae(v)<br><br><br><br><br><br><br>ae(v)<br><br><br><br>ae(v)<br><br><br><br><br><br><br><br><br>ae(v)<br><br><br>ae(v)<br><br><br>ae(v)<br>ae(v) |

Syntax Structure Listing 2: Example of coding_unit syntax structure according to embodiment 2.

| | Descriptor |
|---|---|
| ```
coding_unit( x0, y0, cbWidth, cbHeight, treeType ) {
    if( slice_type != I || sps_ibc_enabled_flag ) {
        if( treeType != DUAL_TREE_CHROMA &&
            !( cbWidth = = 4 && cbHeight = = 4 && !sps_ibc_enabled_flag ) )
            cu_skip_flag[ x0 ][ y0 ]
        if( cu_skip_flag[ x0 ][ y0 ] = = 0 && slice_type != I
            && !( cbWidth = = 4 && cbHeight = = 4 ) )
            pred_mode_flag
        if( ( ( slice_type = = I && cu_skip_flag[ x0 ][ y0 ] = =0 ) ||
            ( slice_type != I && ( CuPredMode[ x0 ][ y0 ] != MODE_INTRA ||
            ( cbWidth = = 4 && cbHeight = = 4 && cu_skip_flag[ x0 ][ y0 ] = = 0 ) ) ) ) &&
            sps_ibc_enabled_flag && ( cbWidth != 128 || cbHeight != 128 ) )
            pred_mode_ibc_flag
    }
    if( CuPredMode[ x0 ][ y0 ] = = MODE_INTRA ) {
        if( sps_pcm_enabled_flag &&
            cbWidth >= MinIpcmCbSizeY && cbWidth <= MaxIpcmCbSizeY &&
            cbHeight >= MinIpcmCbSizeY && cbHeight <= MaxIpcmCbSizeY )
            pcm_flag[ x0 ][ y0 ]
        if( pcm_flag[ x0 ][ y0 ] ) {
            while( !byte_aligned( ) )
                pcm_alignment_zero_bit
            pcm_sample( cbWidth, cbHeight, treeType)
        } else {
            if( treeType = = SINGLE_TREE || treeType = = DUAL_TREE_LUMA ) {
                if( cbWidth <= 32 && cbHeight <= 32 )
                    intra_bdpcm_flag[ x0 ][ y0 ]
                if( intra_bdpcm_flag[ x0 ][ y0 ] )
``` | <br><br><br><br>ae(v)<br><br><br>ae(v)<br><br><br><br><br>ae(v)<br><br><br><br><br>ae(v)<br><br>f(1)<br><br><br><br><br>ae(v) |

| Syntax Structure Listing 2: Example of coding_unit syntax structure according to embodiment 2. | |
|---|---|
| | Descriptor |

```
                    intra_bdpcm_dir_flag [ x0 ][ y0 ]                          ae(v)
                else {
                    if( sps_mip_enabled_flag &&
                        ( Abs( Log2( cbWidth ) − Log2( cbHeight ) ) <= 2 ) &&
                        cbWidth <= MaxTbSizeY && cbHeight <= MaxTbSizeY )
                        intra_mip_flag[ x0 ][ y0 ]                              ae(v)
                    if( intra_mip_flag[ x0 ][ y0 ] ) {
                        intra_mip_mpm_flag[ x0 ][ y0 ]                          ae(v)
                        if( intra_mip_mpm_flag[ x0 ][ y0 ] )
                            intra_mip_mpm_idx[ x0 ][ y0 ]                       ae(v)
                        else
                            intra_mip_mpm_remainder[ x0 ][ y0 ]                 ae(v)
                    } else {
                        if( sps_mrl_enabled_flag && ( ( y0% CtbSizeY ) > 0 ) )
                            intra_luma_ref_idx[ x0 ][ y0 ]                      ae(v)
                        if ( sps_isp_enabled_flag && intra_luma_ref_idx[ x0 ][ y0 ] = = 0 &&
                            ( cbWidth <= MaxTbSizeY && cbHeight <= MaxTbSizeY ) &&
                            ( cbWidth * cbHeight > MinTbSizeY * MinTbSizeY ) )
                            intra_subpartitions_mode_flag[ x0 ][ y0 ]           ae(v)
                        if( intra_subpartitions_mode_flag[ x0 ][ y0 ] = = 1 &&
                            cbWidth <= MaxTbSizeY && cbHeight <= MaxTbSizeY )
                            intra_subpartitions_split_flag[ x0 ][ y0 ]          ae(v)
                        if( intra_luma_ref_idx[ x0 ][ y0 ] = = 0 &&
                            intra_subpartitions_mode_flag[ x0 ][ y0 ] = = 0 )
                            intra_luma_mpm_flag[ x0 ][ y0 ]                     ae(v)
                        if( intra_luma_mpm_flag[ x0 ][ y0 ] ) {
                            if( intra_luma_ref_idx[ x0 ][ y0 ] = = 0 )
                                intra_luma_not_planar_flag[ x0 ][ y0 ]          ae(v)
                            if( intra_luma_not_planar_flag[ x0 ][ y0 ] )
                                intra_luma_mpm_idx[ x0 ][ y0 ]                  ae(v)
                        } else
                            intra_luma_mpm_remainder[ x0 ][ y0 ]                ae(v)
                    }
                }
            }
            if( treeType = = SINGLE_TREE | | treeType = = DUAL_TREE_CHROMA )
                intra_chroma_pred_mode[ x0 ][ y0 ]                              ae(v)
        }
    } else if( treeType != DUAL_TREE_CHROMA ) { /* MODE_INTER or MODE_IBC */
        if( cu_skip_flag[ x0 ][ y0 ] = = 0 )
            general_merge_flag[ x0 ][ y0 ]                                      ae(v)
        if( general_merge_flag[ x0 ][ y0 ] ) {
            merge_data( x0, y0, cbWidth, cbHeight )
        } else if ( CuPredMode[ x0 ][ y0 ] = = MODE_IBC ) {
            mvd_coding( x0, y0, 0, 0 )
            mvp_l0_flag[ x0 ][ y0 ]                                             ae(v)
            if( sps_amvr_enabled_flag &&
                ( MvdL0[ x0 ][ y0 ][ 0 ] != 0 | | MvdL0[ x0 ][ y0 ][ 1 ] != 0 ) ) {
                amvr_precision_flag[ x0 ][ y0 ]                                 ae(v)
            }
        } else {
            if( slice_type = = B )
                inter_pred_idc[ x0 ][ y0 ]                                      ae(v)
            if( sps_affine_enabled_flag && cbWidth >= 16 && cbHeight >= 16 ) {
                inter_affine_flag[ x0 ][ y0 ]                                   ae(v)
                if( sps_affine_type_flag && inter_affine_flag[ x0 ][ y0 ] )
                    cu_affine_type_flag[ x0 ][ y0 ]                             ae(v)
            }
            if( sps_smvd_enabled_flag && inter_pred_idc[ x0 ][ y0 ] = = PRED_BI &&
                !inter_affine_flag[ x0 ][ y0 ] && RefIdxSymL0 > -1 && RefIdxSymL1 > -1 )
                sym_mvd_flag[ x0 ][ y0 ]                                        ae(v)
            if( inter_pred_idc[ x0 ][ y0 ] != PRED_L1 ) {
                if( NumRefIdxActive[ 0 ] > 1 && !sym_mvd_flag[ x0 ][ y0 ] )
                    ref_idx_l0[ x0 ][ y0 ]                                      ae(v)
                mvd_coding( x0, y0, 0, 0 )
                if( MotionModelIdc[ x0 ][ y0 ] > 0 )
                    mvd_coding( x0, y0, 0, 1 )
                if(MotionModelIdc[ x0 ][ y0 ] > 1 )
                    mvd_coding( x0, y0, 0, 2 )
                mvp_l0_flag[ x0 ][ y0 ]                                         ae(v)
            } else {
                MvdL0[ x0 ][ y0 ][ 0 ] = 0
                MvdL0[ x0 ][ y0 ][ 1 ] = 0
            }
            if( inter_pred_idc[ x0 ][ y0 ] != PRED_L0 ) {
```

| Syntax Structure Listing 2: Example of coding_unit syntax structure according to embodiment 2. | |
|---|---|
| | Descriptor |
|         if( NumRefIdxActive[ 1 ] > 1 && !sym_mvd_flag[ x0 ][ y0 ] ) | |
|            ref_idx_l1[ x0 ][ y0 ] | ae(v) |
|         if( mvd_l1_zero_flag && inter_pred_idc[ x0 ][ y0 ] = = PRED_BI ) { | |
|            MvdL1[ x0 ][ y0 ][ 0 ] = 0 | |
|            MvdL1[ x0 ][ y0 ][ 1 ] = 0 | |
|            MvdCpL1[ x0 ][ y0 ][ 0 ][ 0 ] = 0 | |
|            MvdCpL1[ x0 ][ y0 ][ 0 ][ 1 ] = 0 | |
|            MvdCpL1[ x0 ][ y0 ][ 1 ][ 0 ] = 0 | |
|            MvdCpL1[ x0 ][ y0 ][ 1 ][ 1 ] = 0 | |
|            MvdCpL1[ x0 ][ y0 ][ 2 ][ 0 ] = 0 | |
|            MvdCpL1[ x0 ][ y0 ][ 2 ][ 1 ] = 0 | |
|         } else { | |
|            if( sym_mvd_flag[ x0 ][ y0 ] ) { | |
|               MvdL1[ x0 ][ y0 ][ 0 ] = −MvdL0[ x0 ][ y0 ][ 0 ] | |
|               MvdL1[ x0 ][ y0 ][ 1 ] = −MvdL0[ x0 ][ y0 ][ 1 ] | |
|            } else | |
|               mvd_coding( x0, y0, 1, 0 ) | |
|            if( MotionModelIdc[ x0 ][ y0 ] > 0 ) | |
|               mvd_coding( x0, y0, 1, 1 ) | |
|            if(MotionModelIdc[ x0 ][ y0 ] > 1 ) | |
|               mvd_coding( x0, y0, 1, 2 ) | |
|            mvp_l1_flag[ x0 ][ y0 ] | ae(v) |
|         } | |
|     } else { | |
|         MvdL1[ x0 ][ y0 ][ 0 ] = 0 | |
|         MvdL1[ x0 ][ y0 ][ 1 ] = 0 | |
|     } | |
|     if( ( sps_amvr_enabled_flag && inter_affine_flag[ x0 ][ y0 ] = = 0 && | |
|         ( MvdL0[ x0 ][ y0 ][ 0 ] != 0 \|\| MvdL0[ x0 ][ y0 ][ 1 ] != 0 \|\| | |
|         MvdL1[ x0 ][ y0 ][ 0 ] != 0 \|\| MvdL1[ x0 ][ y0 ][ 1 ] != 0 ) ) \|\| | |
|       ( sps_affine_amvr_enabled_flag && inter_affine_flag[ x0 ][ y0 ] = = 1 && | |
|         ( MvdCpL0[ x0 ][ y0 ][ 0 ][ 0 ] != 0 \|\| MvdCpL0[ x0 ][ y0 ][ 0 ][ 1 ] != 0 \|\| | |
|         MvdCpL1[ x0 ][ y0 ][ 0 ][ 0 ] != 0 \|\| MvdCpL1[ x0 ][ y0 ][ 0 ][ 1 ] != 0 \|\| | |
|         MvdCpL0[ x0 ][ y0 ][ 1 ][ 0 ] != 0 \|\| MvdCpL0[ x0 ][ y0 ][ 1 ][ 1 ] != 0 \|\| | |
|         MvdCpL1[ x0 ][ y0 ][ 1 ][ 0 ] != 0 \|\| MvdCpL1[ x0 ][ y0 ][ 1 ][ 1 ] != 0 \|\| | |
|         MvdCpL0[ x0 ][ y0 ][ 2 ][ 0 ] != 0 \|\| MvdCpL0[ x0 ][ y0 ][ 2 ][ 1 ] != 0 \|\| | |
|         MvdCpL1[ x0 ][ y0 ][ 2 ][ 0 ] != 0 \|\| MvdCpL1[ x0 ][ y0 ][ 2 ][ 1 ] != 0 ) ) { | |
|       amvr_flag[ x0 ][ y0 ] | ae(v) |
|       if( (inter_affine_flag[ x0 ][ y0 ] = = 0 && amvr_flag[ x0 ][ y0 ] && | |
|         (MvdL0[ x0 ][ y0 ][ 0 ] != 0 \|\| MvdL1[ x0 ][ y0 ][ 0 ] != 0) | |
|         amvr_flag_x[ x0 ][ y0 ] | ae(v) |
|       if( (inter_affine_flag[ x0 ][ y0 ] = = 0 && amvr_flag[ x0 ][ y0 ] && | |
|         amvr_flag_x[ x0 ][ y0 ] && | |
|         (MvdL0[ x0 ][ y0 ][ 1 ] != 0 \|\| MvdL1[ x0 ][ y0 ][ 1 ] != 0) ) | |
|         amvr_flag_y[ x0 ][ y0 ] | ae(v) |
|       if( amvr_flag[ x0 ][ y0 ] ) | |
|         amvr_precision_flag[ x0 ][ y0 ] | ae(v) |
|     } | |
|      if( sps_bcw_enabled_flag && inter_pred_idc[ x0 ][ y0 ] = = PRED_BI && | |
|         luma_weight_l0_flag[ ref_idx_l0 [ x0 ][ y0 ] ] = = 0 && | |
|         luma_weight_l1_flag[ ref_idx_l1 [ x0 ][ y0 ] ] = = 0 && | |
|         chroma_weight_l0_flag[ ref_idx_l0 [ x0 ][ y0 ] ] = = 0 && | |
|         chroma_weight_l1_flag[ ref_idx_l1 [ x0 ][ y0 ] ] = = 0 && | |
|         cbWidth * cbHeight >= 256 ) | |
|         bcw_idx[ x0 ][ y0 ] | ae(v) |
|   } | |
| } | |
| if( !pcm_flag[ x0 ][ y0 ] ) { | |
|   if( CuPredMode[ x0 ][ y0 ] != MODE_INTRA && | |
|     general_merge_flag[ x0 ][ y0 ] = = 0 ) | |
|     cu_cbf | ae(v) |
|   if( cu_cbf ) { | |
|     if( CuPredMode[ x0 ][y0 ] = = MODE_INTER && sps_sbt_enabled_flag && | |
|       !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH \|\| allowSbtHorH \|\| allowSbtVerQ \|\| allowSbtHorQ ) | |
|           cu_sbt_flag | ae(v) |
|       } | |
|       if( cu_sbt_flag ) { | |
|         if( ( allowSbtVerH \|\| allowSbtHorH ) && ( allowSbtVerQ \|\| allowSbtHorQ) ) | |
|           cu_sbt_quad_flag | ae(v) |

-continued

Syntax Structure Listing 2: Example of coding_unit syntax structure according to embodiment 2.

| | Descriptor |
|---|---|
| ``if( ( cu_sbt_quad_flag && allowSbtVerQ && allowSbtHorQ ) ||`` | |
| ``    ( !cu_sbt_quad_flag && allowSbtVerH && allowSbtHorH ) )`` | |
| ``    cu_sbt_horizontal_flag`` | ae(v) |
| ``    cu_sbt_pos_flag`` | ae(v) |
| ``}`` | |
| ``}`` | |
| ``transform_tree( x0, y0, cbWidth, cbHeight, treeType )`` | |
| ``}`` | |
| ``}`` | |
| ``}`` | |

Syntax Structure Listing 3: Example of coding_unit syntax structure according to embodiment 3.

| | Descriptor |
|---|---|
| ``coding_unit( x0, y0, cbWidth, cbHeight, treeType ) {`` | |
| ``  if( slice_type != I || sps_ibc_enabled_flag ) {`` | |
| ``    if( treeType != DUAL_TREE_CHROMA &&`` | |
| ``      !( cbWidth == 4 && cbHeight == 4 && !sps_ibc_enabled_flag ) )`` | |
| ``      cu_skip_flag[ x0 ][ y0 ]`` | ae(v) |
| ``    if( cu_skip_flag[ x0 ][ y0 ] == 0 && slice_type != I`` | |
| ``      && !( cbWidth == 4 && cbHeight == 4 ) )`` | |
| ``      pred_mode_flag`` | ae(v) |
| ``    if( ( ( slice_type == I && cu_skip_flag[ x0 ][ y0 ] ==0 ) ||`` | |
| ``      ( slice_type != I && ( CuPredMode[ x0 ][ y0 ] != MODE_INTRA ||`` | |
| ``      ( cbWidth == 4 && cbHeight == 4 && cu_skip_flag[ x0 ][ y0 ] == 0 ) ) ) ) &&`` | |
| ``      sps_ibc_enabled_flag && ( cbWidth != 128 || cbHeight != 128 ) )`` | |
| ``      pred_mode_ibc_flag`` | ae(v) |
| ``  }`` | |
| ``  if( CuPredMode[ x0 ][ y0 ] == MODE_INTRA ) {`` | |
| ``    if( sps_pcm_enabled_flag &&`` | |
| ``      cbWidth >= MinIpcmCbSizeY && cbWidth <= MaxIpcmCbSizeY &&`` | |
| ``      cbHeight >= MinIpcmCbSizeY && cbHeight <= MaxIpcmCbSizeY )`` | |
| ``      pcm_flag[ x0 ][ y0 ]`` | ae(v) |
| ``    if( pcm_flag[ x0 ][ y0 ] ) {`` | |
| ``      while( !byte_aligned( ) )`` | |
| ``        pcm_alignment_zero_bit`` | f(1) |
| ``      pcm_sample( cbWidth, cbHeight, treeType)`` | |
| ``    } else {`` | |
| ``      if( treeType == SINGLE_TREE || treeType == DUAL_TREE_LUMA ) {`` | |
| ``        if( cbWidth <= 32 && cbHeight <= 32 )`` | |
| ``          intra_bdpcm_flag[ x0 ][ y0 ]`` | ae(v) |
| ``        if( intra_bdpcm_flag[ x0 ][ y0 ] )`` | |
| ``          intra_bdpcm_dir_flag [ x0 ][ y0 ]`` | ae(v) |
| ``        else {`` | |
| ``          if( sps_mip_enabled_flag &&`` | |
| ``            ( Abs( Log2( cbWidth ) - Log2( cbHeight ) ) <= 2 ) &&`` | |
| ``            cbWidth <= MaxTbSizeY && cbHeight <= MaxTbSizeY )`` | |
| ``            intra_mip_flag[ x0 ][ y0 ]`` | ae(v) |
| ``          if( intra_mip_flag[ x0 ][ y0 ] ) {`` | |
| ``            intra_mip_mpm_flag[ x0 ][ y0 ]`` | ae(v) |
| ``            if( intra_mip_mpm_flag[ x0 ][ y0 ] )`` | |
| ``              intra_mip_mpm_idx[ x0 ][ y0 ]`` | ae(v) |
| ``            else`` | |
| ``              intra_mip_mpm_remainder[ x0 ][ y0 ]`` | ae(v) |
| ``          } else {`` | |
| ``            if( sps_mrl_enabled_flag && ( ( y0% CtbSizeY ) > 0 ) )`` | |
| ``              intra_luma_ref_idx[ x0 ][ y0 ]`` | ae(v) |
| ``            if ( sps_isp_enabled_flag && intra_luma_ref_idx[ x0 ][ y0 ] == 0 &&`` | |
| ``              ( cbWidth <= MaxTbSizeY && cbHeight <= MaxTbSizeY ) &&`` | |
| ``              ( cbWidth * cbHeight > MinTbSizeY * MinTbSizeY ) )`` | |
| ``              intra_subpartitions_mode_flag[ x0 ][ y0 ]`` | ae(v) |
| ``            if( intra_subpartitions_mode_flag[ x0 ][ y0 ] == 1 &&`` | |
| ``              cbWidth <= MaxTbSizeY && cbHeight <= MaxTbSizeY )`` | |
| ``              intra_subpartitions_split_flag[ x0 ][ y0 ]`` | ae(v) |
| ``            if( intra_luma_ref_idx[ x0 ][ y0 ] == 0 &&`` | |
| ``              intra_subpartitions_mode_flag[ x0 ][ y0 ] == 0 )`` | |
| ``              intra_luma_mpm_flag[ x0 ][ y0 ]`` | ae(v) |
| ``            if( intra_luma_mpm_flag[ x0 ][ y0 ] ) {`` | |
| ``              if( intra_luma_ref_idx[ x0 ][ y0 ] == 0 )`` | |
| ``                intra_luma_not_planar_flag[ x0 ][ y0 ]`` | ae(v) |
| ``              if( intra_luma_not_planar_flag[ x0 ][ y0 ] )`` | |

-continued

Syntax Structure Listing 3: Example of coding_unit syntax structure according to embodiment 3.

|  | Descriptor |
|---|---|
|                 intra_luma_mpm_idx[ x0 ][ y0 ] | ae(v) |
|             } else | |
|                 intra_luma_mpm_remainder[ x0 ][ y0 ] | ae(v) |
|             } | |
|         } | |
|     } | |
|     if( treeType = = SINGLE_TREE || treeType = = DUAL_TREE_CHROMA ) | |
|         intra_chroma_pred_mode[ x0 ][ y0 ] | ae(v) |
| } | |
| } else if( treeType != DUAL_TREE_CHROMA ) { /* MODE_INTER or MODE_IBC */ | |
|     if( cu_skip_flag[ x0 ][ y0 ] = = 0 ) | |
|         general_merge_flag[ x0 ][ y0 ] | ae(v) |
|     if( general_merge_flag[ x0 ][ y0 ] ) { | |
|         merge_data( x0, y0, cbWidth, cbHeight ) | |
|     } else if ( CuPredMode[ x0 ][ y0 ] = = MODE_IBC ) { | |
|         mvd_coding( x0, y0, 0, 0 ) | |
|         mvp_l0_flag[ x0 ][ y0 ] | ae(v) |
|         if( sps_amvr_enabled_flag && | |
|             ( MvdL0[ x0 ][ y0 ][ 0 ] != 0 || MvdL0[ x0 ][ y0 ][ 1 ] != 0 ) ) { | |
|             amvr_precision_flag[ x0 ][ y0 ] | ae(v) |
|         } | |
|     } else { | |
|         if( slice_type = = B ) | |
|             inter_pred_idc[ x0 ][ y0 ] | ae(v) |
|         if( sps_affine_enabled_flag && cbWidth >= 16 && cbHeight >= 16 ) { | |
|             inter_affine_flag[ x0 ][ y0 ] | ae(v) |
|             if( sps_affine_type_flag && inter_affine_flag[ x0 ][ y0 ] ) | |
|                 cu_affine_type_flag[ x0 ][ y0 ] | ae(v) |
|         } | |
|         if( sps_smvd_enabled_flag && inter_pred_idc[ x0 ][ y0 ] = = PRED_BI && | |
|             !inter_affine_flag[ x0 ][ y0 ] && RefIdxSymL0 > -1 && RefIdxSymL1 > -1 ) | |
|             sym_mvd_flag[ x0 ][ y0 ] | ae(v) |
|         if( inter_pred_idc[ x0 ][ y0 ] != PRED_L1 ) { | |
|             if( NumRefIdxActive[ 0 ] > 1 && !sym_mvd_flag[ x0 ][ y0 ] ) | |
|                 ref_idx_l0[ x0 ][ y0 ] | ae(v) |
|             mvd coding( x0, y0, 0, 0 ) | |
|             if( MotionModelIdc[ x0 ][ y0 ] > 0 ) | |
|                 mvd_coding( x0, y0, 0, 1 ) | |
|             if(MotionModelIdc[ x0 ][ y0 ] > 1 ) | |
|                 mvd_coding( x0, y0, 0, 2 ) | |
|             mvp_l0_flag[ x0 ][ y0 ] | ae(v) |
|         } else { | |
|             MvdL0[ x0 ][ y0 ][ 0 ] = 0 | |
|             MvdL0[ x0 ][ y0 ][ 1 ] = 0 | |
|         } | |
|         if( inter_pred_idc[ x0 ][ y0 ] != PRED_L0 ) { | |
|             if( NumRefIdxActive[ 1 ] > 1 && !sym_mvd_flag[ x0 ][ y0 ] ) | |
|                 ref_idx_l1[ x0 ][ y0 ] | ae(v) |
|             if( mvd_l1_zero_flag && inter_pred_idc[ x0 ][ y0 ] = = PRED_BI ) { | |
|                 MvdL1[ x0 ][ y0 ][ 0 ] = 0 | |
|                 MvdL1[ x0 ][ y0 ][ 1 ] = 0 | |
|                 MvdCpL1[ x0 ][ y0 ][ 0 ][ 0 ] = 0 | |
|                 MvdCpL1[ x0 ][ y0 ][ 0 ][ 1 ] = 0 | |
|                 MvdCpL1[ x0 ][ y0 ][ 1 ][ 0 ] = 0 | |
|                 MvdCpL1[ x0 ][ y0 ][ 1 ][ 1 ] = 0 | |
|                 MvdCpL1[ x0 ][ y0 ][ 2 ][ 0 ] = 0 | |
|                 MvdCpL1[ x0 ][ y0 ][ 2 ][ 1 ] = 0 | |
|             } else { | |
|                 if( sym_mvd_flag[ x0 ][ y0 ] ) { | |
|                     MvdL1[ x0 ][ y0 ][ 0 ] = −MvdL0[ x0 ][ y0 ][ 0 ] | |
|                     MvdL1[ x0 ][ y0 ][ 1 ] = −MvdL0[ x0 ][ y0 ][ 1 ] | |
|                 } else | |
|                   mvd_coding( x0, y0, 1, 0 ) | |
|                 if( MotionModelIdc[ x0 ][ y0 ] > 0 ) | |
|                   mvd_coding( x0, y0, 1, 1 ) | |
|                 if(MotionModelIdc[ x0 ][ y0 ] > 1 ) | |
|                   mvd_coding( x0, y0, 1, 2 ) | |
|                 mvp_l1_flag[ x0 ][ y0 ] | ae(v) |
|             } | |
|         } else { | |
|             MvdL1[ x0 ][ y0 ][ 0 ] = 0 | |
|             MvdL1[ x0 ][ y0 ][ 1 ] = 0 | |
|         } | |
|         if( ( sps_amvr_enabled_flag && inter_affine_flag[ x0 ][ y0 ] = = 0 && | |
|             ( MvdL0[ x0 ][ y0 ][ 0 ] != 0 || MvdL0[ x0 ][ y0 ][ 1 ] != 0 || | |

Syntax Structure Listing 3: Example of coding_unit syntax structure according to embodiment 3.

|  | Descriptor |
|---|---|
| ``` |  |
|             MvdL1[ x0 ][ y0 ][ 0 ] != 0 || MvdL1[ x0 ][ y0 ][ 1 ] != 0 ) ) ||       |  |
|          ( sps_affine_amvr_enabled_flag && inter_affine_flag[ x0 ][ y0 ] = = 1 &&  |  |
|            ( MvdCpL0[ x0 ][ y0 ][ 0 ] [ 0 ] != 0 || MvdCpL0[ x0 ][ y0 ][ 0 ] [ 1 ] != 0 || |  |
|              MvdCpL1[ x0 ][ y0 ][ 0 ] [ 0 ] != 0 || MvdCpL1[ x0 ][ y0 ][ 0 ] [ 1 ] != 0 || |  |
|              MvdCpL0[ x0 ][ y0 ][ 1 ] [ 0 ] != 0 || MvdCpL0[ x0 ][ y0 ][ 1 ] [ 1 ] != 0 || |  |
|              MvdCpL1[ x0 ][ y0 ][ 1 ] [ 0 ] != 0 || MvdCpL1[ x0 ][ y0 ][ 1 ] [ 1 ] != 0 || |  |
|              MvdCpL0[ x0 ][ y0 ][ 2 ] [ 0 ] != 0 || MvdCpL0[ x0 ][ y0 ][ 2 ] [ 1 ] != 0 || |  |
|              MvdCpL1[ x0 ][ y0 ][ 2 ] [ 0 ] != 0 || MvdCpL1[ x0 ][ y0 ][ 2 ] [ 1 ] != 0 ) ) |  |
|    {                                                                                  |  |
|             amvr_flag[ x0 ][ y0 ]                                                     | ae(v) |
|             if( (inter_affine_flag[ x0 ][ y0 ] = = 1 && amvr_flag[ x0 ][ y0 ] &&      |  |
|              ( MvdCpL0[ x0 ][ y0 ][ 0 ] [ 0 ] != 0 ||                                 |  |
|              MvdCpL1[ x0 ][ y0 ][ 0 ] [ 0 ] != 0 ||                                   |  |
|              MvdCpL0[ x0 ][ y0 ][ 1 ] [ 0 ] != 0 ||                                   |  |
|              MvdCpL1[ x0 ][ y0 ][ 1 ] [ 0 ] != 0 ||                                   |  |
|              MvdCpL0[ x0 ][ y0 ][ 2 ] [ 0 ] != 0 ||                                   |  |
|              MvdCpL1[ x0 ][ y0 ][ 2 ] [ 0 ] != 0 ) )                                  |  |
|             amvr_flag_x[ x0 ][ y0 ]                                                   | ae(v) |
|             if( (inter_affine_flag[ x0 ][ y0 ] = = 1 && amvr_flag[ x0 ][ y0 ] &&      |  |
|              amvr_flag_x[ x0 ][ y0 ] &&                                               |  |
|              ( MvdCpL0[ x0 ][ y0 ][ 0 ] [ 1 ] != 0 ||                                 |  |
|              MvdCpL1[ x0 ][ y0 ][ 0 ] [ 1 ] != 0 ||                                   |  |
|              MvdCpL0[ x0 ][ y0 ][ 1 ] [ 1 ] != 0 ||                                   |  |
|              MvdCpL1[ x0 ][ y0 ][ 1 ] [ 1 ] != 0 ||                                   |  |
|              MvdCpL0[ x0 ][ y0 ][ 2 ] [ 1 ] != 0 ||                                   |  |
|              MvdCpL1[ x0 ][ y0 ][ 2 ] [ 1 ] != 0 ) )                                  |  |
|             amvr_flag_y[ x0 ][ y0 ]                                                   | ae(v) |
|             if( amvr_flag[ x0 ][ y0 ] )                                               |  |
|               amvr_precision_flag[ x0 ][ y0 ]                                         | ae(v) |
|    }                                                                                  |  |
|         if( sps_bcw_enabled_flag && inter_pred_idc[ x0 ][ y0 ] = = PRED_BI &&         |  |
|             luma_weight_l0_flag[ ref_idx_l0 [ x0 ][ y0 ] ] = = 0 &&                   |  |
|             luma_weight_l1_flag[ ref_idx_l1 [ x0 ][ y0 ] ] = = 0 &&                   |  |
|             chroma_weight_l0_flag[ ref_idx_l0 [ x0 ][ y0 ] ] = = 0 &&                 |  |
|             chroma_weight_l1_flag[ ref_idx_l1 [ x0 ][ y0 ] ] = = 0 &&                 |  |
|             cbWidth * cbHeight >= 256 )                                               |  |
|             bcw_idx[ x0 ][ y0 ]                                                       | ae(v) |
|        }                                                                              |  |
|     }                                                                                 |  |
|    if( !pcm_flag[ x0 ][ y0 ] ) {                                                      |  |
|      if( CuPredMode[ x0 ][ y0 ] != MODE_INTRA &&                                      |  |
|         general_merge_flag[ x0 ][ y0 ] = = 0 )                                        |  |
|           cu_cbf                                                                      | ae(v) |
|       if( cu_cbf ) {                                                                  |  |
|          if( CuPredMode[ x0 ][ y0 ] = = MODE_INTER && sps_sbt_enabled_flag &&         |  |
|             !ciip_flag[ x0 ][ y0 ] && !MergeTriangleFlag[ x0 ][ y0 ] ) {              |  |
|             if( cbWidth <= MaxSbtSize && cbHeight <= MaxSbtSize ) {                   |  |
|                 allowSbtVerH = cbWidth >= 8                                           |  |
|                 allowSbtVerQ = cbWidth >= 16                                          |  |
|                 allowSbtHorH = cbHeight >= 8                                          |  |
|                 allowSbtHorQ = cbHeight >= 16                                         |  |
|                 if( allowSbtVerH || allowSbtHorH || allowSbtVerQ || allowSbtHorQ )    |  |
|                    cu_sbt_flag                                                        | ae(v) |
|             }                                                                         |  |
|             if( cu_sbt_flag ) {                                                       |  |
|                 if( ( allowSbtVerH || allowSbtHorH ) && ( allowSbtVerQ || allowSbtHorQ) ) |  |
|                    cu_sbt_quad_flag                                                   | ae(v) |
|                 if( ( cu_sbt_quad_flag && allowSbtVerQ && allowSbtHorQ ) ||           |  |
|                      ( !cu_sbt_quad_flag && allowSbtVerH && allowSbtHorH ) )          |  |
|                    cu_sbt_horizontal_flag                                             | ae(v) |
|                  cu_sbt_pos_flag                                                      | ae(v) |
|             }                                                                         |  |
|          }                                                                            |  |
|          transform_tree( x0, y0, cbWidth, cbHeight, treeType )                        |  |
|       }                                                                               |  |
|     }                                                                                 |  |
|    }                                                                                  |  |

Syntax Structure Listing 4: Example of coding_unit syntax structure according to embodiment 4.

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType !=DUAL_TREE_CHROMA && | |
|       !( cbWidth = = 4 && cbHeight = = 4 && !sps_ibc_enabled_flag ) ) | |
|         cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) ) | |
|         pred_mode_flag | ae(v) |
|     if( ( ( slice_type = = I && cu_skip_flag[ x0 ][ y0 ] = =0 ) \|\| | |
|       ( slice_type != I && ( CuPredMode[ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 \|\| cbHeight != 128 ) ) | |
|         pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( cbWidth <= 32 && cbHeight <= 32 ) | |
|           intra_bdpcm_flag[ x0 ][ y0 ] | ae(v) |
|         if( intra_bdpcm_flag[ x0 ][ y0 ] ) | |
|           intra_bdpcm_dir_flag [ x0 ][ y0 ] | ae(v) |
|         else { | |
|           if( sps_mip_enabled_flag && | |
|             ( Abs( Log2( cbWidth ) − Log2( cbHeight ) ) <= 2 ) && | |
|             cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) { | |
|             intra_mip_mpm_flag[ x0 ][ y0 ] | ae(v) |
|             if( intra_mip_mpm_flag[ x0 ][ y0 ] ) | |
|               intra_mip_mpm_idx[ x0 ][ y0 ] | ae(v) |
|             else | |
|               intra_mip_mpm_remainder[ x0 ][ y0 ] | ae(v) |
|           } else { | |
|             if( sps_mrl_enabled_flag && ( ( y0% CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && | |
|               ( cbWidth <= MaxTbSizeY && cbHeight <= MaxTbSizeY ) && | |
|               ( cbWidth * cbHeight > MinTbSizeY * MinTbSizeY ) ) | |
|               intra_subpartitions_mode_flag[ x0 ][ y0 ] | ae(v) |
|             if( intra_subpartitions_mode_flag[ x0 ][ y0 ] = = 1 && | |
|               cbWidth <= MaxTbSizeY && cbHeight <= MaxTbSizeY ) | |
|               intra_subpartitions_split_flag[ x0 ][ y0 ] | ae(v) |
|             if( intra_luma_ref_idx[ x0 ][ y0 ] = = 0 && | |
|               intra_subpartitions_mode_flag[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |
|         } | |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     if( cu_skip_flag[ x0 ][ y0 ] = = 0 ) | |
|       general_merge_flag[ x0 ][ y0 ] | ae(v) |
|     if( general_merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |
|       mvd_coding( x0, y0, 0, 0 ) | |
|       mvp_l0_flag[ x0 ][ y0 ] | ae(v) |
|       if( sps_amvr_enabled_flag && | |
|         ( MvdL0[ x0 ][ y0 ][ 0 ] != 0 \|\| MvdL0[ x0 ][ y0 ][ 1 ] != 0 ) ) { | |
|         amvr_precision_flag[ x0 ][ y0 ] | ae(v) |

-continued

Syntax Structure Listing 4: Example of coding_unit syntax structure according to embodiment 4.

|  | Descriptor |
|---|---|
|     } <br>   } else { <br>     if( slice_type == B ) <br>       inter_pred_idc[ x0 ][ y0 ] | ae(v) |
|     if( sps_affine_enabled_flag && cbWidth >= 16 && cbHeight >= 16 ) { <br>       inter_affine_flag[ x0 ][ y0 ] | ae(v) |
|       if( sps_affine_type_flag && inter_affine_flag[ x0 ][ y0 ] ) <br>         cu_affine_type_flag[ x0 ][ y0 ] | ae(v) |
|     } <br>     if( sps_smvd_enabled_flag && inter_pred_idc[ x0 ][ y0 ] == PRED_BI && <br>       !inter_affine_flag[ x0 ][ y0 ] && RefIdxSymL0 > −1 && RefIdxSymL1 > −1 ) <br>       sym_mvd_flag[ x0 ][ y0 ] | ae(v) |
|     if( inter_pred_idc[ x0 ][ y0 ] != PRED_L1 ) { <br>       if( NumRefIdxActive[ 0 ] > 1 && !sym_mvd_flag[ x0 ][ y0 ] ) <br>         ref_idx_l0[ x0 ][ y0 ] | ae(v) |
|       mvd_coding( x0, y0, 0, 0 ) <br>       if( MotionModelIdc[ x0 ][ y0 ] > 0 ) <br>         mvd_coding( x0, y0, 0, 1 ) <br>       if(MotionModelIdc[ x0 ][ y0 ] > 1 ) <br>         mvd_coding( x0, y0, 0, 2 ) <br>       mvp_l0_flag[ x0 ][ y0 ] | ae(v) |
|     } else { <br>       MvdL0[ x0 ][ y0 ][ 0 ] = 0 <br>       MvdL0[ x0 ][ y0 ][ 1 ] = 0 <br>     } <br>     if( inter_pred_idc[ x0 ][ y0 ] != PRED_L0 ) { <br>       if( NumRefIdxActive[ 1 ] > 1 && !sym_mvd_flag[ x0 ][ y0 ] ) <br>         ref_idx_l1[ x0 ][ y0 ] | ae(v) |
|       if( mvd_l1_zero_flag && inter_pred_idc[ x0 ][ y0 ] == PRED_BI ) { <br>         MvdL1[ x0 ][ y0 ][ 0 ] = 0 <br>         MvdL1[ x0 ][ y0 ][ 1 ] = 0 <br>         MvdCpL1[ x0 ][ y0 ][ 0 ][ 0 ] = 0 <br>         MvdCpL1[ x0 ][ y0 ][ 0 ][ 1 ] = 0 <br>         MvdCpL1[ x0 ][ y0 ][ 1 ][ 0 ] = 0 <br>         MvdCpL1[ x0 ][ y0 ][ 1 ][ 1 ] = 0 <br>         MvdCpL1[ x0 ][ y0 ][ 2 ][ 0 ] = 0 <br>         MvdCpL1[ x0 ][ y0 ][ 2 ][ 1 ] = 0 <br>       } else { <br>         if( sym_mvd_flag[ x0 ][ y0 ] ) { <br>           MvdL1[ x0 ][ y0 ][ 0 ] = −MvdL0[ x0 ][ y0 ][ 0 ] <br>           MvdL1[ x0 ][ y0 ][ 1 ] = −MvdL0[ x0 ][ y0 ][ 1 ] <br>         } else <br>           mvd_coding( x0, y0, 1, 0 ) <br>         if( MotionModelIdc[ x0 ][ y0 ] > 0 ) <br>           mvd_coding( x0, y0, 1, 1 ) <br>         if(MotionModelIdc[ x0 ][ y0 ] > 1 ) <br>           mvd_coding( x0, y0, 1, 2 ) <br>         mvp_l1_flag[ x0 ][ y0 ] | ae(v) |
|     } else { <br>       MvdL1[ x0 ][ y0 ][ 0 ] = 0 <br>       MvdL1[ x0 ][ y0 ][ 1 ] = 0 <br>     } <br>     if( ( sps_amvr_enabled_flag && inter_affine_flag[ x0 ][ y0 ] == 0 && <br>       ( MvdL0[ x0 ][ y0 ][ 0 ] != 0 || MvdL0[ x0 ][ y0 ][ 1 ] != 0 || <br>         MvdL1[ x0 ][ y0 ][ 0 ] != 0 || MvdL1[ x0 ][ y0 ][ 1 ] != 0 ) ) || <br>       ( sps_affine_amvr_enabled_flag && inter_affine_flag[ x0 ][ y0 ] == 1 && <br>         ( MvdCpL0[ x0 ][ y0 ][ 0 ][ 0 ] != 0 || MvdCpL0[ x0 ][ y0 ][ 0 ][ 1 ] != 0 || <br>           MvdCpL1[ x0 ][ y0 ][ 0 ][ 0 ] != 0 || MvdCpL1[ x0 ][ y0 ][ 0 ][ 1 ] != 0 || <br>           MvdCpL0[ x0 ][ y0 ][ 1 ][ 0 ] != 0 || MvdCpL0[ x0 ][ y0 ][ 1 ][ 1 ] != 0 || <br>           MvdCpL1[ x0 ][ y0 ][ 1 ][ 0 ] != 0 || MvdCpL1[ x0 ][ y0 ][ 1 ][ 1 ] != 0 || <br>           MvdCpL0[ x0 ][ y0 ][ 2 ][ 0 ] != 0 || MvdCpL0[ x0 ][ y0 ][ 2 ][ 1 ] != 0 || <br>           MvdCpL1[ x0 ][ y0 ][ 2 ][ 0 ] != 0 || MvdCpL1[ x0 ][ y0 ][ 2 ][ 1 ] != 0 ) ) <br> { <br>       amvr_flag[ x0 ][ y0 ] | ae(v) |
|       if( (inter_affine_flag[ x0 ][ y0 ] == 0 && amvr_flag[ x0 ][ y0 ] && <br>         (MvdL0[ x0 ][ y0 ][ 0 ] != 0 || MvdL0[ x0 ][ y0 ][ 1 ] != 0) && <br>         !sym_mvd_flag[ x0 ][ y0 ]) <br>         amvr_flag_L0[ x0 ][ y0 ] | ae(v) |
|       if( (inter_affine_flag[ x0 ][ y0 ] == 0 && amvr_flag[ x0 ][ y0 ] && <br>         amvr_flag_L0[ x0 ][ y0 ] && <br>         (MvdL1[ x0 ][ y0 ][ 0 ] != 0 || MvdL1[ x0 ][ y0 ][ 1 ] != 0) && <br>         !sym_mvd_flag[ x0 ][ y0 ])) <br>         amvr_flag_L1[ x0 ][ y0 ] | ae(v) |
|       if( amvr_flag[ x0 ][ y0 ] ) <br>         amvr_precision_flag[ x0 ][ y0 ] | ae(v) |

| Syntax Structure Listing 4: Example of coding_unit syntax structure according to embodiment 4. | |
|---|---|
| | Descriptor |

```
      }
      if( sps_bcw_enabled_flag && inter_pred_idc[ x0 ][ y0 ] = = PRED_BI &&
            luma_weight_l0_flag[ ref_idx_l0 [ x0 ][ y0 ] ] = = 0 &&
            luma_weight_l1_flag[ ref_idx_l1 [ x0 ][ y0 ] ] = = 0 &&
            chroma_weight_l0_flag[ ref_idx_l0 [ x0 ][ y0 ] ] = = 0 &&
            chroma_weight_l1_flag[ ref_idx_l1 [ x0 ][ y0 ] ] = = 0 &&
            cbWidth * cbHeight >= 256 )
         bcw_idx[ x0 ][ y0 ]                                                          ae(v)
   }
 }
 if( !pcm_flag[ x0 ][ y0 ] ) {
   if( CuPredMode[ x0 ][ y0 ] != MODE_INTRA &&
         general_merge_flag[ x0 ][ y0 ] = = 0 )
      cu_cbf                                                                          ae(v)
   if( cu_cbf ) {
      if( CuPredMode[ x0 ][ y0 ] = = MODE_INTER && sps_sbt_enabled_flag &&
            !ciip_flag[ x0 ][ y0 ] && !MergeTriangleFlag[ x0 ][ y0 ] ) {
         if( cbWidth <= MaxSbtSize && cbHeight <= MaxSbtSize ) {
            allowSbtVerH = cbWidth >= 8
            allowSbtVerQ = cbWidth >= 16
            allowSbtHorH = cbHeight >= 8
            allowSbtHorQ = cbHeight >= 16
            if( allowSbtVerH || allowSbtHorH || allowSbtVerQ || allowSbtHorQ )
               cu_sbt_flag                                                            ae(v)
         }
         if( cu_sbt_flag ) {
            if( ( allowSbtVerH || allowSbtHorH ) && ( allowSbtVerQ || allowSbtHorQ) )
               cu_sbt_quad_flag                                                       ae(v)
            if( ( cu_sbt_quad_flag && allowSbtVerQ && allowSbtHorQ ) ||
                  ( !cu_sbt_quad_flag && allowSbtVerH && allowSbtHorH ) )
               cu_sbt_horizontal_flag                                                 ae(v)
            cu_sbt_pos_flag                                                           ae(v)
         }
      }
      transform_tree( x0, y0, cbWidth, cbHeight, treeType )
   }
 }
}
```

| Syntax Structure Listing 5: Example of coding_unit syntax structure according to embodiment 5. | |
|---|---|
| | Descriptor |

```
coding_unit( x0, y0, cbWidth, cbHeight, treeType ) {
   if( slice_type != I || sps_ibc_enabled_flag ) {
      if( treeType != DUAL_TREE_CHROMA &&
            !( cbWidth = = 4 && cbHeight = = 4 && !sps_ibc_enabled_flag ) )
         cu_skip_flag[ x0 ][ y0 ]                                                     ae(v)
      if( cu_skip_flag[ x0 ][ y0 ] = = 0 && slice_type != I
            && !( cbWidth = = 4 && cbHeight = = 4 ) )
         pred_mode_flag                                                               ae(v)
      if( ( ( slice_type = = I && cu_skip_flag[ x0 ][ y0 ] = =0 ) ||
            ( slice_type != I && ( CuPredMode[ x0 ][ y0 ] != MODE_INTRA ||
            ( cbWidth = = 4 && cbHeight = = 4 && cu_skip_flag[ x0 ][ y0 ] = = 0 ) ) ) ) &&
            sps_ibc_enabled_flag && ( cbWidth != 128 || cbHeight != 128 ) )
         pred_mode_ibc_flag                                                           ae(v)
   }
   if( CuPredMode[ x0 ][ y0 ] = = MODE_INTRA ) {
      if( sps_pcm_enabled_flag &&
            cbWidth >= MinIpcmCbSizeY && cbWidth <= MaxIpcmCbSizeY &&
            cbHeight >= MinIpcmCbSizeY && cbHeight <= MaxIpcmCbSizeY )
         pcm_flag[ x0 ][ y0 ]                                                         ae(v)
      if( pcm_flag[ x0 ][ y0 ] ) {
         while( !byte_aligned( ) )
            pcm_alignment_zero_bit                                                    f(1)
         pcm_sample( cbWidth, cbHeight, treeType)
      } else {
         if( treeType = = SINGLE_TREE || treeType = = DUAL_TREE_LUMA ) {
            if( cbWidth <= 32 && cbHeight <= 32 )
               intra_bdpcm_flag[ x0 ][ y0 ]                                           ae(v)
            if( intra_bdpcm_flag[ x0 ][ y0 ] )
               intra_bdpcm_dir_flag [ x0 ][ y0 ]                                      ae(v)
```

-continued

Syntax Structure Listing 5: Example of coding_unit syntax structure according to embodiment 5.

|  | Descriptor |
|---|---|
| ``````else {`<br>``````    if( sps_mip_enabled_flag &&`<br>``````        ( Abs( Log2( cbWidth ) − Log2( cbHeight ) ) <= 2 ) &&`<br>``````        cbWidth <= MaxTbSizeY && cbHeight <= MaxTbSizeY )`<br>``````        intra_mip_flag[ x0 ][ y0 ]` | ae(v) |
| ``````    if( intra_mip_flag[ x0 ][ y0 ] ) {`<br>``````        intra_mip_mpm_flag[ x0 ][ y0 ]` | ae(v) |
| ``````        if( intra_mip_mpm_flag[ x0 ][ y0 ] )`<br>``````            intra_mip_mpm_idx[ x0 ][ y0 ]` | ae(v) |
| ``````        else`<br>``````            intra_mip_mpm_remainder[ x0 ][ y0 ]` | ae(v) |
| ``````    } else {`<br>``````        if( sps_mrl_enabled_flag && ( ( y0% CtbSizeY ) > 0 ) )`<br>``````            intra_luma_ref_idx[ x0 ][ y0 ]` | ae(v) |
| ``````        if ( sps_isp_enabled_flag && intra_luma_ref_idx[ x0 ][ y0 ] = = 0 &&`<br>``````            ( cbWidth <= MaxTbSizeY && cbHeight <= MaxTbSizeY ) &&`<br>``````            ( cbWidth * cbHeight > MinTbSizeY * MinTbSizeY ) )`<br>``````            intra_subpartitions_mode_flag[ x0 ][ y0 ]` | ae(v) |
| ``````        if( intra_subpartitions_mode_flag[ x0 ][ y0 ] = = 1 &&`<br>``````            cbWidth <= MaxTbSizeY && cbHeight <= MaxTbSizeY )`<br>``````            intra_subpartitions_split_flag[ x0 ][ y0 ]` | ae(v) |
| ``````        if( intra_luma_ref_idx[ x0 ][ y0 ] = = 0 &&`<br>``````            intra_subpartitions_mode_flag[ x0 ][ y0 ] = = 0 )`<br>``````            intra_luma_mpm_flag[ x0 ][ y0 ]` | ae(v) |
| ``````        if( intra_luma_mpm_flag[ x0 ][ y0 ] ) {`<br>``````            if( intra_luma_ref_idx[ x0 ][ y0 ] = = 0 )`<br>``````                intra_luma_not_planar_flag[ x0 ][ y0 ]` | ae(v) |
| ``````            if( intra_luma_not_planar_flag[ x0 ][ y0 ] )`<br>``````                intra_luma_mpm_idx[ x0 ][ y0 ]` | ae(v) |
| ``````        } else`<br>``````            intra_luma_mpm_remainder[ x0 ][ y0 ]` | ae(v) |
| ``````        }`<br>``````    }`<br>``````}`<br>``````if( treeType = = SINGLE_TREE || treeType = = DUAL_TREE_CHROMA )`<br>``````    intra_chroma_pred_mode[ x0 ][ y0 ]` | ae(v) |
| ``````}`<br>``````} else if( treeType != DUAL_TREE_CHROMA ) { /* MODE_INTER or MODE_IBC */`<br>``````    if( cu_skip_flag[ x0 ][ y0 ] = = 0 )`<br>``````        general_merge_flag[ x0 ][ y0 ]` | ae(v) |
| ``````    if( general_merge_flag[ x0 ][ y0 ] ) {`<br>``````        merge_data( x0, y0, cbWidth, cbHeight )`<br>``````    } else if ( CuPredMode[ x0 ][ y0 ] = = MODE_IBC ) {`<br>``````        mvd_coding( x0, y0, 0, 0 )`<br>``````        mvp_l0_flag[ x0 ][ y0 ]` | ae(v) |
| ``````        if( sps_amvr_enabled_flag &&`<br>``````            ( MvdL0[ x0 ][ y0 ][ 0 ] != 0 || MvdL0[ x0 ][ y0 ][ 1 ] != 0 ) ) {`<br>``````            amvr_precision_flag[ x0 ][ y0 ]` | ae(v) |
| ``````        }`<br>``````    } else {`<br>``````        if( slice_type = = B )`<br>``````            inter_pred_idc[ x0 ][ y0 ]` | ae(v) |
| ``````        if( sps_affine_enabled_flag && cbWidth >= 16 && cbHeight >= 16 ) {`<br>``````            inter_affine_flag[ x0 ][ y0 ]` | ae(v) |
| ``````            if( sps_affine_type_flag && inter_affine_flag[ x0 ][ y0 ] )`<br>``````                cu_affine_type_flag[ x0 ][ y0 ]` | ae(v) |
| ``````        }`<br>``````        if( sps_smvd_enabled_flag && inter_pred_idc[ x0 ][ y0 ] = = PRED_BI &&`<br>``````            !inter_affine_flag[ x0 ][ y0 ] && RefIdxSymL0 > −1 && RefIdxSymL1 > −1 )`<br>``````            sym_mvd_flag[ x0 ][ y0 ]` | ae(v) |
| ``````        if( inter_pred_idc[ x0 ][ y0 ] != PRED_L1 ) {`<br>``````            if( NumRefIdxActive[ 0 ] > 1 && !sym_mvd_flag[ x0 ][ y0 ] )`<br>``````                ref_idx_l0[ x0 ][ y0 ]` | ae(v) |
| ``````            mvd coding( x0, y0, 0, 0 )`<br>``````            if( MotionModelIdc[ x0 ][ y0 ] > 0 )`<br>``````                mvd_coding( x0, y0, 0, 1 )`<br>``````            if(MotionModelIdc[ x0 ][ y0 ] > 1 )`<br>``````                mvd_coding( x0, y0, 0, 2 )`<br>``````            mvp_l0_flag[ x0 ][ y0 ]` | ae(v) |
| ``````        } else {`<br>``````            MvdL0[ x0 ][ y0 ][ 0 ] = 0`<br>``````            MvdL0[ x0 ][ y0 ][ 1 ] = 0`<br>``````        }`<br>``````        if( inter_pred_idc[ x0 ][ y0 ] != PRED_L0 ) {`<br>``````            if( NumRefIdxActive[ 1 ] > 1 && !sym_mvd_flag[ x0 ][ y0 ] )` |  |

Syntax Structure Listing 5: Example of coding_unit syntax structure according to embodiment 5.

| | Descriptor |
|---|---|
| ref_idx_l1[ x0 ][ y0 ] | ae(v) |
|     if( mvd_l1_zero_flag && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|     } else { | |
|         if( sym_mvd_flag[ x0 ][ y0 ] ) { | |
|             MvdL1[ x0 ][ y0 ][ 0 ] = −MvdL0[ x0 ][ y0 ][ 0 ] | |
|             MvdL1[ x0 ][ y0 ][ 1 ] = −MvdL0[ x0 ][ y0 ][ 1 ] | |
|         } else | |
|             mvd_coding( x0, y0, 1, 0 ) | |
|         if( MotionModelIdc[ x0 ][ y0 ] > 0 ) | |
|             mvd_coding( x0, y0, 1, 1 ) | |
|         if(MotionModelIdc[ x0 ][ y0 ] > 1 ) | |
|             mvd_coding( x0, y0, 1, 2 ) | |
|         mvp_l1_flag[ x0 ][ y0 ] | ae(v) |
|     } | |
| } else { | |
|     MvdL1[ x0 ][ y0 ][ 0 ] = 0 | |
|     MvdL1[ x0 ][ y0 ][ 1 ] = 0 | |
| } | |
| if( ( sps_amvr_enabled_flag && inter_affine_flag[ x0 ][ y0 ] = = 0 && | |
|     (MvdL0[ x0 ][ y0 ][ 0 ] != 0 \|\| MvdL0[ x0 ][ y0 ][ 1 ] != 0 \|\| | |
|     MvdL1[ x0 ][ y0 ][ 0 ] != 0 \|\| MvdL1[ x0 ][ y0 ][ 1 ] != 0 ) ) \|\| | |
|     ( sps_affine_amvr_enabled_flag && inter_affine_flag[ x0 ][ y0 ] = = 1 && | |
|     ( MvdCpL0[ x0 ][ y0 ][ 0 ][ 0 ] != 0 \|\| MvdCpL0[ x0 ][ y0 ][ 0 ][ 1 ] != 0 \|\| | |
|     MvdCpL1[ x0 ][ y0 ][ 0 ][ 0 ] != 0 \|\| MvdCpL1[ x0 ][ y0 ][ 0 ][ 1 ] != 0 \|\| | |
|     MvdCpL0[ x0 ][ y0 ][ 1 ][ 0 ] != 0 \|\| MvdCpL0[ x0 ][ y0 ][ 1 ][ 1 ] != 0 \|\| | |
|     MvdCpL1[ x0 ][ y0 ][ 1 ][ 0 ] != 0 \|\| MvdCpL1[ x0 ][ y0 ][ 1 ][ 1 ] != 0 \|\| | |
|     MvdCpL0[ x0 ][ y0 ][ 2 ][ 0 ] != 0 \|\| MvdCpL0[ x0 ][ y0 ][ 2 ][ 1 ] != 0 \|\| | |
|     MvdCpL1[ x0 ][ y0 ][ 2 ][ 0 ] != 0 \|\| MvdCpL1[ x0 ][ y0 ][ 2 ][ 1 ] != 0 ) ) { | |
|     amvr_flag[ x0 ][ y0 ] | ae(v) |
|     if( (inter_affine_flag[ x0 ][ y0 ] = = 1 && amvr_flag[ x0 ][ y0 ] && | |
|     ( MvdCpL0[ x0 ][ y0 ][ 0 ] [ 0 ] != 0 \|\| MvdCpL0[ x0 ][ y0 ][ 0 ] [ 1 ] != 0 \|\| | |
|     MvdCpL0[ x0 ][ y0 ][ 1 ] [ 0 ] != 0 \|\| MvdCpL0[ x0 ][ y0 ][ 1 ] [ 1 ] != 0 \|\| | |
|     MvdCpL0[ x0 ][ y0 ][ 2 ] [ 0 ] != 0 \|\| MvdCpL0[ x0 ][ y0 ][ 2 ] [ 1 ] != 0 )) | |
|     amvr_flag_L0[ x0 ][ y0 ] | ae(v) |
|     if( (inter_affine_flag[ x0 ][ y0 ] = = 1 && amvr_flag[ x0 ][ y0 ] && | |
|     amvr_flag_L0[ x0 ][ y0 ] && | |
|     ( MvdCpL1[ x0 ][ y0 ][ 0 ] [ 0 ] != 0 \|\| MvdCpL1[ x0 ][ y0 ][ 0 ] [ 1 ] != 0 \|\| | |
|     MvdCpL1[ x0 ][ y0 ][ 1 ] [ 0 ] != 0 \|\| MvdCpL1[ x0 ][ y0 ][ 1 ] [ 1 ] != 0 \|\| | |
|     MvdCpL1[ x0 ][ y0 ][ 2 ] [ 0 ] != 0 \|\| MvdCpL1[ x0 ][ y0 ][ 2 ] [ 1 ] != 0 )) | |
|     amvr_flag_L1[ x0 ][ y0 ] | ae(v) |
|     if( amvr_flag[ x0 ][ y0 ] ) | |
|         amvr_precision_flag[ x0 ][ y0 ] | ae(v) |
| } | |
|   if( sps_bcw_enabled_flag && inter_pred_idc[ x0 ][ y0 ] = = PRED_BI && | |
|     luma_weight_l0_flag[ ref_idx_l0 [ x0 ][ y0 ] ] = = 0 && | |
|     luma_weight_l1_flag[ ref_idx_l1 [ x0 ][ y0 ] ] = = 0 && | |
|     chroma_weight_l0_flag[ ref_idx_l0 [ x0 ][ y0 ] ] = = 0 && | |
|     chroma_weight_l1_flag[ ref_idx_l1 [ x0 ][ y0 ] ] = = 0 && | |
|     cbWidth * cbHeight >= 256 ) | |
|     bcw_idx[ x0 ][ y0 ] | ae(v) |
|   } | |
| } | |
| if( !pcm_flag[ x0 ][ y0 ] ) { | |
|   if( CuPredMode[ x0 ][ y0 ] != MODE_INTRA && | |
|     general_merge_flag[ x0 ][ y0 ] = = 0 ) | |
|     cu_cbf | ae(v) |
|   if( cu_cbf ) { | |
|     if( CuPredMode[ x0 ][ y0 ] = = MODE_INTER && sps_sbt_enabled_flag && | |
|     !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= 16 | |
|         allowSbtHorH = cbHeight >= 8 | |
|         allowSbtHorQ = cbHeight >= 16 | |
|         if( allowSbtVerH \|\| allowSbtHorH \|\| allowSbtVerQ \|\| allowSbtHorQ ) | |
|             cu_sbt_flag | ae(v) |
|       } | |

-continued

Syntax Structure Listing 5: Example of coding_unit syntax structure according to embodiment 5.

|  | Descriptor |
|---|---|
| ``` |  |
|             if( cu_sbt_flag ) { |  |
|                 if( ( allowSbtVerH || allowSbtHorH ) && ( allowSbtVerQ || allowSbtHorQ) ) |  |
|                     cu_sbt_quad_flag | ae(v) |
|                 if( ( cu_sbt_quad_flag && allowSbtVerQ && allowSbtHorQ ) || |  |
|                     ( !cu_sbt_quad_flag && allowSbtVerH && allowSbtHorH ) ) |  |
|                     cu_sbt_horizontal_flag | ae(v) |
|                 cu_sbt_pos_flag | ae(v) |
|             } |  |
|         } |  |
|         transform_tree( x0, y0, cbWidth, cbHeight, treeType ) |  |
|     } |  |
|   } |  |
| } |  |
| ``` |  |

The invention claimed is:

1. A method in a decoder comprising:
parsing at least one current motion vector difference for a coding unit;
determining a first precision level used to represent a motion vector difference when associated with a first reference list and a second precision level used to represent motion vector difference when associated with a second reference list;
converting the current motion vector difference from the first precision level to a third precision level used by the decoder to represent motion data if the current motion vector difference is associated with the first reference list and converting the current motion vector difference from the second precision level to the third precision level if the current motion vector difference is associated with the second reference list;
obtaining at least one motion vector associated with the coding unit based on the current motion vector difference and a motion vector predictor; and
reconstructing the coding unit based on the motion vector.

2. The method of claim 1, wherein parsing the current motion vector difference comprises parsing a first motion vector difference associated with the first reference list and a second motion vector difference associated with the second reference list.

3. The method of claim 2, wherein the first precision level represents a first accuracy level for the first motion vector difference and the second precision level represents a second accuracy level of the second motion vector difference.

4. The method of claim 1, wherein determining the first precision level comprises parsing a first syntax element associated with the first reference list and determining the first precision level based on the first syntax element and wherein determining the second precision level comprises parsing a second syntax element associated with the second reference list and determining the second precision level based on the second syntax element.

5. The method of claim 4, wherein the first syntax element indicates whether the motion vector difference when associated with the first reference list is represented in quarter luma precision level or not and wherein the second syntax element indicates whether the motion vector difference when associated with the second reference list is represented in quarter luma precision level or not.

6. A method in an encoder comprising:
obtaining at least one current motion vector difference for a coding unit;
determining a first precision level used to represent a motion vector difference when associated with a first reference list and a second precision level used to represent motion vector difference when associated with a second reference list;
converting the current motion vector difference from the first precision level to a third precision level used by the encoder to represent motion data if the current motion vector difference is associated with the first reference list and converting the current motion vector difference from the second precision level to the third precision level if the current motion vector difference is associated with the second reference list;
obtaining at least one motion vector associated with the coding unit based on the current motion vector difference and a motion vector predictor; and
reconstructing the coding unit based on the motion vector.

7. The method of claim 6, wherein parsing the current motion vector difference comprises parsing a first motion vector difference associated with the first reference list and a second motion vector difference associated with the second reference list.

8. The method of claim 7, wherein the first precision level represents a first accuracy level for the first motion vector difference and the second precision level represents a second accuracy level of the second motion vector difference.

9. The method of claim 6, wherein determining the first precision level comprises parsing a first syntax element associated with the first reference list and determining the first precision level based on the first syntax element and wherein determining the second precision level comprises parsing a second syntax element associated with the second reference list and determining the second precision level based on the second syntax element.

10. The method of claim 9, wherein the first syntax element indicates whether the motion vector difference when associated with the first reference list is represented in quarter luma precision level or not and wherein the second syntax element indicates whether the motion vector difference when associated with the second reference list is represented in quarter luma precision level or not.

11. An apparatus in a decoder comprising one or more processors and at least one memory coupled to said one or more processors, wherein said one or more processors are configured to perform:
parsing at least one current motion vector difference for a coding unit;
determining a first precision level used to represent a motion vector difference when associated with a first reference list and a second precision level used to represent motion vector difference when associated with a second reference list;

converting the current motion vector difference from the first precision level to a third precision level used by the decoder to represent motion data if the current motion vector difference is associated with the first reference list and converting the current motion vector difference from the second precision level to the third precision level if the current motion vector difference is associated with the second reference list;

obtaining at least one motion vector associated with the coding unit based on the current motion vector difference and a motion vector predictor; and reconstructing the coding unit based on the motion vector.

12. The apparatus of claim 11, wherein parsing the current motion vector difference comprises parsing a first motion vector difference associated with the first reference list and a second motion vector difference associated with the second reference list.

13. The apparatus of claim 12, wherein the first precision level represents a first accuracy level for the first motion vector difference and the second precision level represents a second accuracy level of the second motion vector difference.

14. The apparatus of claim 11, wherein determining the first precision level comprises parsing a first syntax element associated with the first reference list and determining the first precision level based on the first syntax element and wherein determining the second precision level comprises parsing a second syntax element associated with the second reference list and determining the second precision level based on the second syntax element.

15. The apparatus of claim 14, wherein the first syntax element indicates whether the motion vector difference when associated with the first reference list is represented in quarter luma precision level or not and wherein the second syntax element indicates whether the motion vector difference when associated with the second reference list is represented in quarter luma precision level or not.

16. An apparatus in an encoder comprising one or more processors and at least one memory coupled to said one or more processors, wherein said one or more processors are configured to perform:

obtaining at least one current motion vector difference for a coding unit;

determining a first precision level used to represent a motion vector difference when associated with a first reference list and a second precision level used to represent motion vector difference when associated with a second reference list;

converting the current motion vector difference from the first precision level to a third precision level used by the encoder to represent motion data if the current motion vector difference is associated with the first reference list and converting the current motion vector difference from the second precision level to the third precision level if the current motion vector difference is associated with the second reference list;

obtaining at least one motion vector associated with the coding unit based on the current motion vector difference and a motion vector predictor; and reconstructing the coding unit based on the motion vector.

17. The apparatus of claim 16, wherein parsing the current motion vector difference comprises parsing a first motion vector difference associated with the first reference list and a second motion vector difference associated with the second reference list.

18. The apparatus of claim 17, wherein the first precision level represents a first accuracy level for the first motion vector difference and the second precision level represents a second accuracy level of the second motion vector difference.

19. The apparatus of claim 16, wherein determining the first precision level comprises parsing a first syntax element associated with the first reference list and determining the first precision level based on the first syntax element and wherein determining the second precision level comprises parsing a second syntax element associated with the second reference list and determining the second precision level based on the second syntax element.

20. The apparatus of claim 19, wherein the first syntax element indicates whether the motion vector difference when associated with the first reference list is represented in quarter luma precision level or not and wherein the second syntax element indicates whether the motion vector difference when associated with the second reference list is represented in quarter luma precision level or not.

\* \* \* \* \*